(12) United States Patent
Bishop et al.

(10) Patent No.: US 8,195,565 B2
(45) Date of Patent: Jun. 5, 2012

(54) SYSTEMS AND METHODS FOR POINT OF INTERACTION BASED POLICY ROUTING OF TRANSACTIONS

(75) Inventors: Fred Bishop, Glendale, AZ (US); Robert E. Morgan, Glendale, AZ (US); Hitesh Seth, East Windsor, NJ (US)

(73) Assignee: Lead Core Fund, L.L.C., Dover, DE (US)

( * ) Notice: Subject to any disclaimer, the term of this patent is extended or adjusted under 35 U.S.C. 154(b) by 338 days.

(21) Appl. No.: 12/479,738

(22) Filed: Jun. 5, 2009

(65) Prior Publication Data

US 2009/0287565 A1 Nov. 19, 2009

Related U.S. Application Data

(63) Continuation-in-part of application No. 12/353,030, filed on Jan. 13, 2009.

(51) Int. Cl.
*G06Q 40/00* (2012.01)
(52) U.S. Cl. ............................. 705/39; 705/37
(58) Field of Classification Search .................. 705/37, 705/39
See application file for complete search history.

(56) References Cited

U.S. PATENT DOCUMENTS

| | | | |
|---|---|---|---|
| 4,587,379 A | 5/1986 | Masuda | |
| 4,752,877 A | 6/1988 | Roberts et al. | |
| 4,799,156 A | 1/1989 | Shavit et al. | |
| 4,823,264 A | 4/1989 | Deming | |
| 5,016,270 A | 5/1991 | Katz | |
| 5,136,633 A | 8/1992 | Tejada et al. | |
| 5,329,589 A | 7/1994 | Fraser et al. | |
| 5,420,926 A | 5/1995 | Low et al. | |
| 5,479,510 A | 12/1995 | Olsen et al. | |
| 5,485,510 A | 1/1996 | Colbert | |
| 5,513,117 A | 4/1996 | Small | |
| 5,644,724 A | 7/1997 | Cretzler | |
| 5,677,955 A | 10/1997 | Doggett et al. | |
| 5,703,344 A | 12/1997 | Bezy et al. | |
| 5,717,989 A | 2/1998 | Tozzoli et al. | |
| 5,724,424 A | 3/1998 | Gifford | |
| 5,745,554 A | 4/1998 | Rozetti | |
| 5,757,917 A | 5/1998 | Rose et al. | |
| 5,794,207 A | 8/1998 | Walker et al. | |
| 5,812,531 A | 9/1998 | Cheung et al. | |
| 5,812,668 A | 9/1998 | Weber | |
| 5,815,657 A | 9/1998 | Williams et al. | |
| 5,822,737 A | 10/1998 | Ogram | |
| 5,825,881 A | 10/1998 | Colvin, Sr. | |
| 5,826,241 A | 10/1998 | Stein et al. | |
| 5,826,245 A | 10/1998 | Sandberg-Diment | |
| 5,850,446 A | 12/1998 | Berger et al. | |
| 5,878,139 A | 3/1999 | Rosen | |
| 5,883,810 A | 3/1999 | Franklin et al. | |
| 5,884,288 A | 3/1999 | Chang et al. | |
| 5,899,980 A | 5/1999 | Wilf et al. | |

(Continued)

OTHER PUBLICATIONS

USPTO; Office Action dated Jun. 21, 2011 in U.S. Appl. No. 12/353,030.

(Continued)

*Primary Examiner* — Jagdish Patel

(57) ABSTRACT

Facilitating commercial transactions using a payment system directory are disclosed. A payment directory and/or wireless point of sale (POS) device may be configured to use predetermined rules, a multitude of data items and/or conditions to locate a payment system, and transmit a payment authorization request from a remote location to at least one payment system, either directly, or via a payment system directory and/or a SSL Gateway.

19 Claims, 29 Drawing Sheets

U.S. PATENT DOCUMENTS

| | | | |
|---|---|---|---|
| 5,902,983 | A | 5/1999 | Crevelt et al. |
| 5,903,721 | A | 5/1999 | Sixtus |
| 5,903,878 | A | 5/1999 | Talati et al. |
| 5,909,492 | A | 6/1999 | Payne et al. |
| 5,920,848 | A | 7/1999 | Schutzer et al. |
| 5,943,424 | A | 8/1999 | Berger et al. |
| 5,949,044 | A | 9/1999 | Walker et al. |
| 5,963,917 | A | 10/1999 | Ogram |
| 5,970,475 | A | 10/1999 | Barnes et al. |
| 5,978,840 | A | 11/1999 | Nguyen et al. |
| 5,987,140 | A | 11/1999 | Rowney et al. |
| 6,002,918 | A | 12/1999 | Heiman et al. |
| 6,016,476 | A | 1/2000 | Maes et al. |
| 6,061,665 | A | 5/2000 | Bahreman |
| 6,097,834 | A | 8/2000 | Krouse et al. |
| 6,108,639 | A | 8/2000 | Walker et al. |
| 6,108,642 | A | 8/2000 | Findley |
| 6,163,772 | A | 12/2000 | Kramer et al. |
| 6,195,542 | B1 | 2/2001 | Griffith |
| 6,202,054 | B1 | 3/2001 | Lawlor et al. |
| 6,226,624 | B1 | 5/2001 | Watson et al. |
| 6,246,996 | B1 | 6/2001 | Stein et al. |
| 6,267,292 | B1 | 7/2001 | Walker et al. |
| 6,282,522 | B1 | 8/2001 | Davis et al. |
| 6,289,453 | B1 | 9/2001 | Walker et al. |
| 6,295,448 | B1 | 9/2001 | Hayes et al. |
| 6,295,522 | B1 | 9/2001 | Boesch |
| 6,304,857 | B1 | 10/2001 | Heindel et al. |
| 6,305,603 | B1 | 10/2001 | Grunbok et al. |
| 6,327,578 | B1 | 12/2001 | Linehan |
| 6,330,546 | B1 | 12/2001 | Gopinathan et al. |
| 6,343,738 | B1 | 2/2002 | Ogilvie |
| 6,366,893 | B2 | 4/2002 | Hannula et al. |
| 6,676,017 | B1 | 1/2004 | Smith, III |
| 6,785,661 | B1 | 8/2004 | Mandler et al. |
| 6,805,287 | B2 | 10/2004 | Bishop et al. |
| 6,991,157 | B2 | 1/2006 | Bishop et al. |
| 6,999,943 | B1 | 2/2006 | Johnson et al. |
| 7,013,292 | B1 | 3/2006 | Hsu et al. |
| 7,050,996 | B1 | 5/2006 | Blagg et al. |
| 7,177,836 | B1 | 2/2007 | German et al. |
| 7,194,437 | B1 | 3/2007 | Britto et al. |
| 7,213,750 | B1 | 5/2007 | Barnes et al. |
| 7,349,871 | B2 | 3/2008 | Labrou et al. |
| 7,389,256 | B1 | 6/2008 | Adams et al. |
| 7,451,114 | B1 | 11/2008 | Masuda et al. |
| 7,472,074 | B1 | 12/2008 | Walker et al. |
| 7,475,808 | B1 | 1/2009 | Bishop |
| 7,499,886 | B2 | 3/2009 | Matsuda et al. |
| 7,536,349 | B1 | 5/2009 | Mik et al. |
| 7,558,965 | B2 | 7/2009 | Wheeler et al. |
| 7,587,363 | B2 | 9/2009 | Cataline et al. |
| 7,593,898 | B1 | 9/2009 | Tsuei et al. |
| 7,685,067 | B1 | 3/2010 | Britto et al. |
| 7,840,486 | B2 | 11/2010 | D'Agnostino |
| 7,890,433 | B2 | 2/2011 | Singhal |
| 7,895,122 | B2 | 2/2011 | Flitcroft et al. |
| 7,908,215 | B2 | 3/2011 | Armes et al. |
| 2001/0011256 | A1 | 8/2001 | Hannula et al. |
| 2001/0042785 | A1 | 11/2001 | Walker et al. |
| 2002/0004783 | A1 | 1/2002 | Paltenghe et al. |
| 2002/0007326 | A1 | 1/2002 | Hashimoto et al. |
| 2002/0016769 | A1 | 2/2002 | Barbara et al. |
| 2002/0019739 | A1 | 2/2002 | Juneau et al. |
| 2002/0052853 | A1 | 5/2002 | Munoz |
| 2002/0087441 | A1 | 7/2002 | Wagner et al. |
| 2002/0103752 | A1 | 8/2002 | Berger et al. |
| 2002/0103753 | A1 | 8/2002 | Schimmel |
| 2002/0111886 | A1 | 8/2002 | Chenevich et al. |
| 2002/0125312 | A1 | 9/2002 | Ogilvie |
| 2002/0128973 | A1 | 9/2002 | Kranzley et al. |
| 2002/0138361 | A1 | 9/2002 | Chen |
| 2002/0143634 | A1 | 10/2002 | Kumar et al. |
| 2002/0152174 | A1 | 10/2002 | Woods et al. |
| 2002/0156688 | A1 | 10/2002 | Horn et al. |
| 2002/0194080 | A1 | 12/2002 | Lourie |
| 2002/0194138 | A1 | 12/2002 | Dominguez |
| 2003/0004867 | A1 | 1/2003 | Kight et al. |
| 2003/0009382 | A1 | 1/2003 | DArbeloff et al. |
| 2003/0018579 | A1 | 1/2003 | Litster et al. |
| 2003/0023550 | A1 | 1/2003 | Lee |
| 2003/0069842 | A1 | 4/2003 | Kight et al. |
| 2003/0078884 | A1 | 4/2003 | Bauman |
| 2003/0140007 | A1 | 7/2003 | Kramer et al. |
| 2004/0010462 | A1 | 1/2004 | Moon et al. |
| 2004/0044627 | A1 | 3/2004 | Russell et al. |
| 2004/0049452 | A1 | 3/2004 | Blagg |
| 2004/0064375 | A1 | 4/2004 | Randell et al. |
| 2004/0267662 | A1 | 12/2004 | Armes et al. |
| 2005/0080692 | A1 | 4/2005 | Padam et al. |
| 2005/0154676 | A1 | 7/2005 | Ronning et al. |
| 2006/0136300 | A1 | 6/2006 | Kopelman et al. |
| 2007/0052517 | A1 | 3/2007 | Bishop et al. |
| 2007/0270123 | A1 | 11/2007 | Cai et al. |
| 2008/0010189 | A1 | 1/2008 | Rosenberger |
| 2008/0021800 | A1 | 1/2008 | Wilmes et al. |
| 2008/0208681 | A1 | 8/2008 | Hammad et al. |
| 2009/0094125 | A1 | 4/2009 | Killian et al. |
| 2009/0138388 | A1 | 5/2009 | Bishop et al. |
| 2009/0164331 | A1 | 6/2009 | Bishop et al. |

OTHER PUBLICATIONS

USPTO; Office Action dated Dec. 9, 2010 in U.S. Appl. No. 12/479,672.

USPTO; Final Office Action dated May 26, 2011 in U.S. Appl. No. 12/479,672.

USPTO; Office Action Restriction dated Dec. 27, 2010 in U.S. Appl. No. 12/479,748.

USPTO; Office Action dated Mar. 11, 2011 in U.S. Appl. No. 12/479,748.

USPTO; Office Action dated Jun. 21, 2011 in U.S. Appl. No. 12/353,049.

USPTO; Advisory Action dated Sep. 10, 2010 in U.S. Appl. No. 10/611,034.

USPTO; Final Office Action dated Jun. 22, 2010 in U.S. Appl. No. 10/611,034.

USPTO; Advisory Action dated Nov. 2, 2009 in U.S. Appl. No. 10/611,034.

USPTO; Final Office Action dated May 28, 2009 in U.S. Appl. No. 10/611,034.

USPTO; Office Action dated Jul. 18, 2008 in U.S. Appl. No. 10/611,034.

USPTO; Advisory Action dated Apr. 11, 2008 in U.S. Appl. No. 10/611,034.

USPTO; Final Office Action dated Dec. 31, 2007 in U.S. Appl. No. 10/611,034.

USPTO; Office Action dated Jul. 18, 2007 in U.S. Appl. No. 10/611,034.

USPTO; Office Action dated Jun. 14, 2011 in U.S. Appl. No. 13/020,579.

Gamble, Richard H. "Lockbox Technology," Business Credit, v103 n1, pp. 24-30, Jan. 2001.

USPTO; Notice of Allowance dated Nov. 3, 2010 in U.S. Appl. No. 10/728,279.

USPTO; Office Action dated Sep. 27, 2010 in U.S. Appl. No. 10/728,279.

USPTO; Advisory Action dated Jun. 23, 2010 in U.S. Appl. No. 10/728,279.

USPTO; Final Office Action dated Apr. 12, 2010 in U.S. Appl. No. 10/728,279.

USPTO; Office Action dated Oct. 8, 2009 in U.S. Appl. No. 10/728,279.

USPTO; Advisory Action dated Jul. 10, 2009 in U.S. Appl. No. 10/728,279.

USPTO; Final Office Action dated Apr. 1, 2009 in U.S. Appl. No. 10/728,279.

USPTO; Office Action dated Sep. 29, 2008 in U.S. Appl. No. 10/728,279.

USPTO; Advisory Action dated Jul. 17, 2008 in U.S. Appl. No. 10/728,279.

USPTO; Final Office Action dated Apr. 9, 2008 in U.S. Appl. No. 10/728,279.

USPTO; Office Action dated Oct. 6, 2007 in U.S. Appl. No. 10/728,279.
Advisory Action mailed Apr. 8, 2009 in U.S. Appl. No. 11/695,161.
Advisory Action mailed Apr. 8, 2009 in U.S. Appl. No. 11/695,168.
Advisory Action mailed Apr. 8, 2009 in U.S. Appl. No. 11/695,174.
Final Rejection mailed May 15, 2009 in U.S. Appl. No. 11/695,152.
Advisory Action mailed Jun. 1, 2009 in U.S. Appl. No. 11/695,152.
Non-Final Rejection mailed Jul. 7, 2009 in U.S. Appl. No. 11/695,174.
Non-Final Rejection mailed Jul. 10, 2009 in U.S. Appl. No. 11/695,161.
Non-Final Rejection mailed Jul. 31, 2009 in U.S. Appl. No. 11/695,168.
Non-Final Rejection mailed Aug. 5, 2009 in U.S. Appl. No. 11/695,152.
Final Rejection mailed Nov. 23, 2009 in U.S. Appl. No. 11/695,168.
Advisory Action mailed Dec. 4, 2009 in U.S. Appl. No. 11/695,168.
Final Rejection mailed Dec. 7, 2009 in U.S. Appl. No. 11/695,174.
Final Rejection mailed Dec. 8, 2009 in U.S. Appl. No. 11/695,161.
Final Rejection mailed Dec. 9, 2009 in U.S. Appl. No. 11/695,152.
Advisory Action mailed Jan. 28, 2010 in U.S. Appl. No. 11/695,152.
Advisory Action mailed Jan. 29, 2010 in U.S. Appl. No. 11/695,161.
Advisory Action mailed Feb. 1, 2010 in U.S. Appl. No. 11/695,174.
Notice of Allowance mailed Feb. 17, 2010 in U.S. Appl. No. 11/695,168.
Notice of Allowance mailed Mar. 25, 2010 in U.S. Appl. No. 11/695,174.
Notice of Allowance mailed May 28, 2010 in U.S. Appl. No. 11/695,152.
Notice of Allowance mailed Jun. 15, 2010 in U.S. Appl. No. 11/695,161.
USPTO; All Office Actions (Non-Final, Final, Advisory Actions, Restrictions/Elections, etc.), Notices of Allowance, 892s, 1449s and SB/08As from U.S. Appl. Nos. 09/704,379; 11/164,444; 11/695,152; 11/695,174; 11/695,161; 11/695,168; 12/242,759; 12/242,766; 12/242,797; 12/242,803; 12/242,812; 12/242,822; 12/242,827; 12/242,830; 12/242,836; 12/242,842; 12/325,523; 12/325,536; 12/325,576; 12/325,610; 12/325,495; 12/353,101.
USPTO; All Office Actions (Non-Final, Final, Advisory Actions, Restrictions/Elections, etc.), Notices of Allowance, 892s, 1449s and SB/08As from U.S. Appl. Nos. 12/353;030; 12/353,093; 12/353,118; 12/353,140; 12/353,063; 12/353,109; 12/353,130; 12/353,081; 12/353,049; 12/355,434; 12/355,467; 12/355,498; 12/355,408; 12/479,702; 12/479,719; 12/479,733; 12/355,527; 12/479,748;12/479,650; 12/479,672; 12/479,687; 12/505,164.
USPTO; Notice of Allowance dated May 28, 2010 in U.S. Appl. No. 11/695,152.
USPTO; Notice of Allowance dated Jun. 15, 2010 in U.S. Appl. No. 11/695,161.
PCT; International Search Report and Written Opinion dated Mar. 24, 2010 in Application No. PCT/US2010/020582.
PCT; International Search Report and Written Opinion dated Aug. 3, 2010 in Application No. PCT/US2010/037174.
PCT; International Search Report and Written Opinion dated Sep. 2, 2010 in Application No. PCT/US2010/041330.
USPTO; Notice of Allowance dated Mar. 25, 2010 in U.S. Appl. No. 11/695,174.
USPTO; Notice of Allowance dated Feb. 17, 2010 in U.S. Appl. No. 11/695,168.
USPTO; Notice of Allowance dated Dec. 14, 2010 in U.S. Appl. No. 12/355,527.
NN 970399, Wireless Point of Sale Terminal Input/Output, Mar. 1, 1997.
Requirement for Restriction/Election mailed Sep. 27, 2004 in U.S. Appl. No. 09/704,379.
Non-Final Rejection mailed Dec. 29, 2004 in U.S. Appl. No. 09/704,379.
Final Rejection mailed May 10, 2005 in U.S. Appl. No. 09/704,379.
Advisory Action mailed Jul. 20, 2005 in U.S. Appl. No. 09/704,379.
Non-Final Rejection mailed Oct. 17, 2005 in U.S. Appl. No. 09/704,379.
Final Rejection mailed Mar. 30, 2006 in U.S. Appl. No. 09/704,379.
Advisory Action mailed Aug. 14, 2006 in U.S. Appl. No. 09/704,379.
Non-Final Rejection mailed Oct. 30, 2006 in U.S. Appl. No. 09/704,379.
Non-Final Rejection mailed Apr. 17, 2007 in U.S. Appl. No. 09/704,379.
Non-Final Rejection mailed Oct. 11, 2007 in U.S. Appl. No. 09/704,379.
Final Rejection mailed Apr. 21, 2008 in U.S. Appl. No. 09/704,379.
Advisory Action mailed May, 27, 2008 in U.S. Appl. No. 09/704,379.
Notice of Allowance mailed Jul. 16, 2008 in U.S. Appl. No. 09/704,379.
Issue Notification mailed Aug. 27, 2008 in U.S. Appl. No. 09/704,379.
Non-Final Rejection mailed May, 5, 2008 in U.S. Appl. No. 11/695,152.
Non-Final Rejection mailed Nov. 19, 2008 in U.S. Appl. No. 11/695,152.
Non-Final Rejection mailed Mar. 11, 2008 in U.S. Appl. No. 11/164,444.
Notice of Allowance mailed Sep. 10, 2008 in U.S. Appl. No. 11/164,444.
Issue Notification mailed Dec. 22, 2008 in U.S. Appl. No. 11/164,444.
ISR and Written Opinion issued in PCT/US2000/030483.
Requirement for Restriction issued Feb. 25. 2009 in U.S. Appl. No. 11/695,152.
Non-Final Office Action issued May 13, 2008 in U.S. Appl. No. 11/695,161.
Final Office Action issued Feb. 24, 2009 in U.S. Appl. No. 11/695,161.
Non-Final Office Action issued May 15, 2008 in U.S. Appl. No. 11/695,168.
Final Office Action issued Feb. 4, 2009 in U.S. Appl. No. 11/695,168.
Non-Final Office Action issued May 13, 2008 in U.S. Appl. No. 11/695,174.
Final Office Action issued Feb. 3, 2009 in U.S. Appl. No. 11/695,174.
International Search Report and Written Opinion for International Application No. PCT/US2010/037174 dated Aug. 3, 2010.
USPTO; Notice of Allowance dated Apr. 29, 2011 in U.S. Appl. No. 12/242,759.
USPTO; Final Office Action dated Mar. 17, 2011 in U.S. Appl. No. 12/242,822.
USPTO; Advisory Action dated Apr. 19, 2011 in U.S. Appl. No. 12/242,822.
USPTO; Office Action dated Apr. 14, 2011 in U.S. Appl. No. 12/242,836.
USPTO; Notice of Allowance dated Apr. 29, 2011 in U.S. Appl. No. 12/325,536.
USPTO; Notice of Allowance dated Apr. 4, 2011 in U.S. Appl. No. 12/325,576.
USPTO; Office Action dated Apr. 11, 2011 in U.S. Appl. No. 12/325,610.
USPTO; Notice of Allowance dated May 5, 2011 in U.S. Appl. No. 12/325,495.
USPTO; Office Action dated May 13, 2011 in U.S. Appl. No. 12/355,434.
USPTO; Office Action dated May 13, 2011 in U.S. Appl. No. 12/355,467.
USPTO; Notice of Allowance dated May 25, 2011 in U.S. Appl. No. 12/242,827.
USPTO; Advisory Action dated Mar. 7, 2011 in U.S. Appl. No. 12/242,842.
USPTO; Final Office Action dated Jan. 25, 2011 in U.S. Appl. No. 12/242,842.
USPTO; Advisory Action dated Mar. 1, 2011 in U.S. Appl. No. 12/242,803.
USPTO; Final Office Action dated Jan. 31, 2011 in U.S. Appl. No. 12/242,803.
USPTO; Advisory Action dated Mar. 1, 2011 in U.S. Appl. No. 12/242,766.
USPTO; Final Office Action dated Jan. 25, 2011 in U.S. Appl. No. 12/242,766.
USPTO; Office Action dated Feb. 4, 2011 in U.S. Appl. No. 12/325,495.

USPTO; Office Action dated Feb. 16, 2011 in U.S. Appl. No. 12/325,576.
USPTO; Office Action dated Jan. 27, 2011 in U.S. Appl. No. 12/325,536.
USPTO; Notice of Allowance dated Jan. 10, 2011 in U.S. Appl. No. 12/355,408.
USPTO; Notice of Allowance dated Jan. 13, 2011 in U.S. Appl. No. 12/242,812.
USPTO; Notice of Allowance dated Feb. 3, 2011 in U.S. Appl. No. 12/242,830.
USPTO; Notice of Allowance dated Feb. 22, 2011 in U.S. Appl. No. 12/242,797.
USPTO; Office Action dated Aug. 16, 2011 in U.S. Appl. No. 12/353,101.
USPTO; Final Office Action dated Sep. 1, 2011 in U.S. Appl. No. 12/353,030.
USPTO; Advisory Action dated Sep. 22, 2011 in U.S. Appl. No. 12/353,030.
USPTO; Office Action dated Aug. 19, 2011 in U.S. Appl. No. 12/353,093.
USPTO; Office Action dated Aug. 18, 2011 in U.S. Appl. No. 12/353,140.
USPTO; Office Action dated Jul. 26, 2011 in U.S. Appl. No. 12/353,109.
USPTO; Office Action dated Aug. 17, 2011 in U.S. Appl. No. 12/353,130.
USPTO; Office Action dated Sep. 12, 2011 in U.S. Appl. No. 12/353,049.
USPTO; Request for Information dated Sep. 22, 2011 in U.S. Appl. No. 12/479,702.
USPTO; Office Action dated Jul. 29, 2011 in U.S. Appl. No. 12/479,719.
USPTO; Final Office Action dated Sep. 29, 2011 in U.S. Appl. No. 12/479,748.
USPTO; Office Action dated Sep. 29, 2011 in U.S. Appl. No. 12/479,650.
USPTO; Office Action Restriction dated Aug. 15, 2011 in U.S. Appl. No. 12/479,650.
USPTO; Advisory Action dated Aug. 10, 2011 in U.S. Appl. No. 12/479,672.
USPTO; Notice of Allowance dated Oct. 6, 2011 in U.S. Appl. No. 12/479,687.
USPTO; Office Action dated Oct. 7, 2011 in U.S. Appl. No. 12/505,164.
USPTO; Office Action dated Jul. 14, 2011 in U.S. Appl. No. 12/353,063.
USPTO; Office Action dated Jul. 19, 2011 in U.S. Appl. No. 12/479,687.
USPTO; Office Action dated Jul. 13, 2011 in U.S. Appl. No. 12/353,081.
USPTO; Office Action dated Jul. 21, 2011 in U.S. Appl. No. 12/353,118.
USPTO; Advisory Action dated Oct. 24, 2011 in U.S. Appl. No. 12/479,748.
USPTO; Notice of Allowance dated Oct. 19, 2011 in U.S. Appl. No. 12/353,063.
USPTO; Notice of Allowance dated Oct. 19, 2011 in U.S. Appl. No. 12/355,498.
USPTO; Corrected Notice of Allowance dated Oct. 13, 2011 in U.S. Appl. No. 12/355,467.
USPTO; Corrected Notice of Allowance dated Oct. 17, 2011 in U.S. Appl. No. 12/242,766.
USPTO; Final Office Action dated Oct. 21, 2011 in U.S. Appl. No. 12/353,109.
USPTO; Final Office Action dated Oct. 21, 2011 in U.S. Appl. No. 12/355,434.
USPTO; Final Office Action dated Oct. 27, 2011 in U.S. Appl. No. 12/242,836.
USPTO; Final Office Action dated Oct. 17, 2011 in U.S. Appl. No. 12/353,118.
USPTO; Advisory Action dated Nov. 1, 2011 in U.S. Appl. No. 12/353,118.
PCT; International Preliminary Report on Patentability dated Oct. 21, 2011 in Application No. PCT/US2010/041330.
PCT; International Preliminary Report on Patentability dated Oct. 26, 2011 in Application No. PCT/US2010/041330.

![American Express Internet Explorer window]

```
AMERICAN EXPRESS-MICROSOFT INTERNET EXPLORER
FILE EDIT VIEW GO FAVORITES HELP
BACK FORWARD STOP REFRESH HOME SEARCH FAVORITES HISTORY CHANNELS FULLSCREEN MAIL PRINT
ADDRESS: HTTP://TRIBECA.SIG.BSH.COM/CONSUMER_TO_CONSUMER/BUILDBI_2.ASP          LINK
```

| AMERICAN EXPRESS | ITEMS / PERSONAL \ ○SMALL BUSINESS ○CORPORATIONS \ | 1900 |

▷ CARDS

CONSUMER TO CONSUMER PAYMENTS
VIEW INVOICES
STEP 43-REVIEW INFORMATION

TO: GLORIAPUBLIC@YAHOO.COM
FROM: JOHN_SAMPLE@HOTMAIL.COM

INVOICE #:001300925
INVOICE EXPIRES:02/13/00
YOUR REFERENCE #:23456
DESCRIPTION:EBAY AUCTION 44587956

TRAVEL & ENTERTAINMENT
FINANCIAL PLANNING & INVESTING
EXPRESS SHOPPER

| DESCRIPTION | QUANTITY | PRICE | SUBTOTAL |
|---|---|---|---|
| 34590A APACHE RUG | 1 | $300.00 | $300.00 |

| | |
|---|---|
| INSURANCE | 20.00 |
| SHIPPING & HANDLING | 90.00 |
| OTHER | 0.00 |
| TOTAL TO BE CHARGED TO BUYER | $410.00 |

CARD INFORMATION
NAME AS IT APPEARS ON THE CARD
GLORIA Q. PUBLIC

CARD ACCOUNT #
XXXX-XXXX-XXXX

BASIC CARDMEMBER'S BIRTH DATE
01/02/1967

BILLING ADDRESS

CARD IDENTIFICATION #
4432
EXPIRATION DATE
XX/XXXX

I AGREE TO THE TERMS & CONDITIONS SET BY THE SELLER AND TO PAY THE TOTAL CHARGES ON THIS INVOICE.

1904 ──[ACCEPT]

I DO NOT WISH TO PROCEED WITH THIS

SYSTEMS AND METHODS FOR POINT OF INTERACTION BASED POLICY ROUTING OF TRANSACTIONS

CROSS REFERENCE TO RELATED APPLICATIONS

This application is a continuation-in-part application of, and claims the benefit of, U.S. application Ser. No. 12/353,030 filed Jan. 13, 2009. The '030 application claims priority to U.S. Pat. No. 7,475,808 issued on Jan. 13, 2009. The '808 patent claims priority to U.S. Pat. No. 7,426,492 issued on Sep. 16, 2008. The '492 patent claims priority to and the benefit of U.S. Provisional Application Ser. No. 60/163,824, filed Nov. 5, 1999, and U.S. Provisional Application Ser. No. 60/164,075, filed Nov. 5, 1999. All of these applications are incorporated by reference.

FIELD OF THE INVENTION

The invention generally relates to commercial transactions, and more particularly, to the facilitation of commercial transactions by locating a payment system for authorizing at least a portion of the transaction.

BACKGROUND OF THE INVENTION

Merchants are increasingly conducting transactions at remote locations. Some examples of these merchants include taxis, home delivery merchants (e.g., pizza, grocery, etc.), shuttle services, vendors at sporting events or concerts, expositions (e.g., home and garden, RV, gun show, boats, autos, etc.), and the like. A customer making purchases from a merchant at a remote location often prefers to use a transaction instrument (e.g., a credit card, charge card, debit card, RFID, etc.) when making such a purchase at the remote location. In addition, merchants conducting business at a remote location would likely prefer to request and receive payment authorization from a financial institution prior to completing the transaction to ensure payment and/or reduce the chance of fraud. Merchants may also prefer to conveniently locate and use a particular payment system.

A hurdle that often impedes commercial transactions occurring at remote locations, and involving payment with a transaction instrument, is that a means for the merchant to access financial institutions and obtain rapid payment authorization from the financial institution for the transaction is generally unavailable. For example, unlike the conventional "brick and mortar" stores, in the case of a typical transaction occurring at a remote location involving the purchase of goods and/or services with a transaction instrument, merchants currently manually record the account number of the transaction instrument, either by hand on a sheet of paper or with an imprint device, and generally must request payment authorization for the transaction at a later time. Some merchants may also obtain authorization using a "card not present" transaction, wherein the merchant may obtain a verbal authorization by calling from a cell phone or type certain information (account number, expiration date, etc) into a keypad.

In other situations, the merchant may be able to input account information into an electronic device at the remote location. However, the electronic device merely stores the information without the ability to request and/or receive rapid payment authorization from a financial institution (e.g. via a payment system) while the customer is still present and/or while the device is located and the remote location. Here, the merchant usually either transfers the information from the electronic device to another electronic device or must connect the electronic device to another electronic device prior to transmitting a request for and/or receiving payment authorization from a financial institution for the transaction. Thus, a merchant is currently not able to easily request payment authorization from a remote location, and is currently unable to receive payment authorization from the financial institution at a remote location, such receipt of authorization being rapid or otherwise.

In addition, a merchant may currently be required to pay a higher "card not present" fee since the financial institution is without means to verify the actual transaction instrument was presented to the merchant for the transaction in addition to the increased risk of being defrauded by, for example, receiving a transaction instrument for a closed account, an account that lacks sufficient funds or available credit, or a stolen transaction instrument. Similarly, the customer's account number is also susceptible to fraudulent use since the account number may be documented elsewhere besides on the transaction instrument itself (e.g., a sheet of paper kept by the merchant), and is capable of being misused by a dishonest employee of the merchant or somehow falling into the hands of a dishonest person.

Significantly, the foregoing factors frequently adversely impact both an individual user's and a merchant's willingness to engage in commercial transactions involving the use of a transaction instrument at a remote location. Thus, the volume of transactions for exchanging monetary value may be overall reduced. As mentioned, these losses may be due either to the individual purchaser's and/or merchant's apprehension regarding acceptance of the risks associated with payments involving transaction instruments at remote locations or the individual seller's inability to process transaction instruments at the remote location. Consequently, there is a need for methods and systems to enable remote merchants and customers to request and receive payment authorization in exchange for goods, services, or other value purchased at remote locations in a secure manner. There is also a need for methods and systems to enable remote merchants to receive payment authorization immediately and/or prior to completion of a commercial transaction conducted at a remote location. In addition, there is a need for methods and systems to enable merchants and purchasers to communicate confidential information to and from a financial institution and/or payment system without risking a breach in the security of such information.

SUMMARY OF THE INVENTION

The invention includes a method to facilitate a purchase transaction by receiving payment information related to a transaction and locating at least one candidate payment system for processing at least a portion of the transaction by accessing a payment directory. In various embodiments, the invention may include a merchant point of service (POS), a merchant system, a payment directory computer, a plurality of payment systems, a purchaser, and/or a purchaser transaction device.

In one embodiment, a payment directory facilitates a purchase transaction in response to a decline or partial payment authorization. The method may include: receiving, at a payment directory computer, a payment request for a transaction; determining, by the payment directory computer, a first payment system for processing at least a portion of the transaction; transmitting, by the payment directory computer to the first payment system, a first authorization request related to at least a portion of the transaction; receiving, at the payment directory computer from the first payment system, a first authorization response associated with the first authorization request; and, in response to the first authorization response indicating at least one of a decline or a partial authorization, the payment directory computer determining a second payment system for processing at least a portion of the transaction; transmitting to the second payment system a second authorization request related to at least a portion of the transaction; receiving from the second payment system a second authorization response associated with the second authorization request; and, transmitting a payment response based upon the payment request and at least one of the first authorization response or the second authorization response.

In an embodiment, determining the payment systems comprises querying a payment system directory. In an embodiment, the querying the payment system directory comprises transmitting a payment directory request to the payment system directory with at least one selection parameter, wherein the selection parameter is associated with at least one of an account owner associated with the payment request or a merchant associated with the transaction, wherein the payment system directory parses the payment directory request, creates a query based upon the parsed payment directory request and executes the query against a payment system database. In an embodiment, a similar method may be performed by a point of service device.

In one embodiment, a payment directory facilitates a purchase transaction that involves splitting the payment across two transaction accounts. In one embodiment, a payment directory facilitates a purchase transaction that involves determining a payment account and/or a payment system based upon budget information. In one embodiment, a payment directory facilitates a purchase transaction that involves determining a payment system based upon a rewards account. In one embodiment, a payment directory facilitates a purchase transaction that involves determining a payment account and/or a payment system based upon a rewards accumulation strategy. In one embodiment, a payment directory facilitates a purchase transaction that involves determining a supplemental account for funding a transaction. In one embodiment, a payment directory facilitates a purchase transaction by determining a payment system based upon a characteristic of a purchaser transaction device (e.g. a mobile device). In one embodiment, a purchaser transaction device communicates with a payment directory.

BRIEF DESCRIPTION OF THE DRAWINGS

Additional aspects of the present invention will become evident upon reviewing the non-limiting embodiments described in the specification and the claims taken in conjunction with the accompanying figures, wherein like numerals designate like elements, and:

Figure 19B:
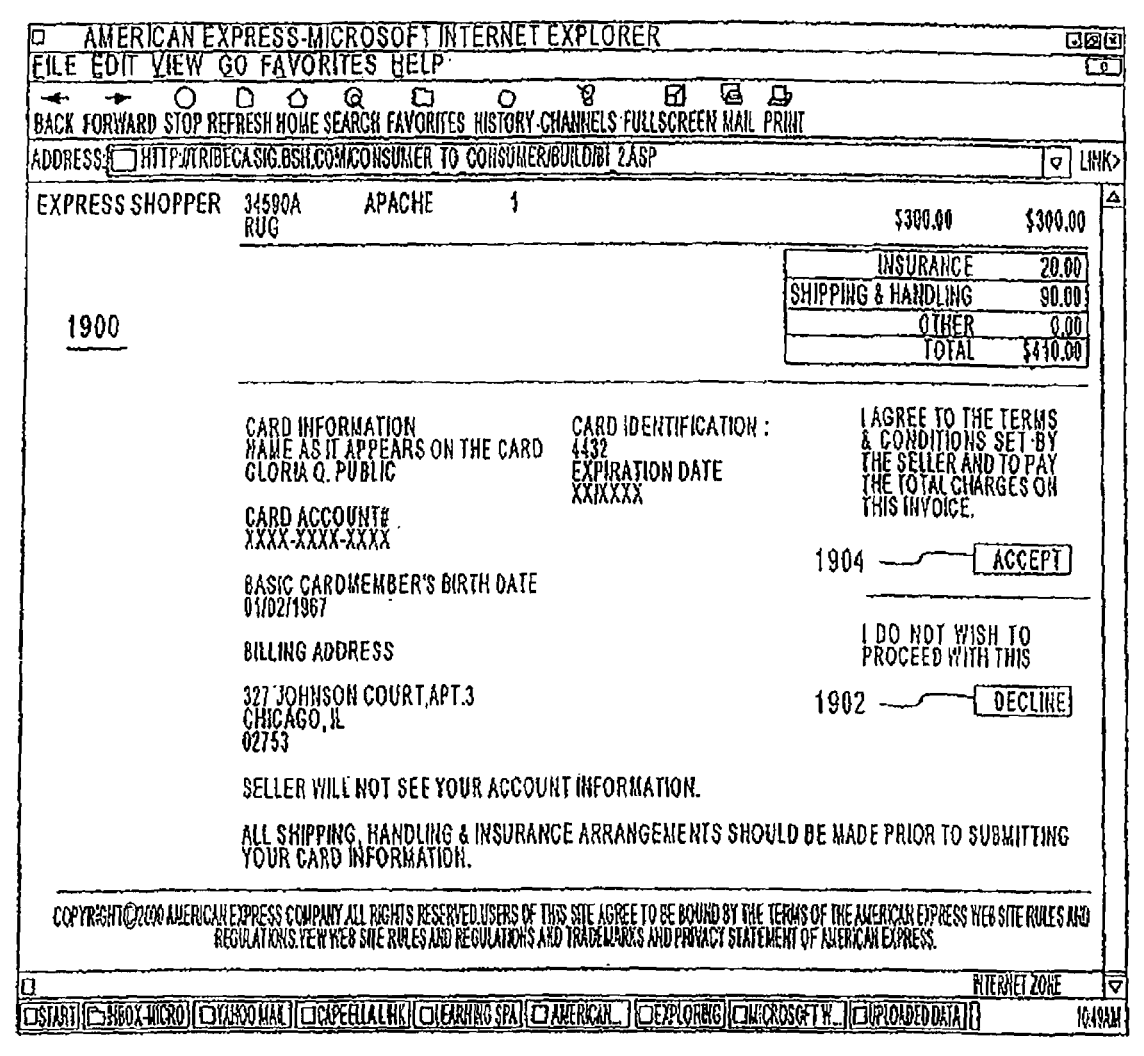

FIGS. 19A and 19B represent an exemplary interface depicting an exemplary transaction invoice;

DETAILED DESCRIPTION OF EXEMPLARY EMBODIMENTS

Figure 1:
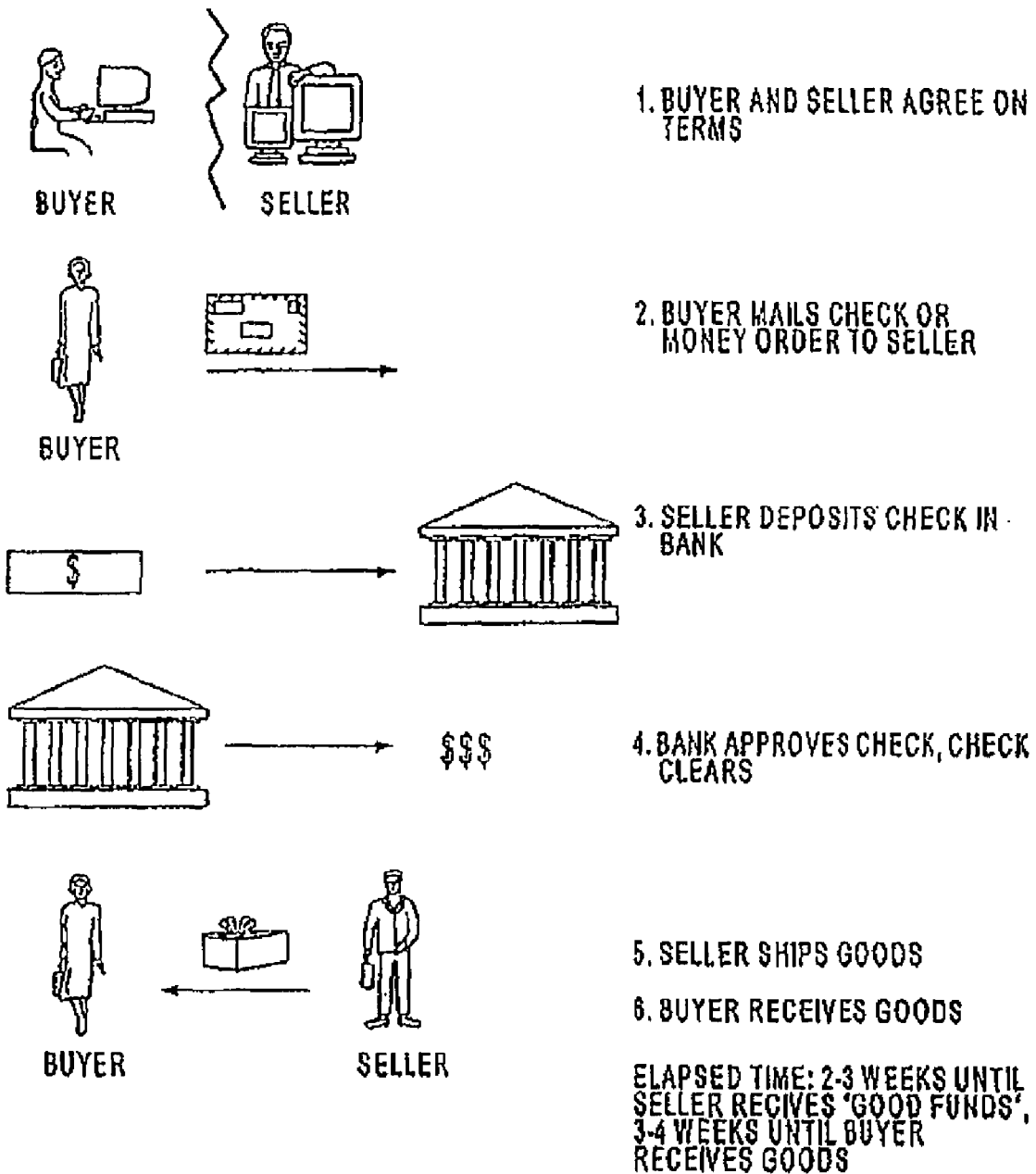
FIG. 1 is an exemplary schematic diagram of a prior art system for conducting a commercial transaction between parties who are remotely located from one another.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, Macromedia Cold Fusion, Microsoft Active Server Pages, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

It will be appreciated that many applications could be formulated. One skilled in the art will appreciate that the network may include any system for exchanging data or transacting business, such as the Internet, an intranet, an extranet, WAN, LAN, satellite communications, and/or the like. The users may interact with the system via any input device such as a keyboard, mouse, kiosk, personal digital assistant, handheld computer (e.g., Palm Pilot®), cellular phone, magstripe reader and/or the like. Similarly, the invention could be used in conjunction with any type of personal computer, network computer, workstation, minicomputer, mainframe, or the like running any operating system such as any version of Windows, Windows NT, Windows XP, Windows 2000, Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI, or any number of existing or future protocols. Moreover, the system contemplates the use, sale, or distribution of any goods, services, or information over any network having similar functionality described herein. The invention also contemplates uses in association with web services, utility computing, pervasive and individualized computing, security and identity solutions, autonomic computing, commodity computing, mobility and wireless solutions, open source, biometrics, grid computing and/or mesh computing.

"Entity" may include any individual, consumer, customer, group, business, organization, government entity, transaction account issuer or processor (e.g., credit, charge, etc), merchant, consortium of merchants, customer, account holder, charitable organization, software, hardware, and/or any other entity.

A "transaction account" may include any account that may be used to facilitate a financial transaction. A financial institution or transaction account issuer includes any entity that offers transaction account services to customers. Although often referred to as a "financial institution," the financial institution may represent any type of bank, lender or other type of card issuing institution, such as credit card companies, card sponsoring companies, or third party issuers under contract with financial institutions. It is further noted that other participants may be involved in some phases of the transaction, such as an intermediary settlement institution, but these participants are not shown.

A "customer" may include any entity that has a TXA with a TXA issuer.

A "merchant" may include any entity that receives payment or other consideration. For example, a merchant may request payment for services rendered from a customer who holds an account with a TXA issuer.

A "financial processor" or "payment system" may include any entity which processes transactions, issues accounts, acquires financial information, settles accounts, conducts dispute resolution regarding accounts, and/or the like.

Each participant may be equipped with a computing system to facilitate online commerce transactions and/or transactions including the use of a SSL Gateway (discussed below). The customer may have a computing unit in the form of a personal computer, although other types of computing units may be used, including laptops, notebooks, hand held computers, set-top boxes, and the like. The merchant may have a computing unit implemented in the form of a computer-server, although other implementations are possible.

The financial institution may have a computing center shown as a main frame or host computer. However, the financial institution computing center may be implemented in other forms, such as a mini-computer, a PC server, a network set of host computers, and/or the like. In addition, the computing center may comprise a payment system accessible via the Internet and/or a SSL Gateway. A payment system may include any system or entity which processes information or transactions, issues accounts, acquires financial information, settles accounts, conducts dispute resolution regarding accounts, and/or the like. Furthermore, the payment system may be configured to receive and process payment authorization requests, and transmit payment authorizations and payment rejections. The payment system may incorporate various rules and/or algorithms to determine whether sufficient funds and/or sufficient available credit exist(s) in a customer's account.

The computing units may be connected with each other via a data communication network. The network may be a public network and assumed to be insecure and open to eavesdroppers. In the illustrated implementation, the network may be embodied as the Internet. In this context, the computers may or may not be connected to the Internet at all times. For instance, the customer computer may employ a modem to occasionally connect to the Internet, whereas the financial institution computing center might maintain a permanent connection to the Internet. It is noted that the network may be implemented as other types of networks, such as an interactive television (ITV) network.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing financial institution. In an exemplary implementation, the electronic commerce system is implemented as computer software modules loaded onto the customer computer and the financial institution computing center. The merchant computer does not necessarily require any additional software to participate in the online commerce transactions supported by the online commerce system.

An "account", "account number", "transaction account identifier" or "transaction instrument", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a fob having a transponder and RFID reader in RF communication with the fob. Although the present invention may include a fob embodiment, the invention is not to be so limited. Indeed, system may include any device having a transponder which is configured to communicate with RFID reader via RF communication. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

An account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the customer. A merchant account number may be, for example, any number or alpha-numeric characters that identifies a particular merchant for purposes of card acceptance, account reconciliation, reporting, or the like.

In yet another embodiment, a POS device, a merchant system, a transaction device (e.g. a mobile device), etc. are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof. For an explanation of systems and methods for providing a secondary form of identification for transaction completion, please see U.S. Pat. No. 7,314,164 titled "SYSTEM FOR BIOMETRIC SECURITY USING A SMARTCARD" issued Jan. 1, 2008; U.S. Pat. No. 7,505,941 titled "METHODS AND APPARATUS FOR CONDUCTING ELECTRONIC TRANSACTIONS USING BIOMETRICS" issued on Mar. 17, 2009; U.S. patent application Ser. No. 11/552,886 titled "SYSTEMS AND METHODS FOR NON-TRADITIONAL PAYMENT USING BIOMETRIC DATA" filed on Oct. 25, 2006; all of which are herein incorporated by reference.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

As background, FIG. 1 illustrates an exemplary prior art method for conducting an online commercial transaction between individual users of a distributed computer network, such as the Internet. Initially, individual users contact each other over the network and agree to the terms of a transaction (step 1). If the particular transaction is a sales transaction involving goods, for example, the purchaser mails a check, money order, or other suitable negotiable instrument to the seller (step 2). Once the seller receives the negotiable instrument, the seller deposits it with an appropriate financial institution, such as a financial institution (step 3). When the financial institution clears the check through the seller's account, the seller is given access to the funds (step 4). The seller then ships the goods to the purchaser (step 5), and the purchaser receives the goods (step 6). Generally, this process involves an elapsed time of approximately two to three weeks before the seller receives "good funds" for the transaction, and three to four weeks until the purchaser receives the goods. Moreover, this process may include the purchaser disclosing his/her name and address to the seller to effect the transaction, and the purchaser has little or no recourse if either the seller fails to deliver the goods as promised or the goods are damaged or otherwise misrepresented.

The present invention comprises systems, methods, and computer program products for facilitating commercial transactions between remote individuals, wherein the transactions often include person-to-person transfers of funds. In a preferred aspect, the present invention facilitates commercial transactions comprising sales transactions conducted between remote individuals, such as transactions between users of a distributed computer network. One skilled in the art will appreciate that the phrase "person-to-person transfers of funds", as used herein, includes, for example, transfers from a financial account of a first party, which may be an individual or an entity, to the financial account of a second party, which may be an individual or an entity. One skilled in the art further will appreciate that a "financial account" or "account" can include a card account, a demand deposit account, a credit line, a money market account, a digital cash account, and/or any other financial account. Thus, a person-to-person transfer of funds can include card to card transfers of monetary value, card to demand deposit account (DDA) funds transfers, DDA to card transfers, card to credit line transfers, credit line to card transfers, and/or the like. Moreover, funds transfers in accordance with the present invention can be between financial accounts held with either the same financial institution or different financial institutions. A "financial institution", as will be appreciated by one of ordinary skill in the art, can include any suitable third party, such as a financial institution, a card issuer, a lender, a credit union, and/or the like.

Further, as one skilled in the art will appreciate, a "transaction card" or "card", as used herein, includes any device, code, or suitable financial instrument representing an account with a financial institution, such as a financial institution, a card issuer, and/or the like, wherein the device, code, or other suitable financial instrument has a credit line or balance associated with it, and wherein the credit line or balance is in a form of a financial tender having discrete units, such as currency. Moreover, a "transaction card" or "card", as used herein, includes any device, code, or financial instrument suitably configured to allow the cardholder to interact or communicate with the system, such as, for example, a charge card, credit card, debit card, prepaid card, telephone card, smart card, magnetic stripe card, bar code card, authorization/access code, personal identification number (PIN), Internet code, other identification code, and/or the like. Additionally, a "cardholder" or "cardmember" includes any person or entity which uses a transaction card and participates in the present system and may include a person who is simply in possession of a financial account identifier, such as an authorization or account code. Similarly, a "demand deposit account" may include any suitable financial account, such as a financial institution account (e.g., checking, savings, money market, credit line, etc.) or other financial account maintained by a third party (such as a suitably insured financial institution), such account preferably having a balance of substantially the same financial tender as the card.

Communication between the parties to the transaction and the system of the present invention is accomplished through any suitable communication means (including wireless means), such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

While a person-to-person transfer may generically be described as a transfer from the financial account of a first party to a financial account of a second party, for convenience and purposes of brevity and consistency, the present disclosure generally refers to the first party as the purchaser and the second party as the seller. However, it will be recognized by those of ordinary skill in the art that the seller need not provide goods or services to the purchaser in exchange for the transfer of funds. While this often may be the case, the present disclosure is not so limited and includes transactions which may be gratuitous in nature, whereby the purchaser transfers funds from their financial account to the financial account of the seller without the seller providing any goods, services, or other value in exchange.

In accordance with an aspect of the present invention, a person-to-person funds transfer may be facilitated by any suitable financial institution, such as a card issuer like American Express® Company for example, which suitably provides credit risk analysis and fraud risk analysis in essentially real-time, unlike other card-based fund transfer schemes which rely on third parties to facilitate such services. Utilization of third-party credit risk and fraud risk analyses, such as used in conventional funds transfer schemes, not only may increase the amount of time to process the funds transfer, but also may jeopardize the security of confidential information associated with the transaction due to the typical need for multiple transmissions of the relevant information. Furthermore, by reducing the participants in the transaction and by enabling the card issuer to facilitate the funds transfer, certain transaction fees and/or costs may be reduced or avoided entirely because the card issuer is positioned to profit from the increased card use, rather than simply profiting from the fees associated with the manner in which the card is used by individual purchasers.

Figure 2:
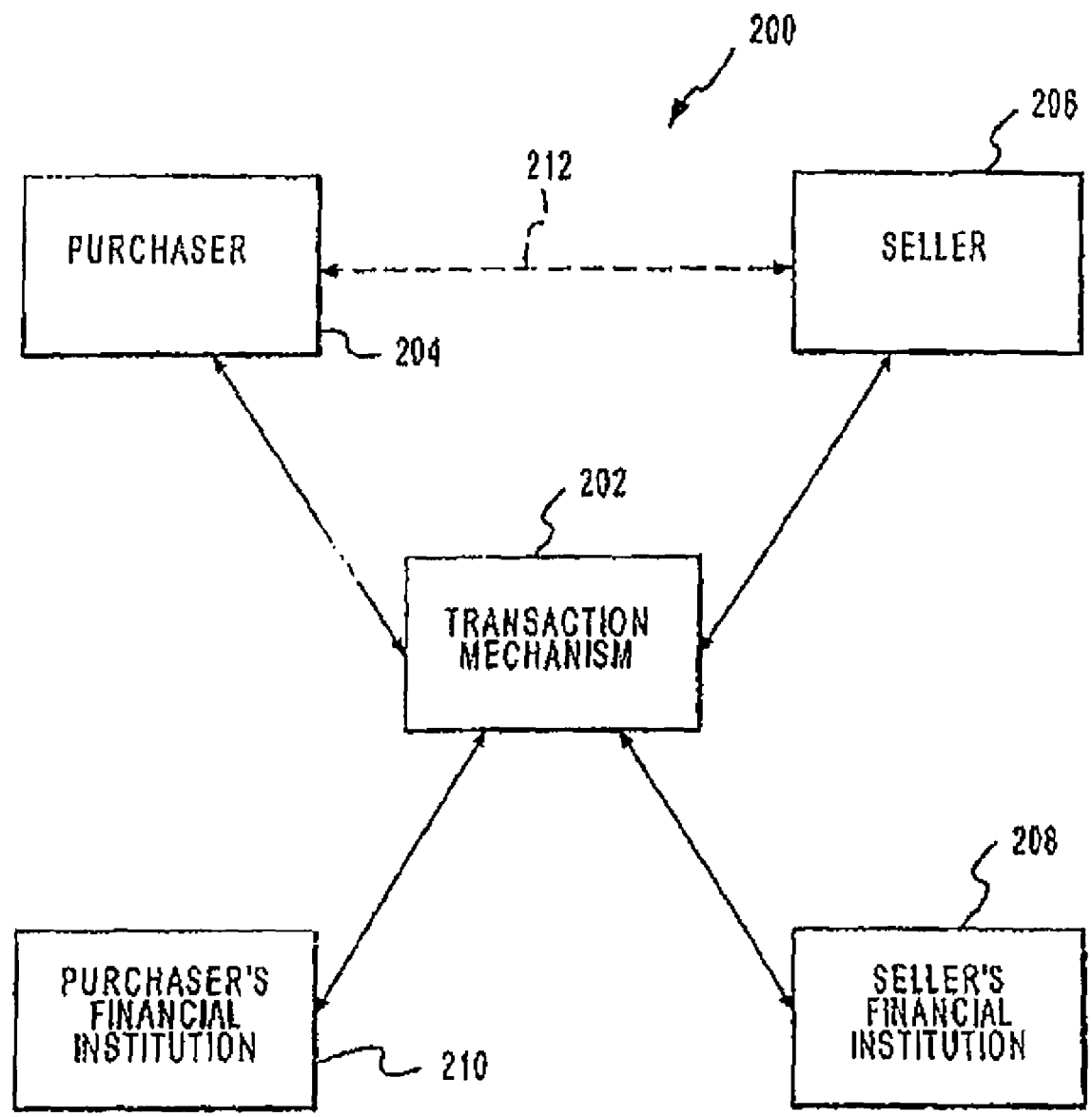
FIGS. 2-4 are schematic block diagrams illustrating exemplary transaction systems in accordance with various aspects of the present invention.

In accordance with an aspect of the present invention, FIG. 2 is a diagram illustrating an exemplary transaction system 200. The transaction system 200 comprises a transaction mechanism or server 202 which facilitates and controls commercial transactions between a purchaser 204 and a seller 206. In order to complete the funds transfer from the financial account of the purchaser 204 to the financial account of the seller 206, the transaction mechanism 202 communicates with at least one of a seller's financial institution 208, which comprises a suitable financial account associated with the seller 206, and a purchaser's financial institution 210, which comprises a suitable financial account associated with the purchaser 204. In the case where the seller's financial account comprises a demand deposit account, for example, the seller's account can include, for example, a financial institution account, such as a savings, checking, or money market account associated with the seller 206. In an exemplary embodiment, the communication link between the transaction mechanism 202 and the seller's financial institution 208 can comprise a suitable connection to an automated clearinghouse (ACH) for facilitating financial institution checking account transfers, as is well-known to those in the industry.

In an exemplary embodiment, the purchaser's financial institution 210 may comprise the transaction mechanism 202. In another exemplary embodiment, transaction mechanism 202 is maintained by an independent third party, such as an intermediary 314, as described more fully below with reference to FIG. 3. The communication links between and among the transaction mechanism 202, purchaser 204, seller 206, seller's financial institution 208, and purchaser's financial institution 210 can be implemented through one or more communications networks, such as a private extranet, a public Internet, and/or a third party extranet, though it will be recognized by those skilled in the art that other networks such as a public switch telephone network (PSTN) likewise may be utilized. Moreover, although the present invention may be suitably implemented with TCP/IP protocols, it will be readily appreciated that the invention also can be implemented using IPX, Appletalk, IP-6, NetBIOS, OSI, or any number of other protocols either currently known or hereafter devised. Further, in another exemplary embodiment, purchaser 204 and seller 206 are implemented by any suitable type of personal computer, point of interaction device, network computer, workstation, minicomputer, mainframe, and/or the like, which implementation preferably includes a suitable browser application, such as a World Wide Web (Web) browser, preferably having suitable encryption capability.

In accordance with the present invention, it is preferred that either one or both of the purchaser 204 and seller 206 pre-register with the transaction mechanism 202. However, as those skilled in the art will appreciate, a specific registration of the purchaser 204 and/or the seller 206 is not required and registration may take place at any suitable time, including at the time of the transaction. During purchaser registration, the purchaser 204 preferably provides suitable financial account information, such as card information for example, and suitable purchaser identification information. In an exemplary embodiment, the purchaser identification and/or account information includes any suitable information related to the purchaser and/or the account, such as any one or more of the following: name, address, demographic information, social security number, telephone number, account number, account expiration date, personal identification number associated with the account, date of birth, mother's maiden name, spending habit information, billing history information, credit history information, and/or any additional information which might identify the purchaser and the purchaser's financial account. The purchaser identification information can be used for subsequent purchaser authentication. During seller registration, the seller 206 preferably provides suitable financial account information and suitable identification information relating to an account, such as an appropriate card or demand deposit account for example, at the seller's financial institution 18. The seller's identification information can be used for subsequent authentication. In an exemplary embodiment, one or both of the purchaser 204 and seller 206 are cardmembers or cardholders of the card issuer which is providing the transaction mechanism 202, thereby expediting and streamlining the registration process and, in another exemplary embodiment, subsequent authentication and credit/fraud analysis processes performed by the transaction mechanism 202.

As illustrated in FIG. 2, a transaction 212 may be initiated by one of either the purchaser 204 or the seller 206. The transaction 212, which is illustrated in phantom lines in order to represent that it is optional, may comprise the exchange of goods, services, or other value from the seller 206 to the purchaser 204 in exchange for a transfer of funds from the purchaser's financial account at the purchaser's financial institution 210 to the seller's financial account at seller's financial institution 208. However, it should be appreciated that transaction 212 need not comprise an exchange of goods and/or services, but rather, may comprise a gratuitous transfer of funds from a purchaser 204 to a seller 206. By way of example, the purchaser 204 may be purchasing goods from the seller 206 which goods were identified through a classified ad, an Internet posting, an Internet auction, and/or the like, or, alternatively, the purchaser 204 may be transferring funds to the seller 206 for philanthropic, charitable, or other gift-giving purposes. Thus, depending upon the nature of the transaction 212, one of either the purchaser 204 or the seller 206 will initiate the transfer of funds by suitably providing to the transaction mechanism 202 transaction information. The transaction information may include identification information regarding one or both of the purchaser 204 and the seller 206 as well as the terms of the transaction, which can include suitable account information, the date and time of the transaction, the amount of the funds transfer, a description of the goods, services, or other value, any escrow terms (such as a suitable escrow release event), and/or the like. In addition, requests for value-added services, such as insurance, dispute resolution, postal tracking, and/or the like may be made by one or both of the purchaser 204 and/or the seller 206.

The transaction mechanism 202 then suitably authenticates the seller 206 and/or the purchaser 204 to ensure that they are the appropriate owners of their respective accounts. In an exemplary embodiment, the transaction mechanism 202 is provided by the purchaser's financial institution 210, such as the card issuer of a purchaser's card for example, which financial institution is able to perform suitable risk management functions, such as suitable credit risk and/or fraud risk analyses for example. The ability of the transaction mechanism 202, through a suitable financial institution which preferably maintains and operates the transaction mechanism 202, to perform credit risk and fraud risk analyses is particularly advantageous, since performance of these services by a third party not only delays the transaction process but presents an additional security risk when transmitting and processing confidential or transaction-sensitive information to and from the third party. Moreover, when the transaction mechanism 202 is provided by the purchaser's financial institution 210, such as a card issuer, information such as historical transactional records, account records, and/or the like easily can be reviewed to determine whether a credit or fraud risk exists.

In another exemplary embodiment, the transaction mechanism 202 suitably determines whether the purchaser's financial account has a sufficient balance to enable the funds transfer identified in the transaction information. If the purchaser 204 has sufficient funds available in the financial account, and suitable risk management and authentication processes do not result in a negative determination, the transaction is deemed acceptable. The transaction mechanism 202 then executes the transaction by debiting the purchaser's financial account and crediting a suitable escrow account maintained by the transaction mechanism 202. The funds debited from the purchaser's financial account preferably remain in the escrow account for some predefined period of time. The predefined period of time may be based upon the occurrence of a suitably defined escrow release event, such as any of the following events: receipt by the purchaser of the goods, services, or other value; the lapse of a predetermined period of time within which the purchaser may evaluate the goods, services, or other value and either accept or refuse delivery; and/or any other suitable, predefined event. Preferably, the transaction mechanism 202 withholds the funds from the seller's financial account and suitably maintains the funds in the escrow account pending the occurrence of the escrow release event. Debiting of the escrow account and crediting of the seller's financial account for the amount of the funds transfer occurs once the escrow release event has transpired and the purchaser has not rejected the shipment.

In another exemplary embodiment, the transaction mechanism 202 may be suitably configured to include a transaction fee in the amount debited from the purchaser's financial account, and/or the transaction mechanism 202 may be suitably configured to subtract a transaction fee from the amount credited to the seller's financial account. In an exemplary embodiment, the transfer of funds to the seller's financial account from the escrow account includes suitable communications with an ACH, as will be appreciated by one of ordinary skill in the art.

In an exemplary embodiment, the transaction mechanism 202 provides value-added services which may be requested by the purchaser 204 and/or the seller 206 as a part of the transaction between the parties. Preferably, the value-added services may include insurance, dispute resolution, postal tracking, and/or similar services that potentially enhance the value of the transaction to the purchaser 204 and/or the seller 206. In the event that value-added services are requested by the purchaser 204 as a part of the funds transfer, then the cost of such services is included in the amount of funds debited or deducted from the purchaser's financial account. Likewise, the cost of value-added services requested by the seller 204 are suitably withheld or deducted from the funds credited or added to the seller's financial account.

Figure 3:
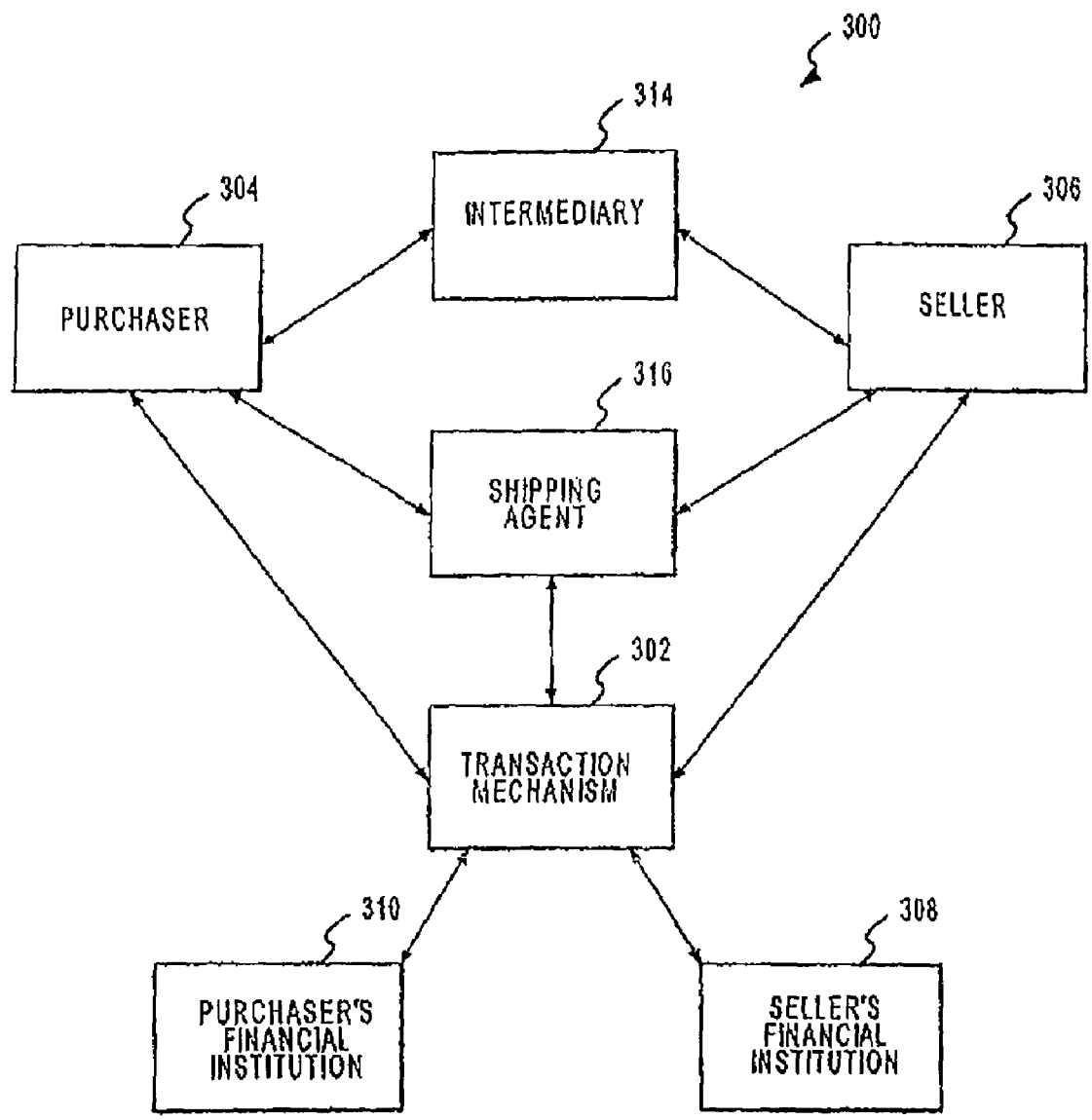

In accordance with another aspect of the present invention, FIG. 3 is a diagram illustrating an exemplary transaction system 300. The transaction system 300 comprises an intermediary 314 which suitably provides an interface between the purchaser 304 and the seller 306. The intermediary 314 can be any suitable third party. In an exemplary embodiment, intermediary 314 can include an online auction such as eBay® or eWanted®, an online merchant such as Amazon.com®, an online classified ad site, and/or the like. By way of example, if the intermediary 314 is eBay, the seller 306 may list goods for sale through the intermediary 314, for which a purchaser 304 may then submit bids. The intermediary 314 then suitably determines whether the purchaser 304 submitted the highest bid and, if so, then makes a final sale determination, which can include sending appropriate notice, such as by e-mail for example, to both the purchaser 304 and the seller 306. Once notified, the purchaser 304 is provided with the opportunity to select means for submitting payment to the seller 306, such as through a suitable card or DDA. For example, by selecting the card payment method, transaction information regarding the sale is transferred by intermediary 314 to a suitable transaction mechanism 302 provided by a suitable financial institution, such as a card issuer As described above with reference to FIG. 2, the seller 306 preferably is pre-registered with the transaction mechanism 302, and the seller's financial account at the seller's financial institution 308 may suitably receive appropriate funds transferred from the purchaser's financial account at the purchaser's financial institution 310. If the purchaser 304 is not pre-registered, purchaser registration may take place at the time of the transaction with the seller 306. As discussed above, the transaction mechanism 302 receives transaction information regarding the sale, authenticates the purchaser 304 and the seller 306, and performs suitable credit and fraud risk management analyses. If the purchaser 304 has sufficient funds available in their financial account and the risk management and authentication processes do not result in a negative determination, then the transaction mechanism 302 deems the transaction acceptable and debits suitable funds from the purchaser's financial account. Preferably, as described above with reference to FIG. 2, a suitable escrow account maintained by the transaction mechanism 302 is credited with the funds transferred from the purchaser's financial account. Upon the occurrence of a suitably pre-defined or pre-identified escrow release event, the escrow account is suitably debited and the seller's financial account is suitably credited with the funds. Again, as described above, any suitable transaction or service fees are preferably included in the amount of funds debited and transferred from the purchaser's financial account and/or deducted from the amount of funds disbursed and credited to the seller's financial account.

As is often the case with an intermediary 314, such as eBay, the transaction between the seller 306 and the purchaser 304 may involve the shipment of goods from the seller 306 to the purchaser 304. Consequently, as typically determined by the particular business rules of the intermediary 314, the goods are shipped by a suitable shipping agent 316 from the seller 306 to the purchaser 304. Preferably, as a part of the escrow service performed by the transaction mechanism 302, a tracking number will be provided by the shipping agent to the transaction mechanism 302. Upon confirmation that the purchaser 304 has received the goods, the transaction mechanism suitably transfers the appropriate funds to the seller's financial account. Preferably, the shipping agent 316 confirms that the purchaser 304 has received the goods. More preferably, the transaction mechanism 302 only releases the funds to the seller 306 upon the suitable occurrence of any predefined escrow release event, such as the lapse of a specified period of time in which the purchaser 304 may evaluate and either accept or reject the goods. In the case that the escrow release event is not satisfied or that the purchaser 304 rejects the goods, the transaction may be suitably reversed or otherwise abandoned. In the event that there is a dispute between a purchaser 304 and a seller 306 regarding a particular transaction, the financial institution that maintains the transaction mechanism 302 may provide the parties with a suitable dispute resolution mechanism, such as access to any suitable system for providing customer service for example.

In an exemplary embodiment, anonymity or portions of anonymity between the purchaser 304 and seller 306 is suitably maintained throughout the transaction between the parties. One skilled in the art will appreciate that any subset of information may remain anonymous. Preferably, the only purchaser information that is transmitted and known to the seller 306 is the purchaser's user identifier. Likewise, it is preferred that the purchaser's knowledge of the seller 306 is limited to the seller's user identifier. In other words, both the purchaser 304 and the seller 306 need not disclose their name, address, financial account information, or any other confidential information to one another in order to effect the transaction. In this embodiment, the purchaser 304 and seller 306 suitably provide their name, address, financial account information, and any other necessary information to the transaction mechanism 302 upon registering with the transaction mechanism 302. In this manner, the shipping agent 316 suitably obtains the relevant purchaser shipping information from the transaction mechanism 302 to obviate any need for a seller 306 to have access to confidential identification information of a purchaser 304.

Figure 4:
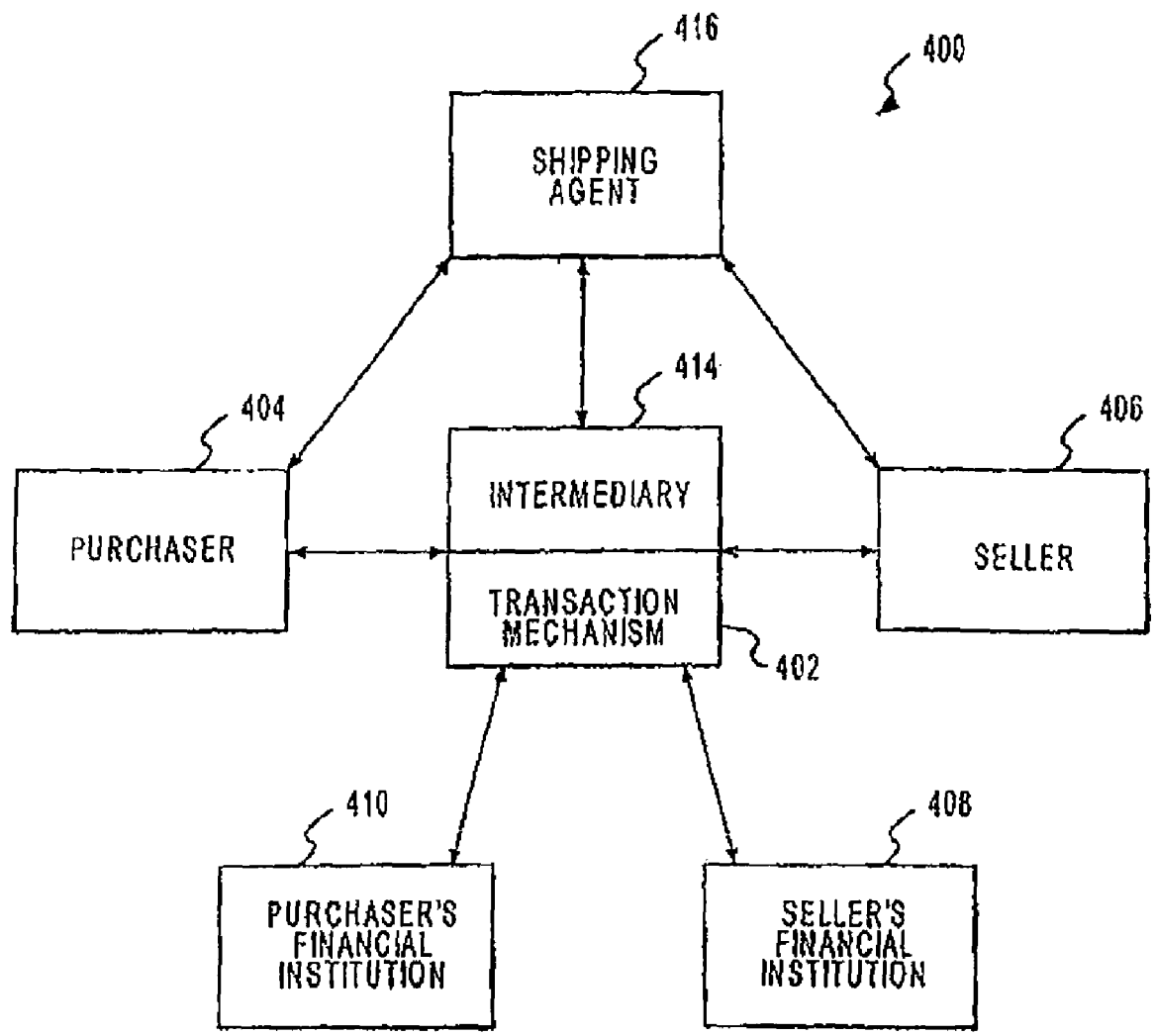

It should be understood that while FIG. 3 illustrates respective communication links between the transaction mechanism 302 and both the purchaser 304 and the seller 306, the scope of the present invention extends to the transmission of information, such as registration information, transaction information, and/or the like, from either or both of the purchaser 304 and/or the seller 306 directly to the intermediary 314 and then from the intermediary 314 to the transaction mechanism 302. In other words, the intermediary 314 may mediate the flow of information from either/both the purchaser 304 and/or the seller 306 to the transaction mechanism 302 without any direct communication between the either the purchaser 304 or the seller 306 and the transaction mechanism 302. Moreover, the intermediary 314 may communicate directly with the transaction mechanism 302 through a suitable communications link or, alternatively, the transaction mechanism 302 may be integrated with the intermediary 314, as illustrated in the exemplary transaction system 400 of FIG. 4. In accordance with this aspect of the present invention, the transaction mechanism 402, which is integrated with the intermediary 414, provides substantially the same functionality as the exemplary transaction mechanisms described above with reference to FIGS. 2 and 3, respectively.

Figure 5:
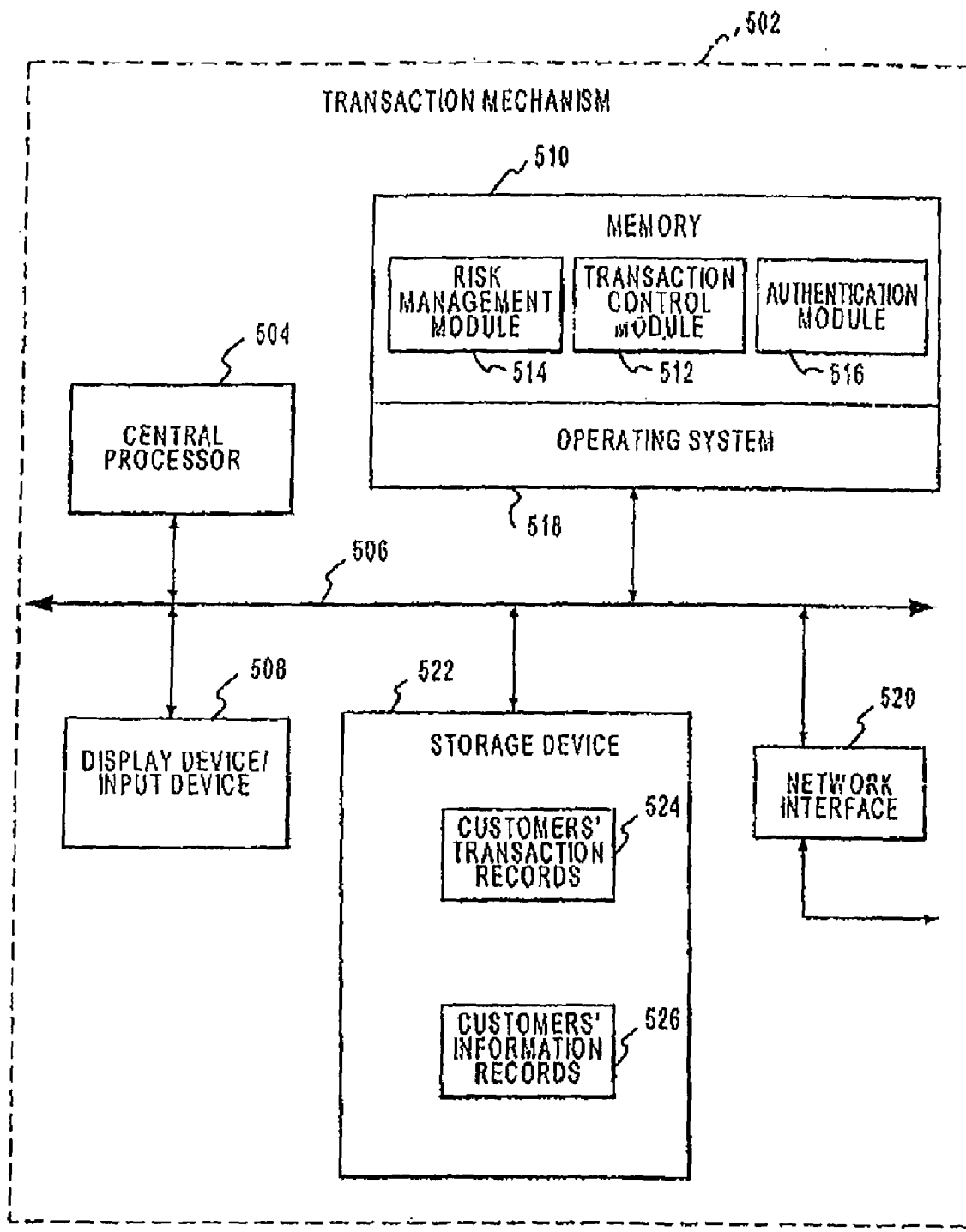
FIG. 5 is a schematic block diagram of an exemplary transaction mechanism in accordance with the present invention.

With reference to FIG. 5, an exemplary transactional mechanism 502 includes a central processor 504 in communication with other elements of the transaction mechanism 502 through a system interface or bus 506. A suitable display device/input device 508, such as a keyboard or pointing device in combination with a monitor, may be provided for receiving data from and outputting data to a user. A memory 510 associated with the transaction mechanism 502 preferably includes a transactional control module 512, a risk management module 514, and an authentication module 516. The memory 510 preferably further includes an operating system 518 which enables execution by processor 504 of the various software applications residing at transaction control module 512, risk management control module 514, and authentication module 516. Operating system 518 may be any suitable operating system, such as any version of Windows, MacOS, BeOS, Linux, UNIX, and/or the like. Preferably, a network interface 520 is provided for suitably interfacing with other elements of the transaction system, such as the elements described above with reference to FIGS. 2-4. Lastly, a storage device 522, such as a hard disk drive for example, preferably contains suitable files which are suitably accessed by the transaction control module 512, the risk management module 514, and the authentication module 516.

In particular, customers' transaction records file 524 preferably comprises transaction information of customers who are registered with the transaction mechanism 502, which transaction information is used to perform suitable credit risk and fraud risk analyses. Likewise, customers' information records 526 comprises information received either from a purchaser or a seller upon registration with the transaction mechanism 502 or during the maintenance of the appropriate financial account. As used herein, a "customer" may be either a purchaser or a seller who has a financial account with the financial institution which suitably maintains the transaction mechanism 502 and who is registered with the transaction mechanism 502. Accordingly, providing the transaction mechanism 502 with access to the appropriate transaction records and information records of the parties involved in the funds transfer facilitates essentially real time risk management by the risk management module 514. Similarly, authentication of the parties to the transaction may likewise be performed efficiently by the authentication module 516, which preferably has access to the records residing in storage device 522. One skilled in the art will appreciate that the storage device 522 and, therefore, customer transaction records 524 and customer information records 526 may be co-located with the transaction mechanism 502, as illustrated in FIG. 5, or may be remotely located with respect to the transaction mechanism 502. If the storage device 522 is remotely located with respect to the transaction mechanism 502, communication between storage device 522 and transaction mechanism 502 may be accomplished by any suitable communication link but is preferably accomplished through a private Intranet or extranet.

Figure 6:
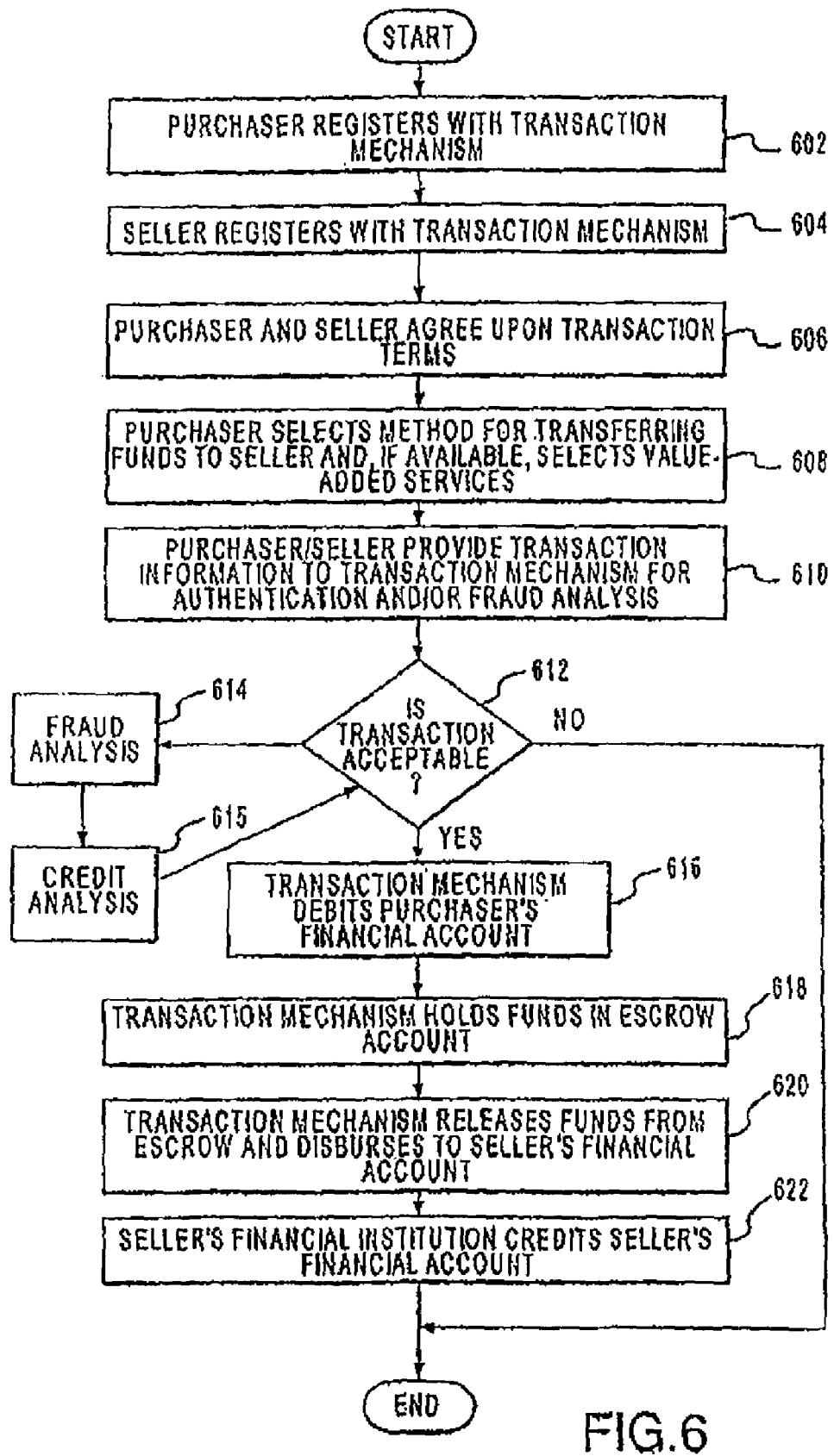
FIG. 6 is a flowchart representing an exemplary commercial transaction in accordance with the present invention.
Figure 7:
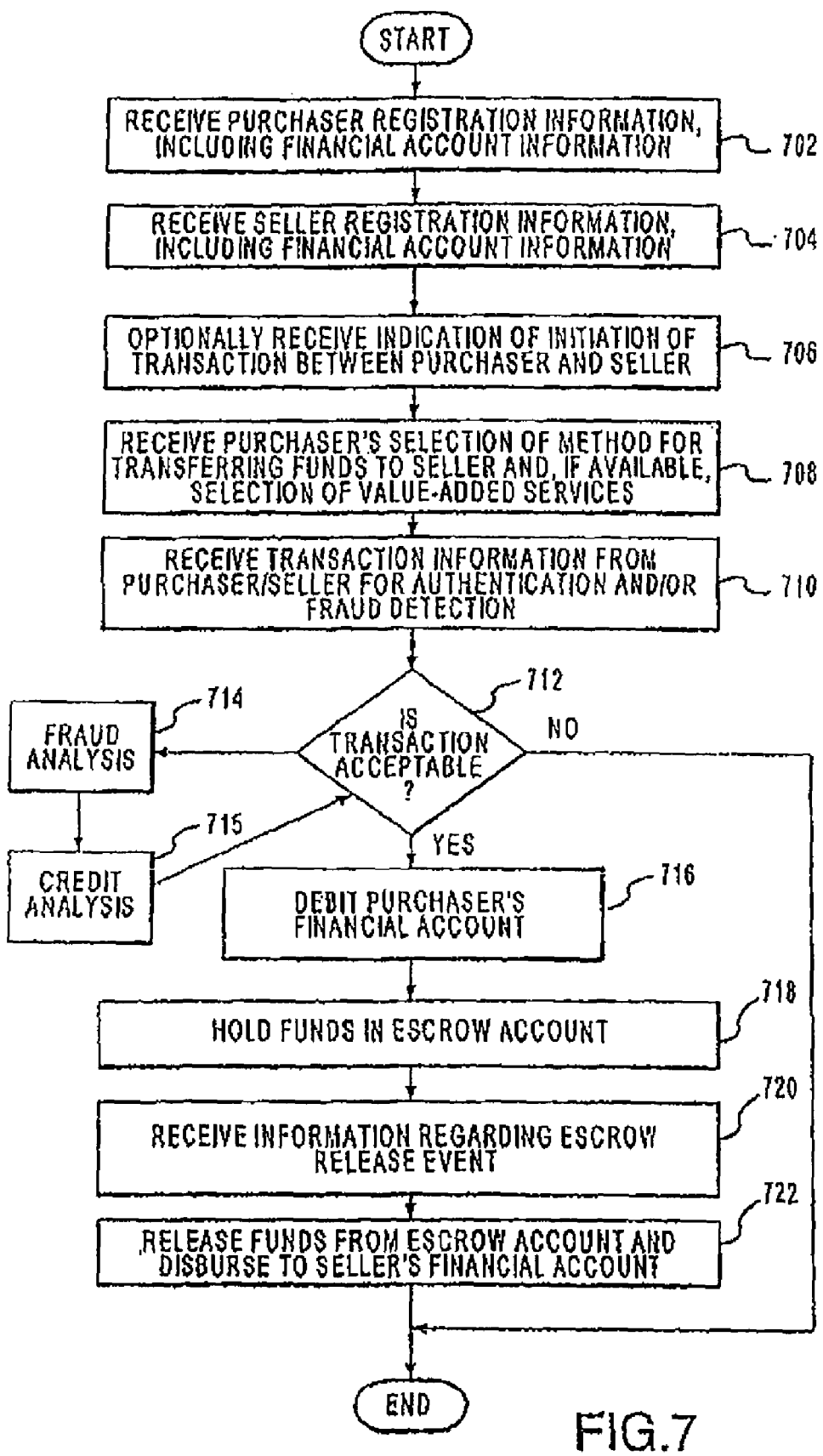
FIG. 7 is a flowchart of an exemplary transactional mechanism in accordance with the present invention.

Referring next to FIGS. 6 and 7, as discussed, the process flows depicted in these figures are exemplary embodiments of the invention only and are not intended to limit the scope of the invention as described above. FIG. 6 is a flow diagram representing an exemplary process for facilitating a commercial transaction between a purchaser and a seller. In accordance with the present invention, an exemplary process executed by a suitable transaction mechanism may include any of the following: registering a purchaser with the transaction mechanism (step 602); registering a seller with the transaction mechanism (step 604); receiving agreed upon transaction terms from at least one of a purchaser and a seller (step 606); receiving a purchaser's selection of a method for transferring monetary value to a seller (step 608); receiving transaction information from at least one of a purchaser and a seller (step 610); performing authentication, credit risk, and/or fraud risk analyses (step 612); determining whether the transaction is acceptable (step 614); terminating the transaction if the transaction is not acceptable; debiting funds from a purchaser's financial account if the transaction is acceptable (step 616); holding the funds in an escrow account (step 618); releasing the funds from the escrow account and disbursing the funds to the seller's financial account (step 620); and crediting the funds to a seller's financial account (step 622).

In accordance with the present invention, any purchaser having a financial account can transfer funds from the purchaser's financial account to the financial account of a second party. For example, a purchaser having a card can transfer funds from the purchaser's card to the card or demand deposit account of any second party having such an account. As represented in FIG. 6 by step 602, the purchaser preferably pre-registers with a transaction mechanism, which transaction mechanism can be established and maintained by any suitable third party, such as a card issuer, as described above with reference to FIGS. 2 and 3. To register with the transaction mechanism, the purchaser may submit suitable purchaser registration information, such as information establishing the identity of the purchaser and information regarding the purchaser's financial account. The purchaser registration information can be suitably stored by the transaction mechanism, such as by storage device 522 of FIG. 5. The purchaser may communicate with the transaction mechanism by any means of communication known to those skilled in the art, including communications by telephone or through the use of any form of computer or point of interaction device having a means for communication, such as a modem, suitable wireless means for communication, and/or the like. If the transaction mechanism is maintained by the purchaser's financial institution, the purchaser can suitably register with the transaction mechanism at the same time that the purchaser initially completes the application for the financial account. Alternatively, the purchaser can register with the transaction mechanism at any suitable time, including at the time of a transaction with a seller.

The purchaser registration information which may be used by the transaction mechanism can include any suitable information, such as any of the types of information described above with reference to FIG. 2. Upon submission of such information to the transaction mechanism, the transaction mechanism may then issue to the purchaser a unique user identifier, such as an identification number, code, password, pass phrase, and/or other suitable identifier which may be used by the transaction mechanism to identify the purchaser. In this manner, the purchaser's user identifier can be used by the transaction mechanism to identify and suitably access the purchaser's registration information at the time of a transaction between a purchaser and a seller. The user identifier can comprise any number or combination of letters, digits, or other characters. If the transaction mechanism is accessible through the Internet, and especially if the purchaser registers with the transaction mechanism through an interface at an Internet Web page, the transaction mechanism or entity maintaining the transaction mechanism can e-mail the appropriate user identifier to the purchaser, optionally using any well-known means for secure communications, such as suitable encryption.

As indicated at step 604, the seller preferably also registers with the transaction mechanism. Although FIG. 6 illustrates the registration of a seller with the transaction mechanism subsequent to the purchaser's registration, the seller can register with the transaction mechanism at any suitable time, including prior to the purchaser's registration and at the time of the transaction with the purchaser. As with the purchaser, the seller preferably provides the transaction mechanism with registration information to identify the seller and to identify the seller's appropriate financial account, such as a card or a demand deposit account, to which the transaction mechanism may transfer funds. The seller's registration information may include any suitable information, such as the seller's name, location or address, social security number (if appropriate), federal employer identification number, financial account number, financial institution, and/or any other suitable information that may be pertinent to a funds transfer transaction. If the seller is associated with the financial institution that is providing the transaction mechanism, the seller's registration information can be suitably stored by the storage device shown in FIG. 5. Furthermore, as with the purchaser, the seller suitably receives from the transaction mechanism a user identifier which identifies the seller to the transaction mechanism. After the purchaser and seller are registered with the transaction mechanism, as illustrated in steps 602 and 604, the purchaser and seller can suitably agree upon the terms of a transaction, as shown in step 606.

The transaction illustrated in step 606 may be an exchange of goods or services for value, although this is not required. The transaction, for example, could include a transaction where the purchaser is gratuitously transferring funds from the purchaser's financial account to the financial account of the seller, thereby eliminating the need for a reciprocal exchange. The purchaser and seller may enter into the transaction through the Internet, such as where a purchaser seeks to purchase goods, services, or other value from an Internet Web site operated by the seller for example. Alternatively, the purchaser and seller can agree to enter into the transaction in a more conventional manner, such as through person-to-person communication over the telephone or in person for example. The particular terms of the transaction between the purchaser and the seller may include any suitable terms that are agreeable to the parties and may address issues such as the nature of any goods, services, or other value; the amount of the funds that are to be transferred from the purchaser's financial account to the seller's financial account; the nature and definition of any escrow release event; the anticipated date or window for delivery or shipment of any goods, services, or other value; and/or other suitable terms and conditions pertaining to the transaction.

After the purchaser and seller have agreed upon the terms of the transaction, the purchaser may be requested to select a method for transferring suitable funds to the seller, as indicated in step 608. The selection of a method for transferring the necessary funds may be completed through the transaction mechanism or, alternatively, through any other suitable means and then suitably communicated to the transaction mechanism. For instance, where the purchaser is purchasing goods, services, or other value from an online seller via an Internet Web site, the Web site, rather then the transaction mechanism, can request that the purchaser select a method of transferring monetary value to the seller. After the purchaser suitably responds to the query, such as through a pop-up display generated by the Internet site, the purchaser's response may be suitably communicated to the transaction mechanism. Alternatively, the purchaser can select a funds transfer method directly through the transaction mechanism, which may occur in the case where the particular Internet site does not request such information but, rather, allows the transaction mechanism to issue the relevant query. Additionally, the latter circumstance may occur in the case where a purchaser is transacting with a seller through a site which maintains the transaction mechanism, such as an online sales site maintained by a card issuer.

In addition to selecting a method for transferring funds to a seller, such as through a card or DDA transaction, the purchaser may also select one or more value-added services, as indicated in step 608. For example, where the transaction mechanism is maintained by a card issuer, the purchaser may be able to select value-added services provided by the card issuer, such as purchaser's insurance, shipping alternatives (where the purchaser has purchased goods or, alternatively, services which may be embodied in documents of any suitable type), postal tracking alternatives, dispute resolution to mediate any dispute that may arise between the purchaser and seller regarding the transaction, and/or the like. It will be appreciated by those of skill in the art that additional value-added services may be offered by the seller in addition to those offered by the third party entity maintaining the transaction mechanism.

After selecting a funds transfer method and any value-added services, the purchaser and/or seller may provide suitable transaction information to the transaction mechanism for authentication, credit risk analysis, and/or fraud risk analysis, as represented in step 610. The transaction information can include, but is not limited to, the amount of funds to be transferred between the purchaser and seller, the date and time of the transaction, a description of the transaction, the purchaser's and seller's respective unique user identifiers, and any other pertinent information which may suitably identify the transaction as well as both the purchaser and the seller. For example, the transaction information can include a date and time at which the transfer of funds should take place. In this manner, the purchaser and seller can indicate that the transfer of funds can take place at a specific time in the future. Upon receiving the transaction information, the transaction mechanism can look-up and access the customer information records, which preferably include at least one of the purchaser's and the seller's registration and financial account information. As discussed above, this information preferably includes data such as the purchaser's financial account identifier and/or the seller's financial account identifier, as well as any additional information that has been suitably input in steps 602 and 604, above.

Thereafter, as represented by step 612, the transaction mechanism may suitably determine whether the transaction is acceptable. In an exemplary embodiment, one component of this determination utilizes the transaction information and the purchaser and/or seller registration information to execute a fraud analysis, as represented by step 614. For example, where the transaction mechanism is established and maintained by a card issuer and the purchaser is a cardholder of a card issued by the card issuer, the card issuer can maintain a history of the purchaser's card transactions. Such card transaction history can be suitably stored along with the purchaser registration information in the customer information records or the customer transaction records, as described above. Using this historical information, the risk management module of the transaction mechanism can perform a fraud analysis by executing a fraud detection program or mechanism to determine whether the current transaction, or current transaction in view of recent transactions, is indicative of fraud. For example, where a card has been utilized to purchase multiple high-priced items, the fraud analysis may flag the transaction such that the transaction mechanism will terminate or otherwise not permit the purchaser to complete the transaction. The fraud detection mechanism may suitably end the transaction, as represented by the negative outcome of step 612, or, alternatively, may query the purchaser to determine whether the purchaser is actually the proper cardholder. In the case of terminating the transaction without presenting further queries to the purchaser, the purchaser and/or the seller may be contacted through any suitable means, such as a real time display, e-mail, telephone, and/or the like, to notify the purchaser and/or the seller that the transaction was not completed.

The transaction mechanism's determination regarding the acceptability of the transaction may suitably include a second component, namely a credit analysis, as represented by step 615, which effects a comparison of the user identifiers of either/both the purchaser and the seller with the user identifiers stored in the storage device to determine whether the transaction is acceptable. After suitably identifying the accounts of the parties entering into the transaction, the transaction mechanism may suitably analyze whether the transaction is acceptable based upon additional criteria. The analysis for determining transaction acceptability can be suitably implemented through a computer-readable storage medium encoded with processing instructions, as described above. Such analysis can include a determination of whether the purchaser has sufficient credit or funds in the financial account to complete the transaction. Additionally, in the event that the purchaser uses a card to accomplish the funds transfer to the seller, the transaction mechanism may suitably terminate the transaction if it determines that the purchaser's card has expired, has been reported as lost or stolen, or is otherwise invalid. Where the transaction mechanism determines, through a program or any other suitable means, that the transaction cannot be completed properly, the transaction mechanism will not complete the transaction, as seen in the negative outcome of step 612. When a negative outcome occurs, the purchaser and/or the seller may be contacted through any suitable means, such as a real time display, e-mail, telephone, and/or the like, to notify the purchaser and/or the seller that the transaction was not completed and to provide particular reasons for the termination of the transaction.

Once a transaction is deemed to be acceptable, the transaction mechanism suitably completes the transaction by debiting the purchaser's financial account, as represented by step 616. Preferably, the transaction mechanism then transfers the funds to a suitable escrow account and holds the funds in the escrow account until a suitable escrow release event has transpired, as represented by step 618. Once the escrow release event has transpired, the funds are then released from the escrow account and disbursed to the seller's financial account, as represented by step 620. In accordance with the terms of the transaction as agreed to by the purchaser and the seller, the funds then are disbursed to the seller's financial account and the seller's account is suitably credited with the funds, as represented by step 622. The transaction mechanism may automatically include any suitable transaction fees, as a service charge for the transaction, in the funds debited from the purchaser's financial account and/or may automatically deduct such fees from the funds disbursed to the seller's financial account.

FIG. 7 is a flow diagram of the operation of an exemplary transaction mechanism in accordance with the present invention. As described above with reference to FIG. 6, the transaction mechanism preferably first receives registration information from the purchaser and the seller, as indicated by steps 702 and 704. Registration information may be entered by a purchaser and/or a seller using any well-known input device, such as a keyboard or mouse suitably connected to any type of computer which can suitably communicate with the transaction mechanism. The registration information may then be transmitted to the transaction mechanism either in real time or downloaded to the transaction mechanism after the registration information is input by the purchaser and/or the seller.

Optionally, as is shown in step 706, the transaction mechanism may receive an indication that a transaction between a purchaser and a seller has been initiated. This indication may originate from either the purchaser or the seller or, alternatively, from an intermediary, which may be unrelated to the entity which maintains the transaction mechanism. For example, a purchaser may choose to transfer funds using an interface located at an intermediary's Web site. This type of funds transfer might occur after the intermediary has suitably queried the purchaser as to the purchaser's preferred funds transfer method, such as by issuing a query by using any of several conventional graphical interfaces or pop-up graphics that are well-known in the art. Alternatively, the seller may suitably initiate the transaction.

Thereafter, as represented by step 708, the transaction mechanism receives suitable information regarding the purchaser's selected method for transferring funds to the seller, such as by a card or DDA for example, and any selected value-added services, as described above. This step may be facilitated by any suitable mechanism, such as a suitable network connection, such as an Internet connection, or through any suitable input device associated with the transaction mechanism. Preferably, at least one of the purchaser and the seller provides suitable transaction information to the transaction mechanism for authentication, credit risk, and fraud risk analyses. Once the transaction mechanism receives suitable transaction information, as represented by step 710 and as described in greater detail above, the transaction mechanism suitably determines whether the transaction is acceptable, as represented by step 712. The fraud detection mechanism executed by the risk management module of the transaction mechanism then suitably communicates with the customer transaction records and customer information records to determine whether the transaction represents a potential fraud risk, as represented by step 714 and as described in greater detail above with reference to FIG. 6.

After the fraud detection mechanism has been executed, the transaction mechanism may then suitably perform a credit analysis, as represented by step 715, to compare the user identifiers of either/both the purchaser and the seller to the user identifiers stored in the storage device in an additional effort to determine whether the transaction is acceptable. As described above with reference to FIG. 6, after suitably identifying the accounts of the parties entering into the transaction, the transaction mechanism also may suitably determine whether the purchaser has sufficient credit or funds in the financial account to complete the transaction. Additionally, in the case that the purchaser uses a card to effect the funds transfer to the seller, the analysis can further include a determination of whether the card has expired, has been reported as lost or stolen, or is otherwise invalid. Where the transaction mechanism determines, through a program or any other suitable means, that the transaction cannot be completed properly, the transaction mechanism will not complete the transaction, as seen in the negative outcome of step 712. When a negative outcome occurs, the purchaser and/or seller may be contacted through any suitable means, such as a real time display, e-mail, telephone, and/or the like, to notify the purchaser and/or the seller that the transaction was not completed and to provide particular reasons for the termination of the transaction.

Once the transaction is deemed acceptable, the transaction mechanism completes the transaction by debiting the purchaser's account, as represented by step 716. Preferably, the transaction mechanism then transfers the funds to a suitable escrow account and holds the funds in the escrow account until a suitable escrow release event has transpired, as represented by step 718. Once the transaction mechanism receives information indicating that the escrow release event has transpired, as represented in step 720, the funds are then released from the escrow account and disbursed to the seller's financial account, as represented by step 722. The transaction mechanism also may automatically account for any suitable transaction fees, as a service charge for the transaction, by suitably including any such fees in the funds debited from the purchaser's financial account and/or by suitably deducting any such frees from the funds disbursed to the seller's financial account.

Figure 8:
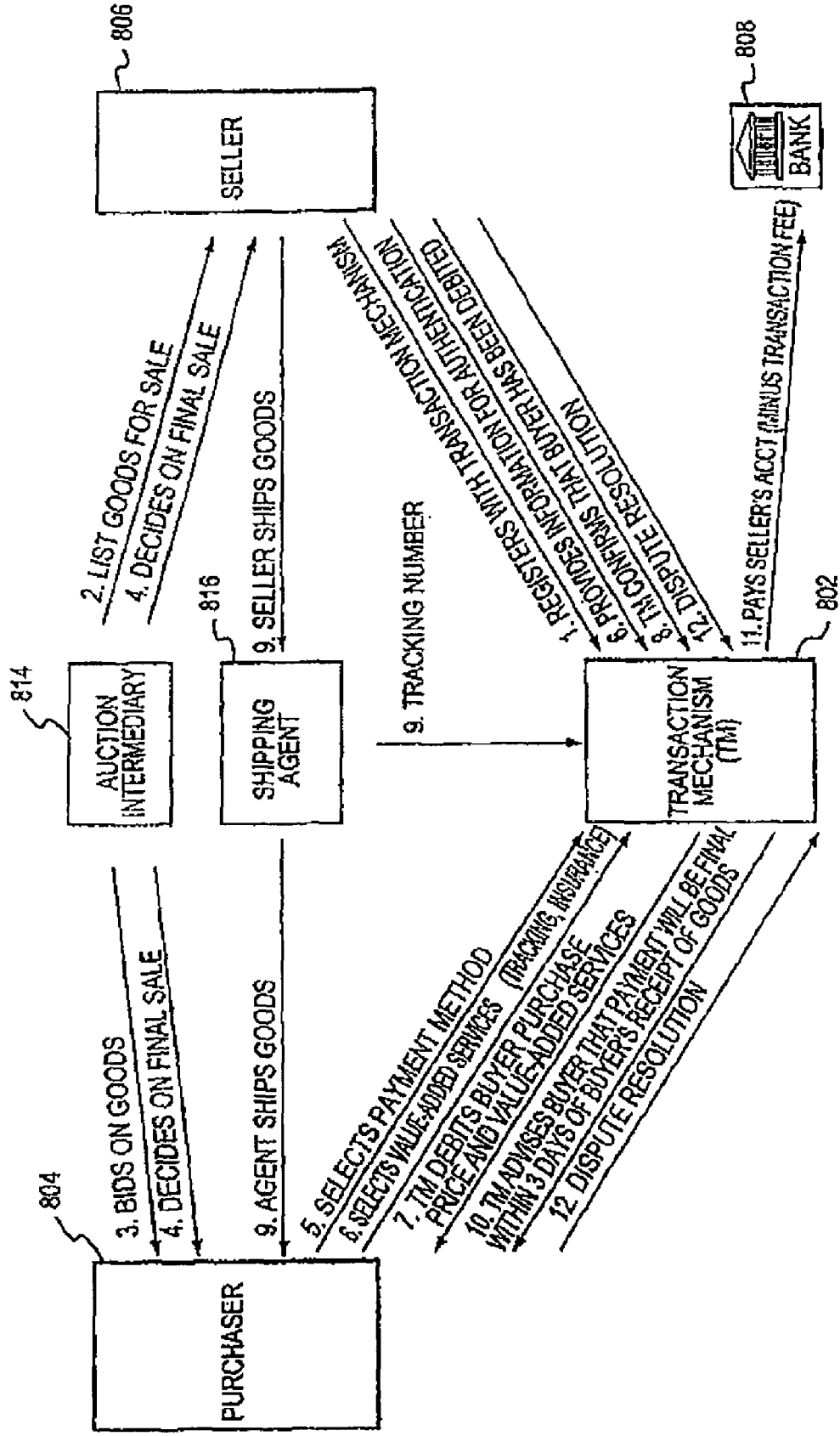
FIG. 8 is a schematic block diagram of the process flow for an exemplary transaction system in accordance with the present invention.

Referring now to FIG. 8, another exemplary embodiment of the present invention includes an auction intermediary 814, such as eBay, and a shipping service 816, such as Federal Express®, United Parcel Service®, and/or any other suitable shipping service. In this embodiment, the seller 806 and/or the purchaser 804 initially register with the transaction mechanism 802. Preferably, the seller 806 lists goods for sale at the Web portal provided by the auction intermediary 814, which listing results in a bid on the goods submitted by a purchaser. The auction intermediary 814 then determines who has submitted the highest bid and notifies both the high-bidding purchaser and the seller. The purchaser 804 then selects a method for transferring suitable funds to the seller, such as by a suitable transaction card or DDA. At the time of the transaction, the purchaser may also be presented with the option of selecting one or more value-added services. The purchaser transaction information is then suitably transmitted to the transaction mechanism 802. Likewise, the seller suitably provides the transaction mechanism 802 with suitable seller information for authentication purposes. The transaction mechanism 802 then performs suitable risk management analysis to determine whether the proposed transaction is associated with any credit and/or fraud risks. If the purchaser 804 has sufficient funds available to complete the transfer and if both the purchaser 804 and the seller 806 are authenticated (and assuming that the credit and fraud risk analyses do not result in a negative determination), then the transaction mechanism 802 suitably debits the purchaser's card or DDA by the amount of the purchase price as well as the cost of any selected value added services. The transaction mechanism 802 then sends a confirmation to the seller 806 that the purchaser's account has been debited. Preferably, the transaction amount then is suitably held in an escrow account maintained by the transaction mechanism, and once the shipping service 816 acquires the goods from the seller for shipment to the purchaser, the transaction mechanism 802 receives a tracking number from the shipping service 816. Depending upon the nature of the escrow, the transfer of funds to the seller's card or DDA will be delayed accordingly. For example, the escrow may be based upon a 3-day waiting period following notification to the transaction mechanism 802 of the receipt of the goods by the purchaser 804, which notification may be received directly from the purchaser 804 or from the shipping service 816. Accordingly, the transaction mechanism 802 disburses the appropriate funds to the seller's DDA (minus any transactional fee) at the seller's financial institution, which suitably credits the funds to the seller's financial account. If selected by either the purchaser or the seller, value-added services, such as purchaser's insurance and dispute resolution, may be provided as needed.

Exemplary Transaction Flow

As will be appreciated by one skilled in the art, the present invention admits of various aspects which may be implemented in any of several ways. FIGS. 9-20 illustrate the flow of an exemplary transaction implemented in accordance with particular aspects of the present invention. However, it should be understood that this transaction flow is exemplary only and is not intended to limit the scope of the present invention as described above.

Figure 9:
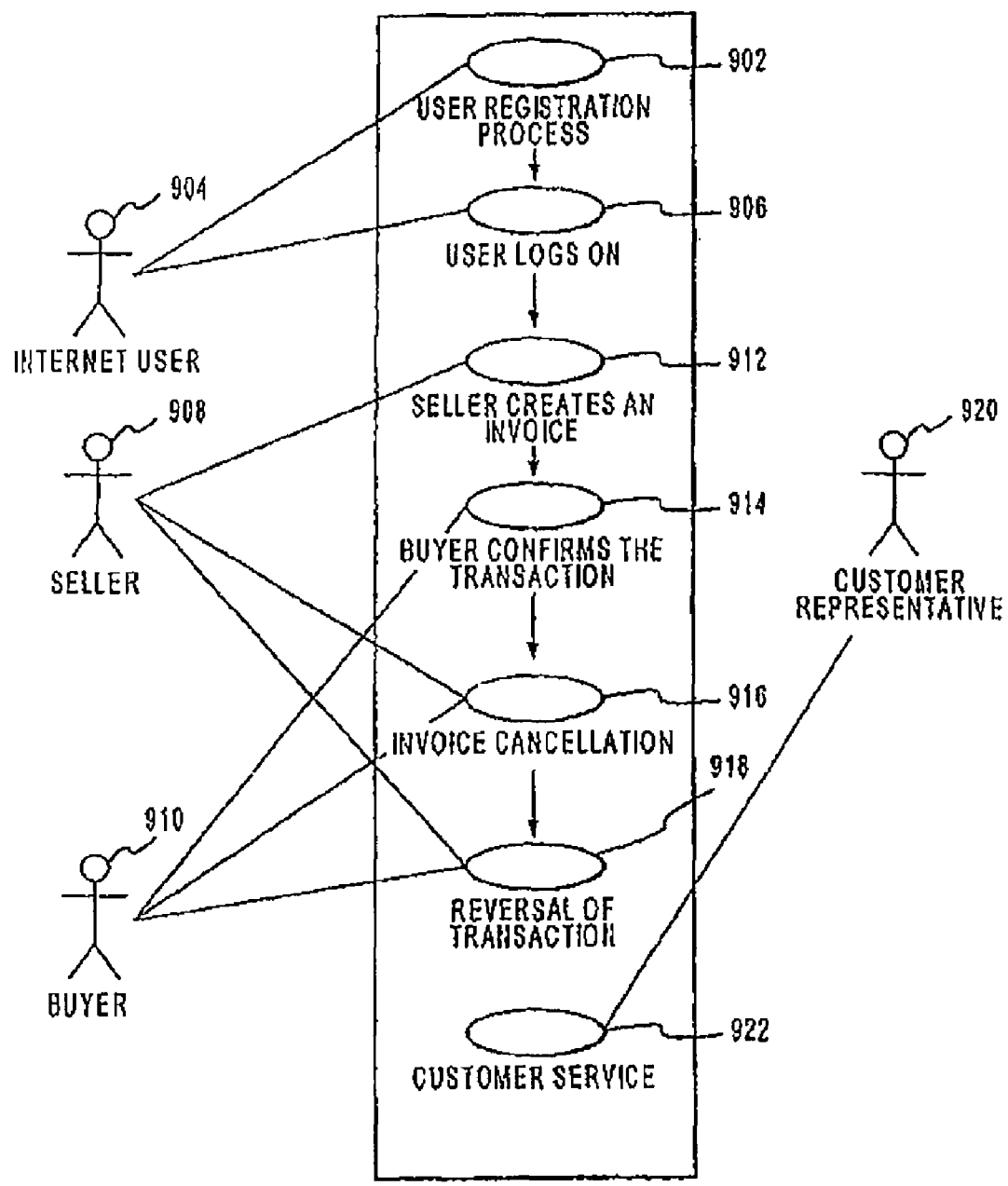
FIG. 9 is a schematic relational diagram associating exemplary actors and exemplary transaction processes in accordance with the present invention.
Figure 10:
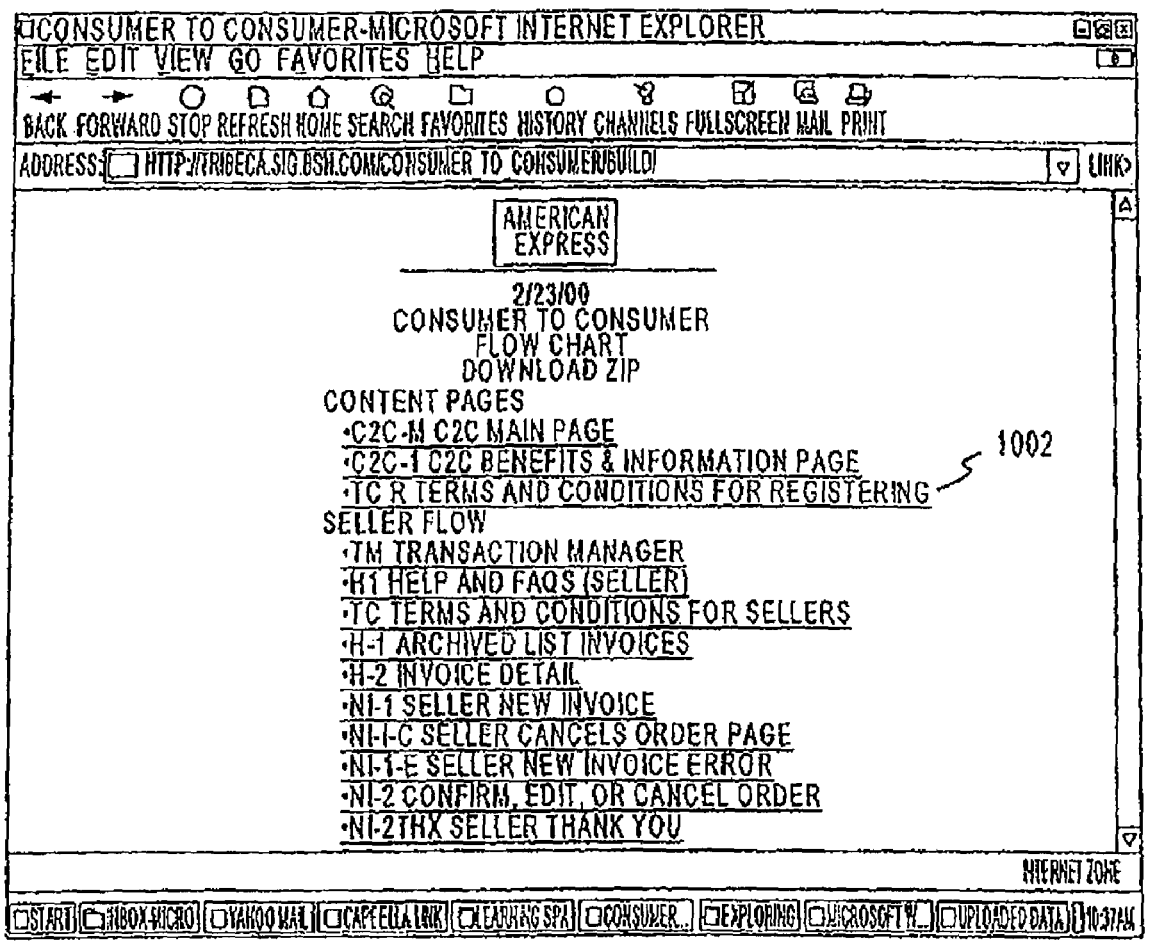
FIG. 10 is an exemplary interface for facilitating user registration with the transaction mechanism.
Figure 11:
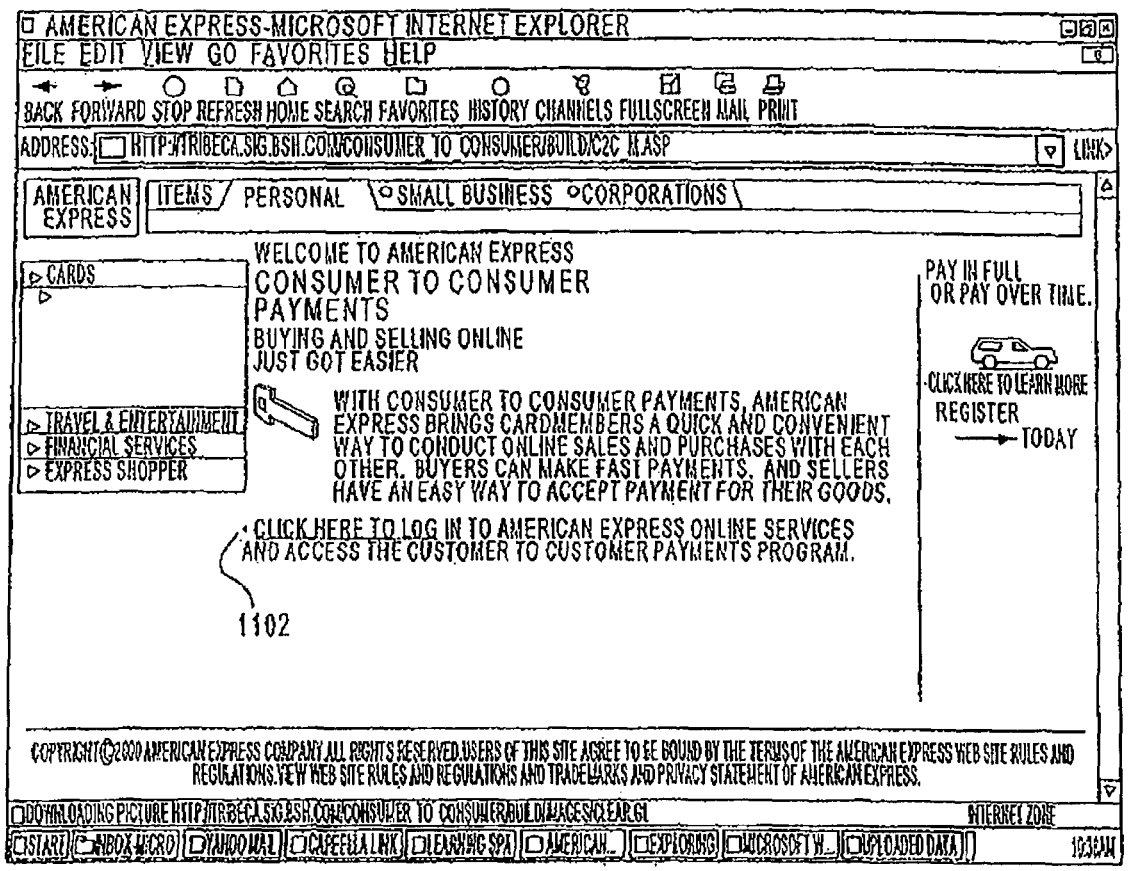
FIG. 11 is an exemplary interface for facilitating user login with the transaction mechanism.
Figure 12:
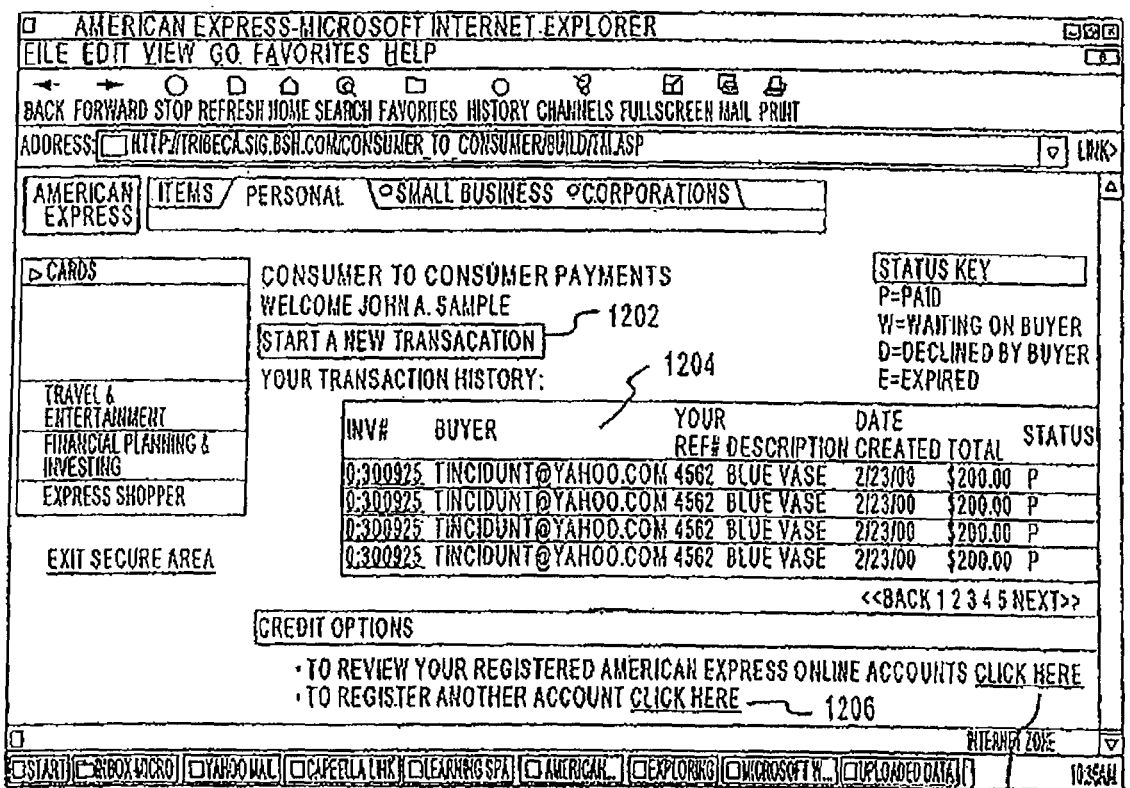
FIG. 12 is an exemplary interface for facilitating transaction initiation.

With reference to FIG. 9, an exemplary user registration process 902 begins when an individual 904, such as an Internet user, accesses the transaction mechanism and requests registration with the transaction mechanism. Internet user 904 may be either a potential purchaser or a potential seller. As illustrated in the exemplary interface of FIG. 10, an Internet user may suitably register with the transaction mechanism by activating hyperlink 1002, which activation preferably results in the display of the terms and conditions for registration and a request that an Internet user input suitable registration information, as described in greater detail above.

Once an Internet user 904 has registered with the transaction mechanism, the Internet user 904 may then suitably request to be logged into the transaction system, as represented by step 906 of FIG. 9. As illustrated in the exemplary transaction mechanism main page of FIG. 11, an Internet user may suitably request the login page by activating hyperlink 1102, which activation preferably results in the display of a login page having suitable datafields. The datafields may request any suitable login information from an Internet user.

Such login information may include, for example, a request for the Internet user's unique user identifier and a password or pass phrase. Once the Internet user submits the requested information, the Internet user is suitably logged into the transaction system. If the Internet user submits an invalid user identifier and/or password, an error message is suitably displayed, and the Internet user is requested to re-enter and re-submit the information. Once the Internet user is logged into the transaction system, the transaction system retrieves the list of registered card and DDA accounts held by the Internet user and displays a suitable interface, such as the exemplary interface of FIG. 12, which may provide any suitable means for either conveying information to or receiving information from the Internet user. As illustrated in the exemplary embodiment represented in FIG. 12, the transaction system preferably provides means for initiating a transaction, such as tab 1202 for example, and may suitably display the Internet user's transaction history, as represented by data table 1204. Suitable data access options, such as hyperlinks 1206 and 1208, may be provided to enable the Internet user to access any suitable information that may be provided by the transaction system, such as information pertaining to other registered financial accounts and/or means for registering additional financial accounts with the transaction mechanism.

With momentary reference to FIG. 9, in an exemplary embodiment, Internet user 904 may be either a seller 908 or a purchaser 910. If Internet user 904 is a seller 908 who is suitably registered and logged into the transaction system, the seller 908 may suitably initiate a transaction through the transaction mechanism. In an exemplary embodiment, there are preferably two aspects involved in a seller-initiated transaction. First, the seller 908 suitably creates a transaction invoice, as represented by step 912. Then, the purchaser 910 preferably confirms or accepts the transaction, as represented by step 914. Preferably, at any given point during the transaction, either the seller 908 or the purchaser 910 may either cancel (step 916) or reverse (step 918) the transaction. In the event that a purchaser 910 or a seller 908 experiences any difficulty with the transaction mechanism or if there is a dispute between the seller 908 and the purchaser 910, a customer service representative 920 associated with the third party entity which is providing the transaction mechanism may suitably provide any desired customer service and/or dispute resolution (step 922).

Figure 13:
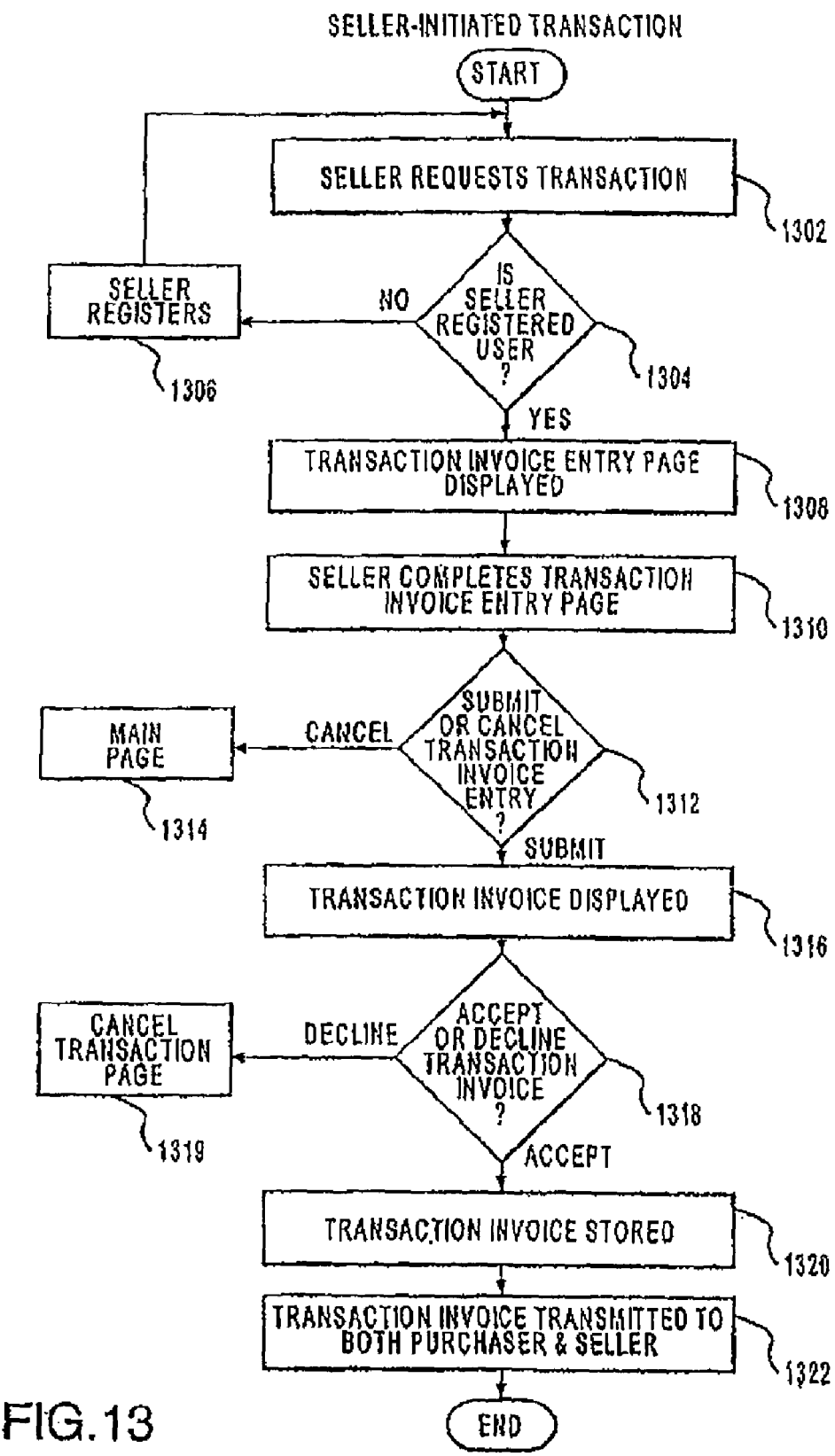
FIG. 13 is a flowchart representing an exemplary seller-initiated transaction.
Figure 14:
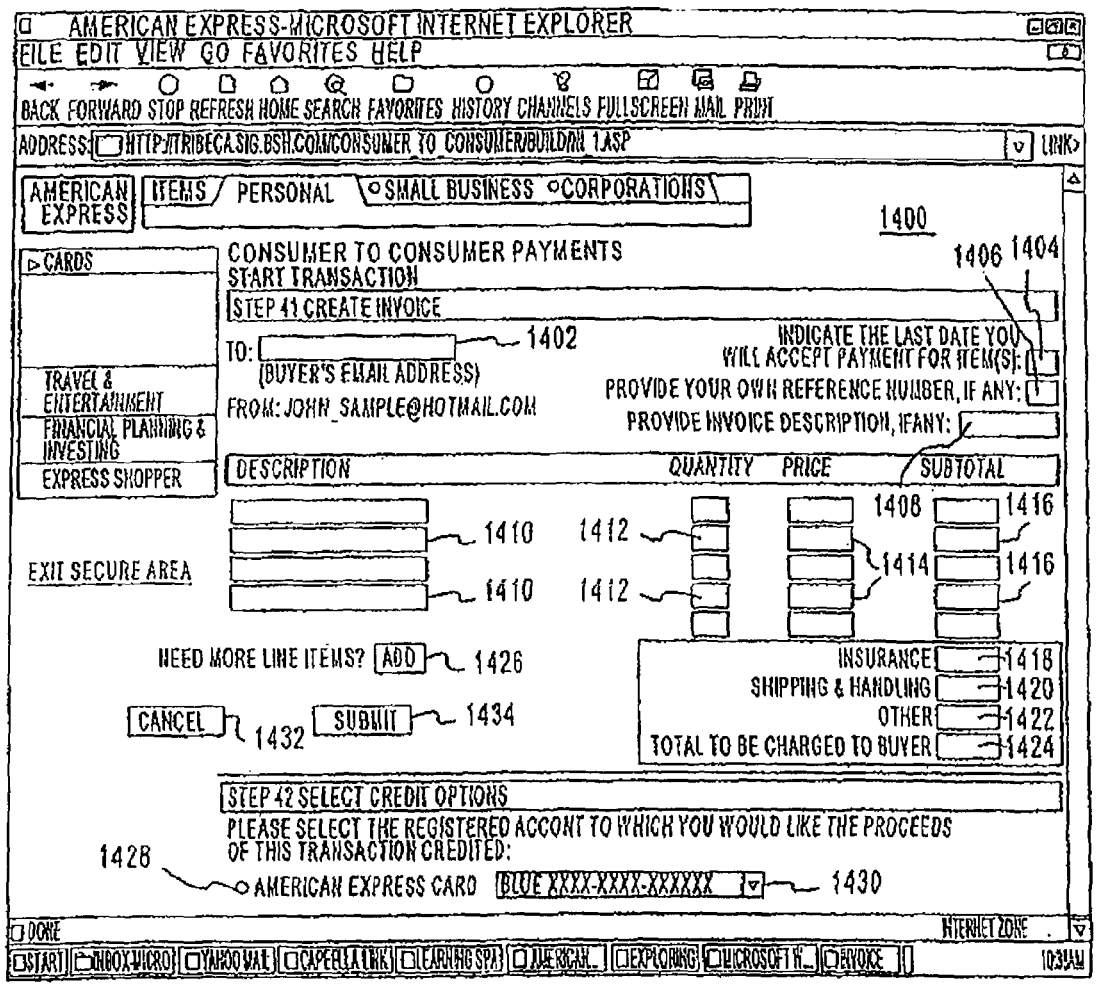
FIG. 14 is an exemplary interface for facilitating the entry of transaction information by a user.
Figure 15:
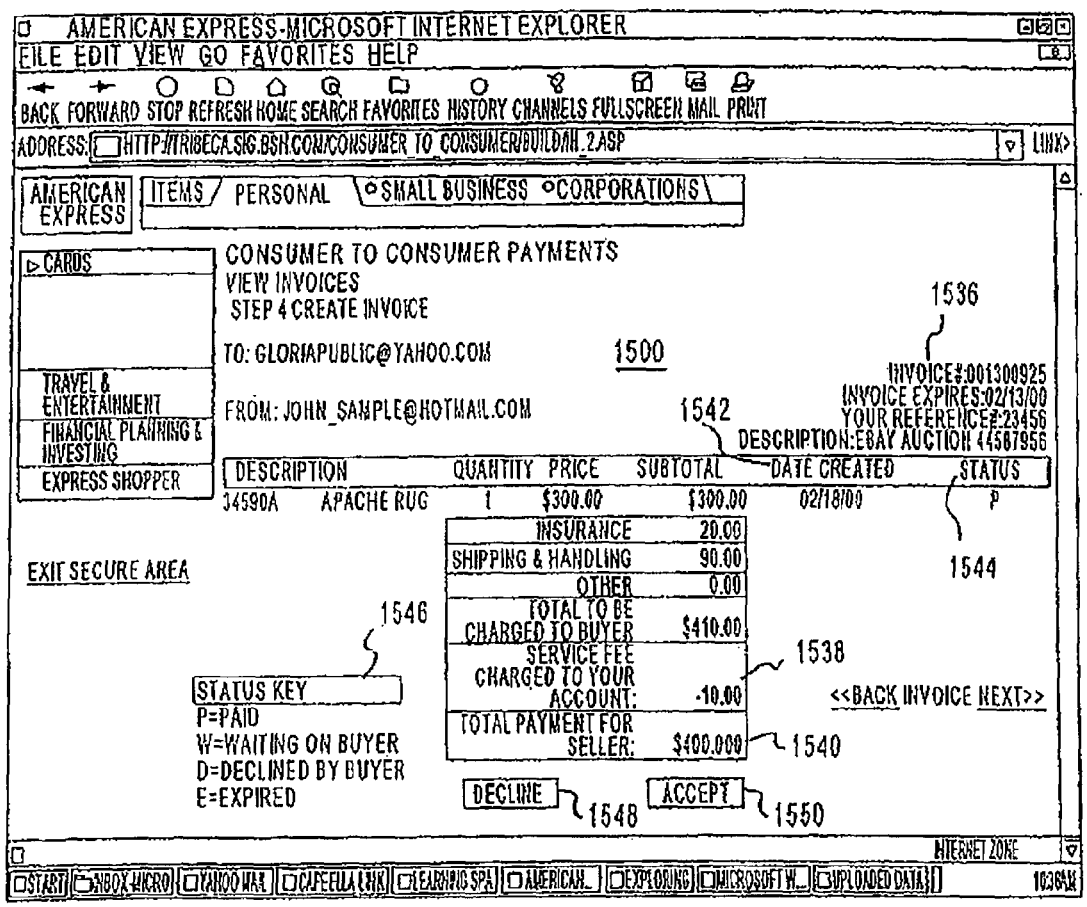
FIG. 15 is an exemplary interface depicting an exemplary transaction invoice.
Figure 16:
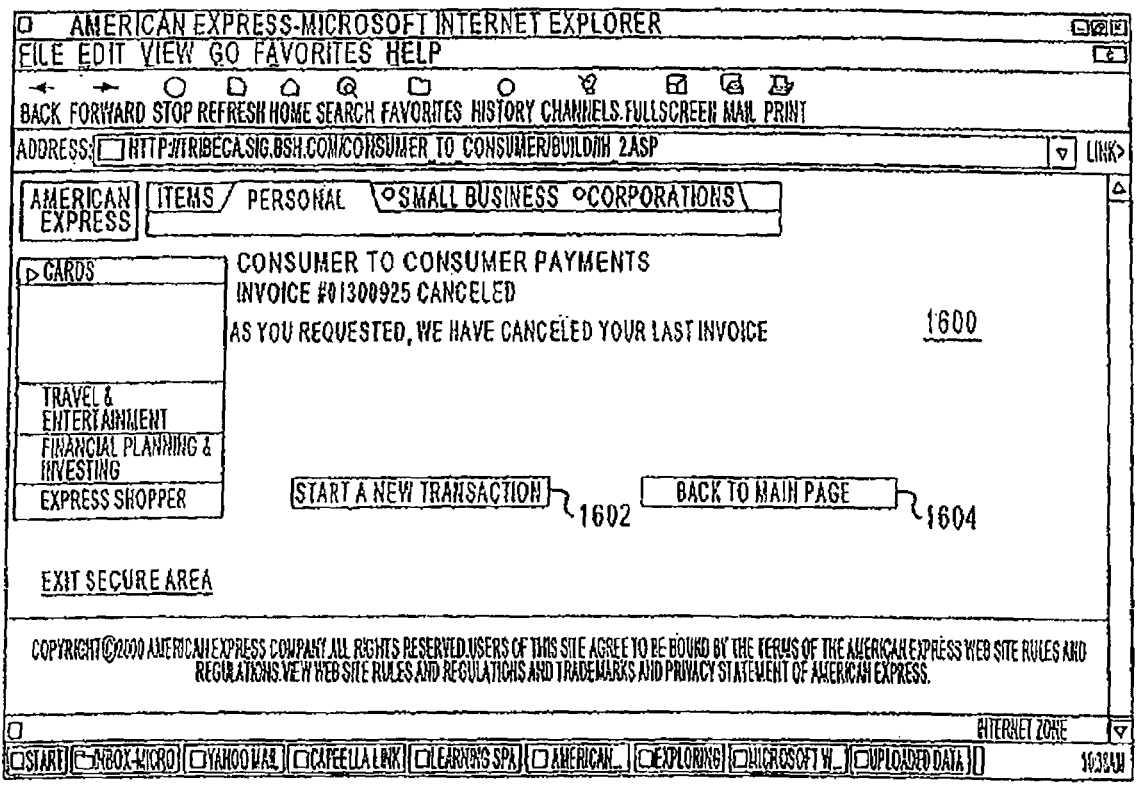
FIG. 16 is an exemplary interface for informing a user of the cancellation of a transaction.

FIG. 13 next illustrates an exemplary process for initiating a commercial transaction between a seller and a purchaser. In this exemplary embodiment, a seller-initiated transaction preferably begins when the seller submits a request to start a transaction, such as by activating tab 1202 of FIG. 12. Once the transaction mechanism receives the request, the transaction mechanism determines whether the seller is a registered user (step 1304). If the seller is not a registered user, the transaction mechanism provides a suitable registration interface (step 1306), such as described above with reference to FIG. 10. If the seller is a registered user, the transaction mechanism provides a suitable means for initiating the transaction (step 1308), such as by providing the exemplary interface of FIG. 14.

The seller then suitably provides the information requested by the transaction mechanism (step 1310). For example, the seller enters the appropriate information which may be requested by various transaction datafields provided by the transaction mechanism through a suitable user interface, such as the exemplary transaction invoice entry page 1400 of FIG. 14. The transaction datafields provided by a suitable transaction entry interface may include suitable datafields of any number or form, such as, for example, a datafield 1402 for a prospective purchaser's email address; a datafield 1404 indicating a final date for the acceptable transfer of funds to the seller; a datafield 1406 for indicating the seller's reference number; a datafield 1408 for a transaction description, such as the identification of any intermediary, like eBay, which may be involved in the transaction; datafields 1410 for a description of the particular items that will be the subject of the transaction; datafields 1412 for indicating the appropriate quantity of each item described in datafield 1410; datafields 1414 for indicating the appropriate price for each item described in datafield 1410; datafields 1416 for indicating the subtotal amount or extended price associated with the quantity and price for each item described in datafield 1410; a datafield 1418 for indicating a suitable cost for any desired value-added services, such as insurance, dispute resolution, postal tracking, or any other suitable value-added service; a datafield 1420 for indicating the cost associated with any shipping and handling charges; datafield 1422 for indicating any miscellaneous charges that may be associated with the transaction, such as any applicable taxes for example; and a datafield 1424 for indicating a total charge or total amount of funds to be transferred from the purchaser to the seller upon completion of the transaction. Additional information that may be requested from the Internet user may include the email address of the Internet user, any optional email message intended for the purchaser, and/or any other suitable information.

Additionally, a suitable transaction entry interface may include any number or form of tabs, such as tab 1426 which activates the creation of additional datafields 1410. The additional tab or tabs may be used by the seller to activate or implement any suitable function which may further facilitate the transaction between the seller and the purchaser. For example, transaction invoice entry page 1400 may also include an additional datafield, or tab for accessing an additional datafield, which may request that the seller provide suitable information regarding an escrow release event. Such escrow release event information may include a particular time period within which a purchaser may either accept or reject any items prior to the transfer of funds from the escrow account to the seller's account, such as a particular number of days after the purchaser receives goods, services, or other value from a suitable shipping agent.

In addition to entering the appropriate information which may be requested by the various transaction data fields provided by the transaction mechanism, the seller preferably is further requested to select a suitable financial account which will ultimately receive the funds transferred from the purchaser at the completion of the transaction. Preferably, the various options presented to the seller on the transaction entry interface reflect the financial account or accounts provided by the seller during the seller's registration with the transaction mechanism, as described above. The financial account selection options may include any suitable selection options which provide the transaction mechanism with the appropriate information. As illustrated in exemplary transaction invoice entry page 1400, financial account selection options may include selection options 1428 and 1430 which preferably indicate the type of financial account 1428, such as a credit card or a demand deposit account (DDA), and the financial account identifier 1430, such as a credit card number or a DDA number.

As one skilled in the art will appreciate, the above described transaction entry interface, as well as any or all other aspects of the present invention, may include any suitable form of encryption and/or other security measures either currently known or hereafter devised.

Once the seller completes a suitable transaction entry interface, the seller may either submit or cancel the transaction invoice entry (step 1312). If the seller cancels the transaction invoice entry, such as by activating tab 1432 of FIG. 14, the seller is returned to the transaction mechanism main page (step 1314), such as the exemplary transaction mechanism main page illustrated in FIG. 11. If the seller submits the transaction invoice entry page to the transaction mechanism by activating, for example, a suitable tab, such as tab 1432, or by pressing the enter key on a suitable input device, a transaction invoice is then displayed by the transaction mechanism (step 1316). The transaction invoice may include any suitable information entered by the seller on the transaction entry interface and any other relevant information, such as any transaction or service fees charged by the transaction mechanism. As illustrated in the exemplary transaction invoice 1500 of FIG. 15, such information may include any or all of the entries corresponding to the datafields described above with reference to FIG. 14. In addition, the transaction invoice may include an invoice number 1536 which may be automatically assigned by the transaction mechanism; an additional service fee amount 1538 which may be suitably deducted from the amount of funds transferred from the purchaser; a total amount 1540, net of fees, owed to the seller at the completion of the transaction; the date 1542 that the transaction invoice was created; and a status indicator 1544, which may include any suitable indicator of any suitable status that may be relevant to the transaction as of the display date of the transaction invoice, such as any of the exemplary status indicators illustrated beneath status key 1546 (i.e., paid, waiting on purchaser, declined by purchaser, and expired).

After the seller completes a review of the transaction invoice, the seller may either decline or accept the transaction invoice (step 1318). If the seller declines the transaction invoice, such as by suitably activating tab 1548 of FIG. 15 for example, a suitable transaction interface is displayed (step 1319), such as exemplary cancel transaction page 1600 of FIG. 16, which may provide suitable means, such as tabs 1602 and 1604, for either initiating a new transaction or returning to the transaction mechanism main page. If the seller accepts the transaction invoice, such as by suitably activating tab 1550 of FIG. 15 or pressing the enter key on a suitable input device for example, the transaction invoice is suitably stored by the transaction mechanism in a suitable storage device (step 1320). Then, the transaction invoice is preferably transmitted to both the purchaser and the seller by any suitable method, such as by email, facsimile, mail, and/or the like (step 1322). Preferably, the transaction invoice is transmitted via email to the respective email addresses of the purchaser and the seller.

Figure 17:
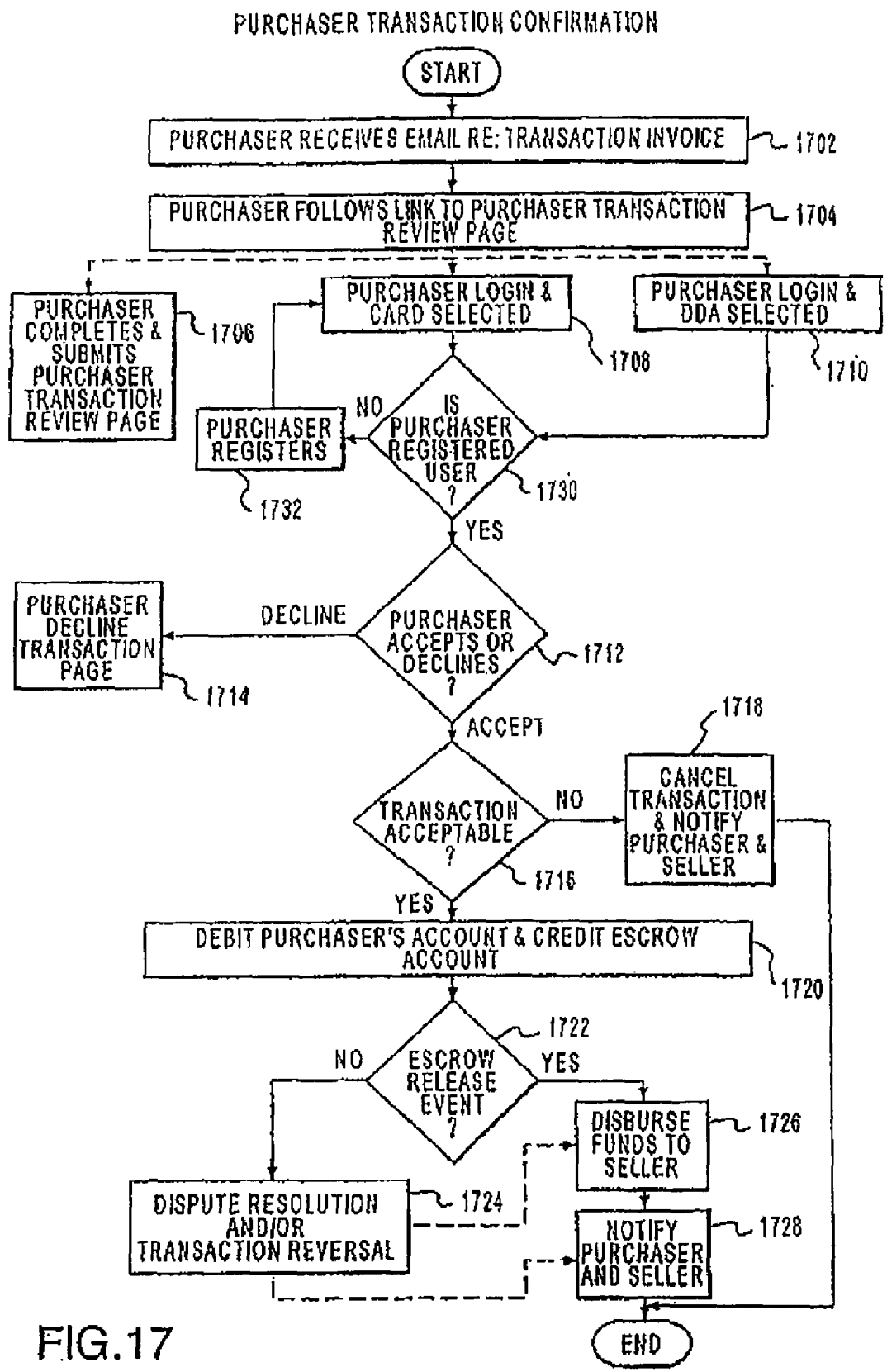
FIG. 17 is a flowchart representing an exemplary purchaser transaction confirmation.
Figure 18:
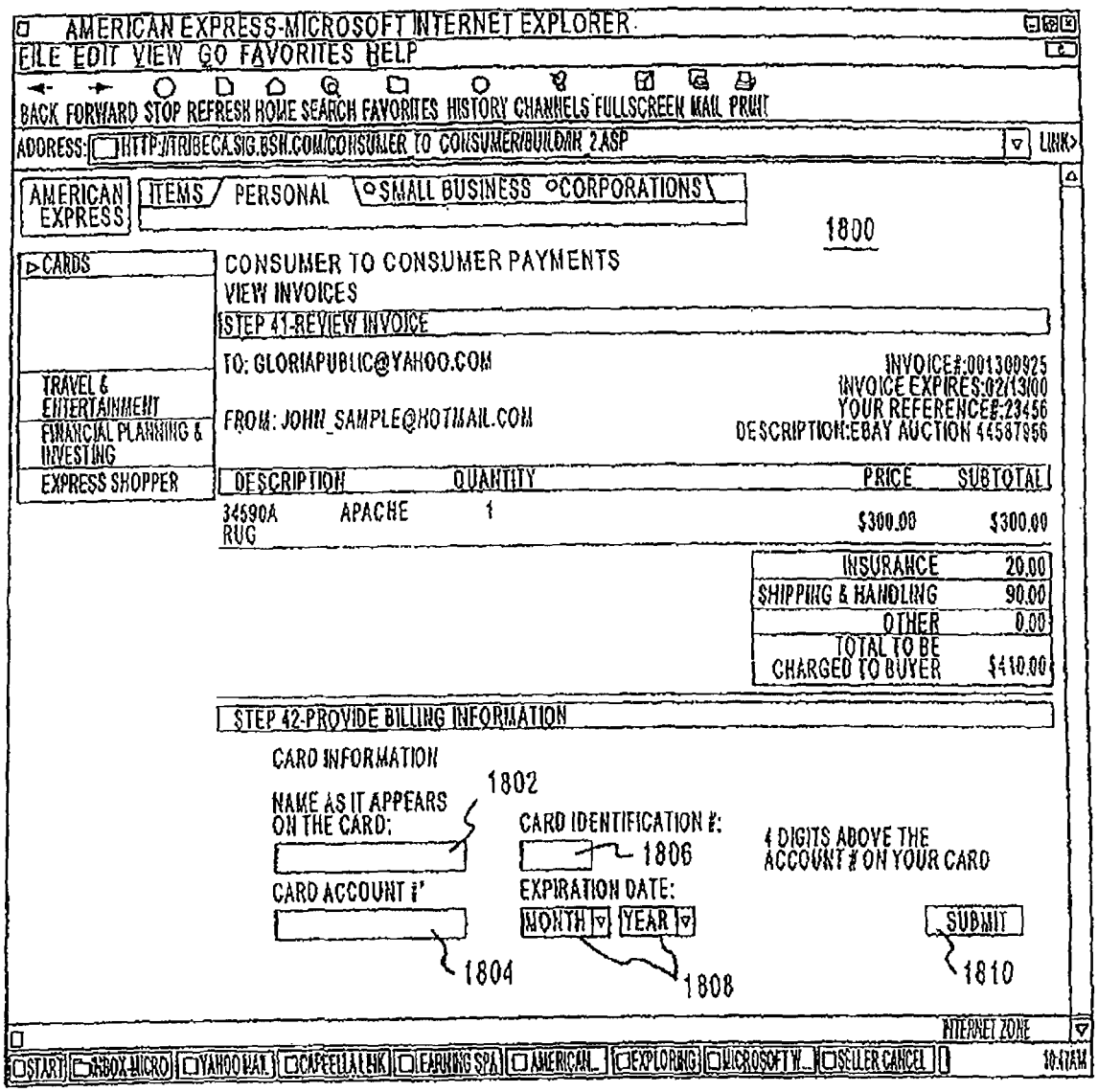
FIG. 18 is an exemplary interface for facilitating the entry of transaction information by a user.
Figure 20:
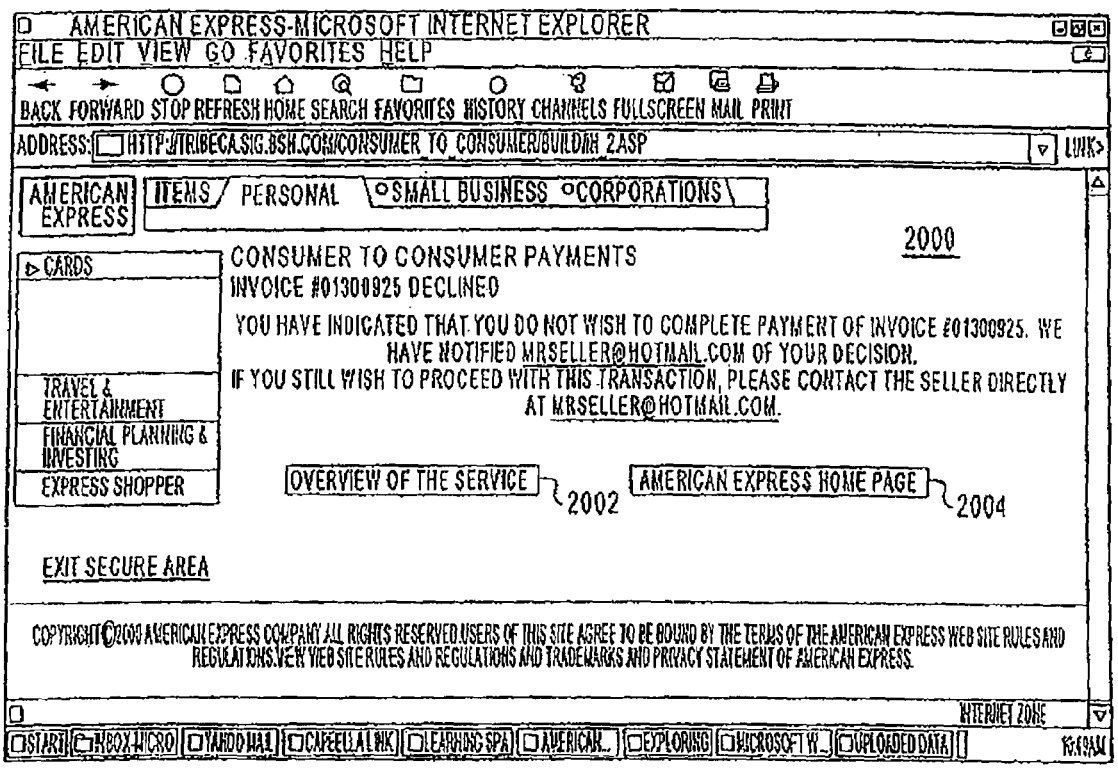
FIG. 20 is an exemplary interface for informing a user of the non-acceptance of a transaction.

Once the seller's transaction invoice is transmitted to the purchaser, the transaction may be suitably completed when the purchaser accepts the transaction. In the exemplary embodiment illustrated by the flowchart of FIG. 17, when the purchaser receives a transmission from the transaction mechanism regarding the transaction invoice (step 1702), such as an email transmission having a hyperlink to a suitable purchaser transaction interface, the purchaser may follow the link to the transaction interface (step 1704), such as the exemplary purchaser transaction review page 1800 of FIG. 18, to review the terms and conditions of the transaction as set forth by the seller. As illustrated in FIG. 17, a purchaser may accept a transaction by one of at least three methods, wherein the methods are indicated by phantom lines to represent the purchaser's optional courses of action. First, the purchaser may accept the transaction using a suitable card without logging into the transaction system (step 1706). Second, the purchaser may accept the transaction by suitably logging into the transaction system and selecting a suitable card to transfer funds to the seller (step 1708). Finally, the purchaser may accept the transaction by suitably logging into the transaction system and selecting a suitable DDA to transfer funds to the seller (step 1710).

In the first case, the purchaser accepts the transaction with a suitable card without logging into the transaction system. If the transaction terms and conditions are acceptable to the purchaser, the purchaser suitably completes the purchaser transaction review page (step 1706) by providing information regarding the purchaser's card to effect a suitable transfer of funds from the purchaser's card account to the financial account of the seller. As illustrated in exemplary purchaser transaction review page 1800 of FIG. 18, the purchaser enters the appropriate information which may be requested by various transaction datafields provided by the transaction mechanism on the purchaser transaction review page 1800. The transaction datafields provided by the purchaser transaction review page may include suitable datafields of any number or form, such as, for example, a datafield 1802 for the purchaser's name as it appears on the card; a datafield 1804 for indicating a card account number; a datafield 1806 for providing a card identification number, such as the four digits that are frequently printed on the card above the card number; and datafields 1808 for indicating the card's expiration date.

Additionally, purchaser transaction review page 1800 may include any number or form of additional tabs or datafields. The additional tabs or datafields may be used by the purchaser to implement any suitable function which may further facilitate the transaction between the seller and the purchaser. For example, purchaser transaction review page 1800 may also include an additional datafield, or tab for accessing an additional datafield, which may permit the purchaser to provide or modify information regarding an escrow release event. Such escrow release event information may include a particular time period within which a purchaser may either accept or reject any items prior to the transfer of funds from the escrow account to the seller's account, such as a particular number of days after the purchaser receives goods, services, or other value from a suitable shipping agent. If a purchaser modifies or adds information to the purchaser transaction review page, such as modifying or adding information regarding an escrow release event, the transaction flow as described herein preferably includes an additional communication or transmission of the transaction terms to the seller so that the seller is given a suitable opportunity to either accept or decline the modified terms and conditions of the transaction.

After the purchaser has suitably entered the requested information, the purchaser suitably submits the purchaser transaction review page to the transaction mechanism, such as by activating tab 1810 or pressing the enter key on a suitable input device for example. Once the purchaser's card information profile has been completed and the purchaser transaction review page is submitted, the transaction mechanism displays a suitable transaction invoice, such as exemplary purchaser transaction invoice 1900 of FIGS. 19A and 19B. At this point, the purchaser may either accept or decline the transaction (step 1712). If the purchaser declines the transaction, such as by suitably activating tab 1902 of exemplary purchaser transaction invoice 1900, a suitable interface is displayed (step 1714), such as exemplary purchaser decline transaction page 2000 of FIG. 20, which may provide any suitable information or means for acquiring information, such as tabs 2002 and 2004.

If the purchaser accepts the transaction, the transaction mechanism performs a suitable card authorization/authentication routine, which may include suitable credit risk and fraud risk analyses (step 1716). If the transaction is unacceptable, either due to a potential fraud risk or a credit risk, the transaction mechanism cancels the transaction and suitably notifies, such as by email, both the purchaser and the seller (step 1718). If the transaction is acceptable, the transaction mechanism suitably debits the purchaser's account. Preferably, the transaction mechanism then credits an appropriate escrow account (step 1720), pending notification by either the purchaser and/or a shipping agent that any defined escrow release event has transpired (step 1722). If the defined escrow release event transpires, the transaction mechanism suitably disburses the appropriate funds to the seller's financial account (step 1726) and notifies both the purchaser and the seller that the transaction has been completed (step 1728). However, if an escrow release event has been defined during the transaction by either the transacting parties or a suitable third party and the escrow release event is not satisfied, the transaction mechanism either reverses the transaction, such as by performing a suitable chargeback or some other suitable transaction reversal procedure, or follows a suitable dispute resolution protocol, as described above (step 1724). As illustrated in phantom lines in order to represent alternative process flows, if any dispute between the parties is favorably resolved, suitable funds may be disbursed to the seller (step 1726) and the parties may be notified of the completion of the transaction (step 1728). However, if any dispute is not favorably resolved, or if the most appropriate resolution is cancellation of the transaction, the transaction is suitably terminated or otherwise reversed, and the purchaser and seller are suitably notified of the termination and/or reversal of the transaction (step 1728).

In the second case, the purchaser accepts the transaction by logging into the transaction system and selecting the option of transferring funds to the seller from the purchaser's card (step 1708). Alternatively, the purchaser accepts the transaction by logging into the transaction system and selecting the option of transferring funds to the seller from the purchaser's DDA (step 1710). In either of these situations, the transaction mechanism suitably processes the purchaser's login request and determines whether the purchaser is a registered user (step 1730). If the purchaser is not a registered user, the transaction mechanism provides a suitable registration interface (step 1732), such as described above with reference to FIG. 10. If the purchaser is a registered user, the transaction mechanism then performs steps 1712 through 1728, as described above.

Although the foregoing describes an exemplary seller-initiated transaction, one skilled in the art will appreciate that the present invention is not so limited and may be readily implemented by means of any suitable purchaser-initiated transaction or, alternatively, any suitable third-party-initiated transaction, such as an intermediary-initiated transaction.

Exemplary Transaction Mechanism

Figure 21:
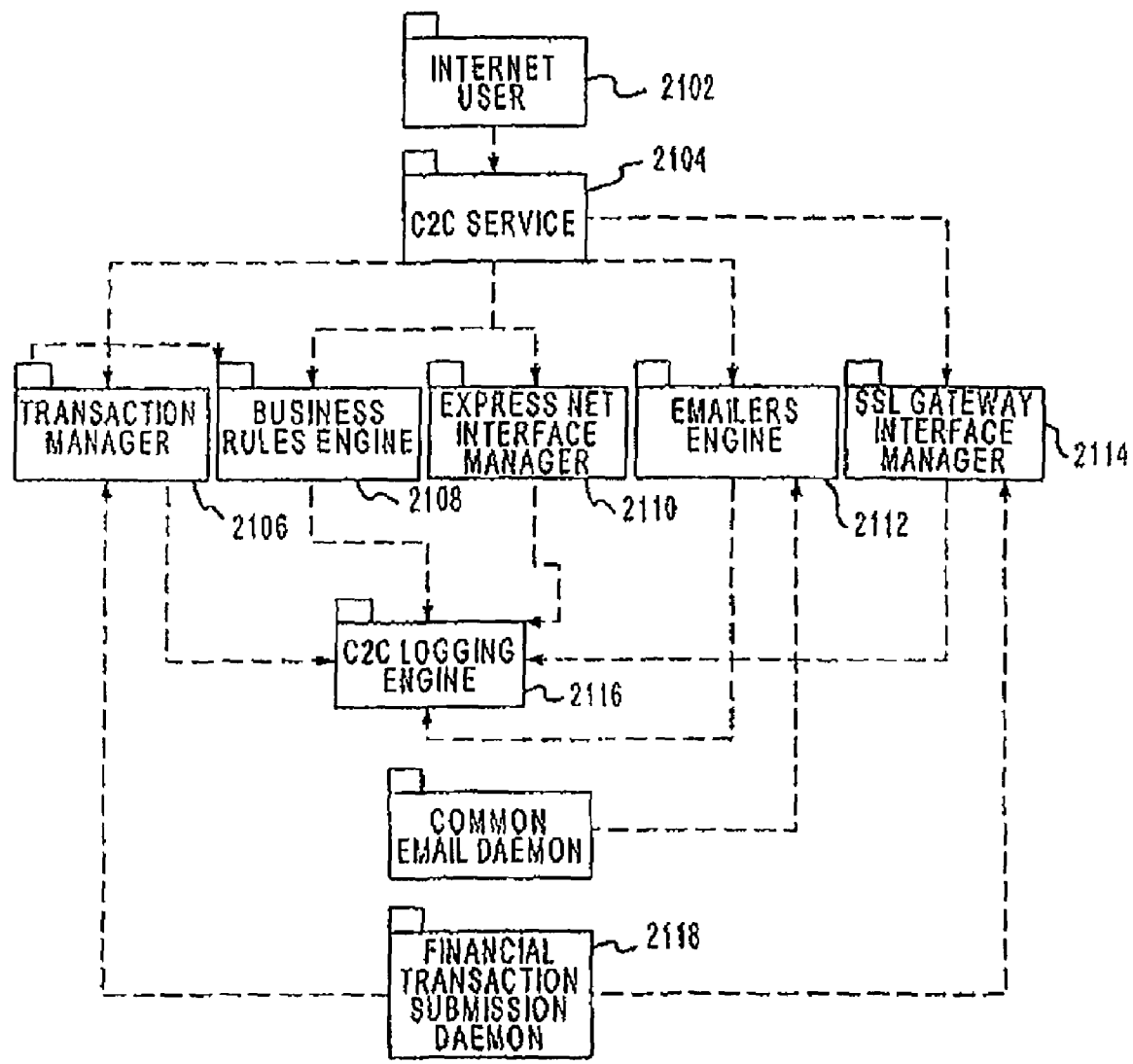
FIG. 21 illustrates an exemplary transaction mechanism in accordance with various aspects of the present invention.

As one skilled in the art will appreciate, the transaction mechanism of the present invention may be suitably configured in any of several ways. It should be understood that the transaction mechanism described herein with reference to FIG. 21 is but one exemplary embodiment of the invention and is not intended to limit the scope of the invention as described above. FIG. 21 illustrates an exemplary transaction mechanism 2100 comprising a C2C Service 2104; a Transaction Manager 2106; a Business Rules Engine 2108; an Express Net Interface Manager 2110; an eMailers Engine 2112; an SSL Gateway Interface Manager 2114; a C2C Logging Engine 2116; and a Financial Transaction Submission Daemon 2118.

The C2C Service 2104 suitably processes initial transaction requests from Internet users 2102. Exemplary processes performed by the C2C Service 2104 include requesting transaction information, such as card and/or DDA information, from an Internet user 2102 who has logged into the transaction system; validating the data entered by an Internet user 2102; and submitting a completed transaction invoice to the Transaction Manager 2106. The C2C Service 2104 communicates with the other components of the system through any suitable communications link, including a network connection such as an Intranet, extranet, and/or the like.

The Transaction Manager 2106 performs a variety of processes which facilitate a transaction between a seller and a purchaser. These processes may include creating transaction invoices and managing them, including updating a particular transaction invoice at the various stages of the transaction process; sending emails to sellers and purchasers using the E-Mailers Engine 2112; and processing requests from the Virtual Point of Sale (VPOS) Capture Daemon for transactions which are eligible for submission to the financial capture systems, as described in greater detail below.

The Business Rules Engine 2108 preferably provides access to a variety of operating standards that may be applied to any given transaction between a seller and a purchaser. The applicable operating standards may include, but are not limited to, any of the following: (1) given a transaction type and a transaction, Business Rules Engine 2108 may return a suitable pricing model to be applied to the transaction; (2) Business Rules Engine 2108 may compute a transaction fee based upon a certain number of basis points, which preferably is a configurable parameter generated from a suitable fee table (for example, one basis point=0.01%, so 375 bp=3.75% of the total price of the transaction); (3) Business Rules Engine 2108 may apply a flat transaction fee; and/or (4) given a transaction and a transaction type, Business Rules Engine 2108 may apply a fraud model to the transaction, wherein the exemplary fraud model may include any of the following: (a) authorization for the purchaser's part in the transaction, including billing address verification and 4DBC verification of the purchaser; (b) verification of a lack of any relationship between the purchaser and the seller, wherein all transactions showing a relationship (such as "self" or other personal relationship) between the purchaser and the seller may be "failed" or otherwise terminated; (c) application of a 3-strike rule, wherein the transaction is failed or terminated if a 3rd attempt to authorize the transaction fails and an email is sent to the seller providing an explanation for the cancellation of the transaction; and (d) verification that the transaction amount has not exceeded any prescribed limits, such as a limit on the transaction amount and/or a limit regarding the maximum number of transactions that may be conducted between a first party and any other party during some defined period of time (such as per day, per week, per month, etc.). Preferably, any applicable transaction limits are provided as configurable parameters by the Business Rules Engine 2108.

In the case of both verification of the purchaser's billing address and verification of purchaser/seller non-relationship, a 'system not available' response is possible, in which case the Business Rules Engine 2108 may recommend either a time-out or that the transaction be terminated.

Preferably, the non-relationship verification is the first process sent to the credit authorizations system (CAS) from the transaction mechanism 2100, since the data for this process preferably is contained within the CAS rather than a separate cardmember system (IMS, Triumph). The CAS is an online system which analyzes charge requests and either approves the charge requests or refers them to an Authorizer for a decision. CAS preferably contains a negative file, a delinquency file, and an accumulative file. If the purchaser and seller pass the non-relationship verification, then an authorization request (with AAV and 4DBC) is sent. The authorization request preferably involves CAS accessing a suitable cardmember system to verify the billing address.

The Express Net Interface Manager 2110 communicates with the Express Net, the utility which processes user registration and manages the accounts of registered users. The Express Net Interface Manager 2110 accesses the Express Net and acquires any suitable user data which may be desired to process a particular pending transaction. Preferably, the Express Net Interface Manager 2110 acquires a list of the Internet user's registered cards and/or DDAs as well as other unique data pertaining to the Internet user 2102, wherein the exemplary information may be used to process the transaction.

The eMailers Engine 2112 preferably sends suitable email notifications and/or confirmations to both the seller and the purchaser in the case of either a merchandise transaction or a transfer of funds. For example, the eMailers Engine 2112 may send an email comprising a notification which may: (1) notify a purchaser, preferably with an encrypted URL, of a transaction or funds transfer initiated by a seller and provide suitable means for the purchaser either to accept or decline the transaction or funds transfer; (2) copy the seller on the notification sent to the purchaser; and/or (3) indicate to both a seller and a purchaser that the purchaser has either accepted or declined a transaction or transfer of funds.

The SSL Gateway Interface Manager 2114 preferably communicates with the SSL Gateway, which preferably includes a Payment Gateway Client Class and a CAS Authentication Component. The SSL Gateway is a message and file distribution system which accepts authorization requests online and distributes those authorization requests to a proper payment system. The Payment Gateway Client Class preferably processes all of the protocol and transport level responsibilities that are or may be used for communicating with the Payment Gateway Server, which operates as a part of the SSL Gateway. Preferably, the defined protocols include the addition of a MIME header to all XML messages sent to the payment gateway and the use of TCP/IP sockets for communication with the Payment Gateway. The CAS Authentication Component preferably is responsible for performing the CAS financial authorization processes (ISO8583) as well as performing the CAS non-relationship verification processes based upon the new ISO message.

The C2C Logging Engine 2116 preferably audits and error logs all events in the transaction system 2100. Preferably, the C2C Logging Engine 2116 logs errors in the transaction system 2100 into a flat file. Preferably, the CA Unicenter agent for production support uses this flat file.

Figure 22:
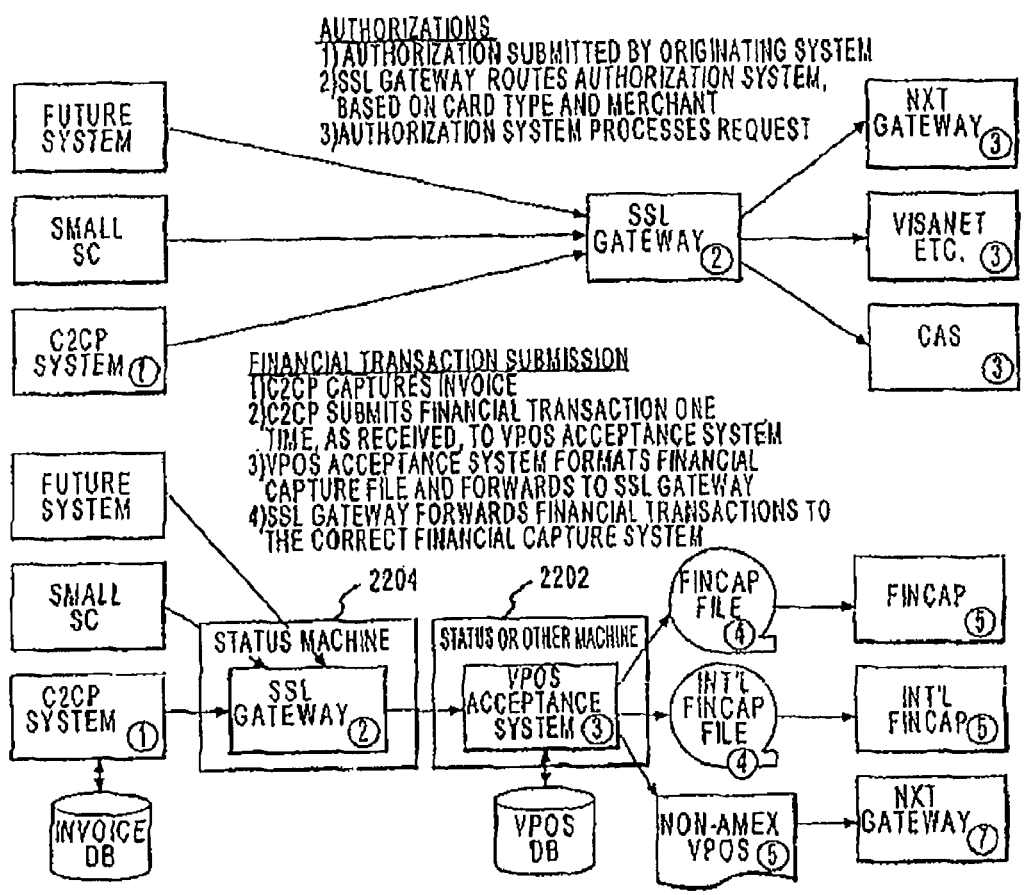
FIG. 22 represents an exemplary system for processing the submission of financial transactions.

The Financial Transaction Submission Daemon 2118 preferably submits each transaction's financial transaction record, such as a credit and/or debit Virtual Point of Sale (VPOS) record that results from a particular card to card or card to DDA transaction, to a VPOS Acceptance System 2202 via the SSL Gateway 2204, as better seen in FIG. 22. Preferably, each individual financial transaction record is submitted to the VPOS Acceptance System as it is received, without being processed as part of a batch file. The VPOS Acceptance System receives the financial transaction record, formats the financial capture file, and forwards the financial capture file to the SSL Gateway. The SSL Gateway then forwards the financial capture file to the appropriate financial capture system. The submission of the financial transaction record preferably is based upon a message-based protocol that is implemented by the VPOS Acceptance System.

Figure 23:
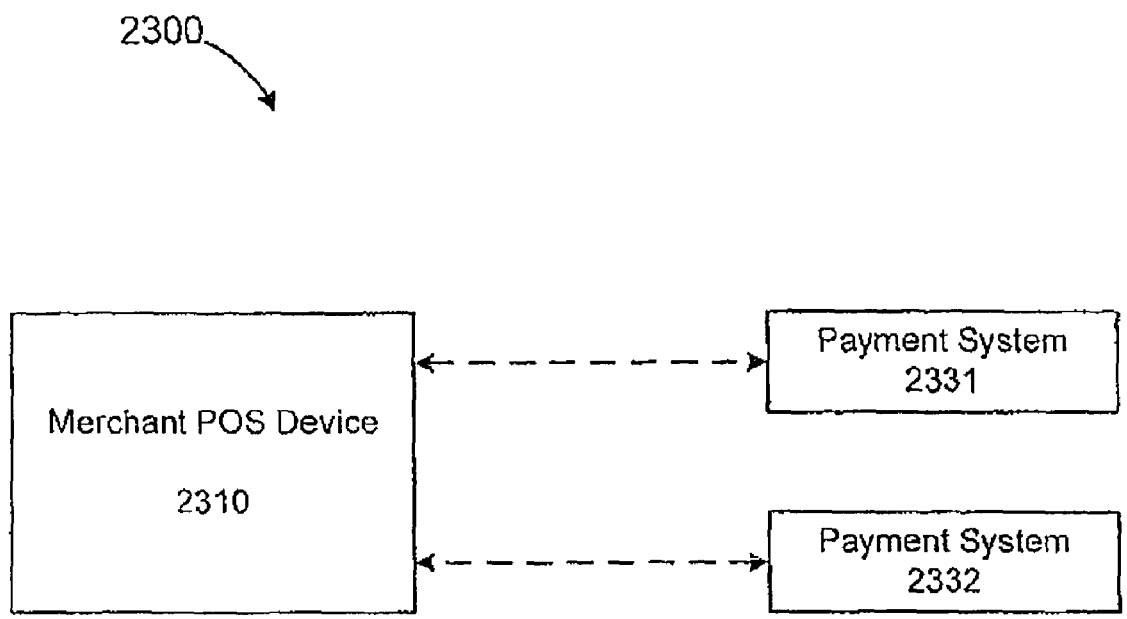
FIG. 23 is a block diagram illustrating an exemplary system to facilitate purchasing an item using one or more payment systems.
Figure 24:
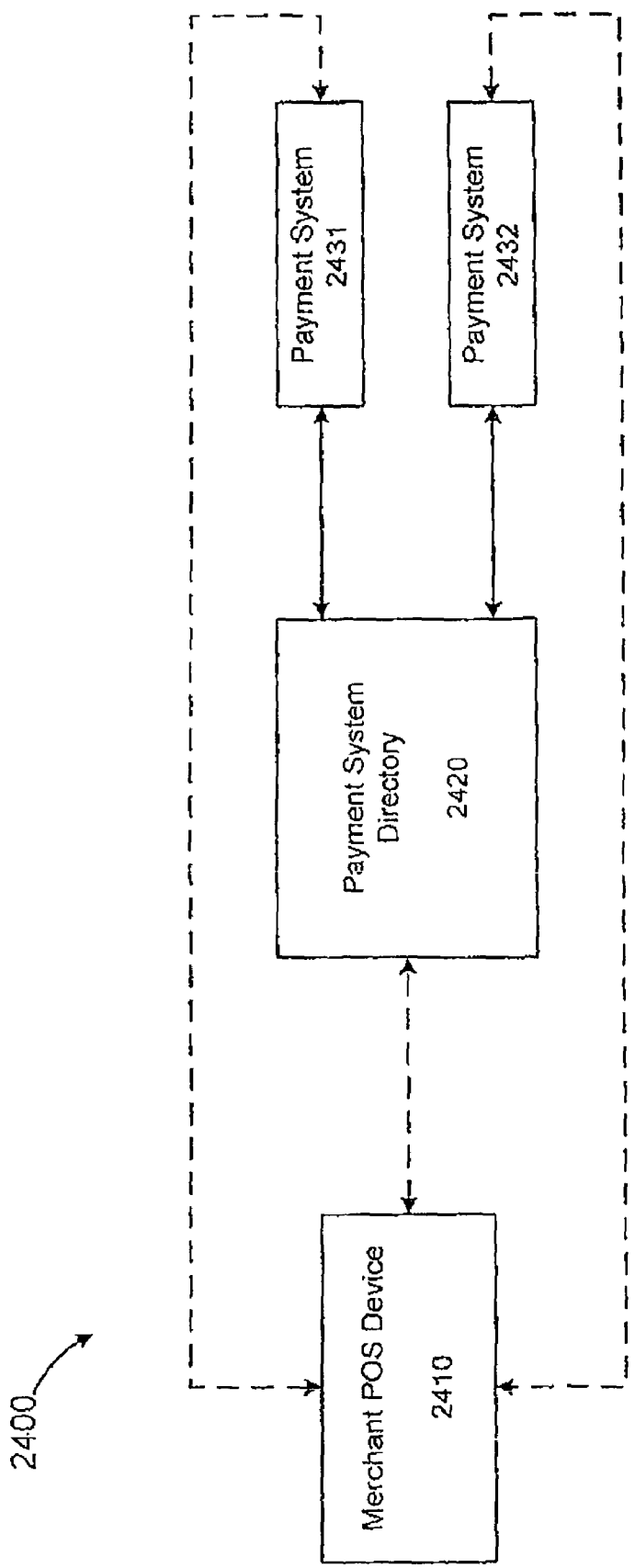
FIG. 24 is a block diagram illustrating an exemplary system to facilitate purchasing an item using a payment system directory.
Figure 25:
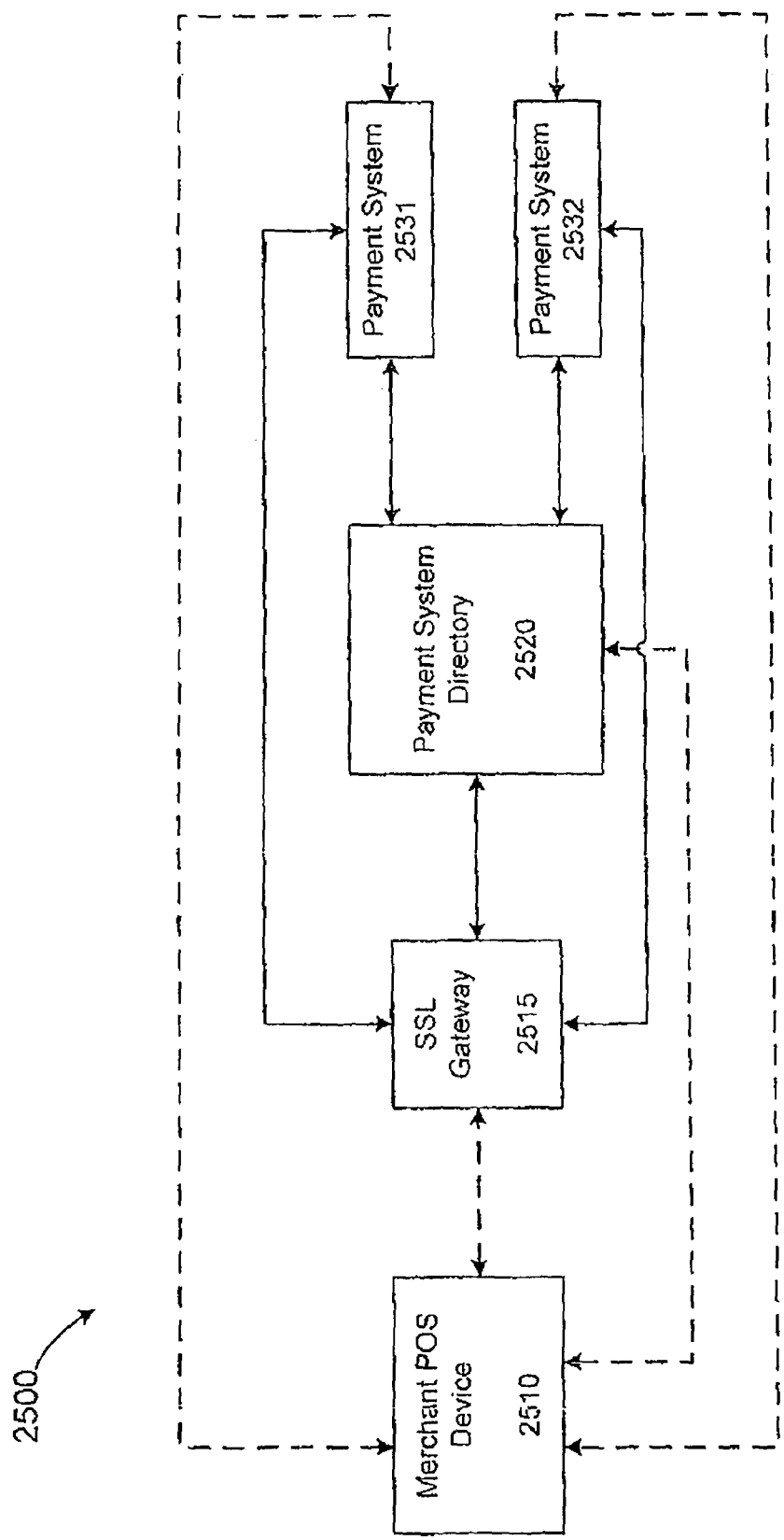
FIG. 25 is a block diagram illustrating an exemplary system to facilitate purchasing an item using a payment system directory and a gateway.

FIGS. 23-25 illustrate exemplary systems to facilitate a commercial transaction. The transaction may be conducted at a geographically remote location and/or may include locating and using payment systems. It should be noted that in FIGS. 23-25, any of the communications between components may include wireless communication or non-wireless communication. In an exemplary embodiment, the solid lines represent wired communications and the dashed lines represent wireless communications. As used herein, wireless may include stationary or mobile devices. With reference to FIG. 23, in an exemplary embodiment, system 2300 may include a POS device 2310 associated with a merchant.

POS device 2310, in exemplary embodiments, may include any device capable of receiving transaction account or instrument (e.g., a credit card, debit card, charge card, smart card, RFID, etc.) information, transmitting a request for payment authorization (e.g., from a geographically remote location), receiving payment authorization (e.g., at a geographically remote location), storing a payment system directory, and/or storing and executing a logic module. For example, POS device 2310 may be: a computing device comprising a memory, a processor, an input interface and output interface; a kiosk; a personal digital assistant (PDA); a handheld computer (e.g., a Palm Pilot®, a BlackBerry®, etc.); a cellular phone; a mobile device, a magstripe reader; and/or the like. In an exemplary embodiment, POS device 2310 may be a wireless POS device. For example, POS device 2310 may be configured to transmit and/or receive information utilizing radio frequency (RF) signals, Bluetooth® technology, optical signals, microwave signals, satellite signals, and/or any other signal capable of wirelessly transmitting a payment authorization request and/or wirelessly receiving payment authorization.

System 2300, in an exemplary embodiment, may also include a payment system 2331 configured to communicate with POS device 2310 to receive a payment authorization request, process the request, and transmit partial or full payment authorization similar to payment systems discussed above. Payment system 2331, in exemplary embodiments, may be configured such that payment system 2331 is wirelessly compatible with POS device 2310. In other words, payment system 2331 and POS device 2310 may include at least one similar wireless communication system, device, interface, method and/or protocol by which to communicate with one another. In these exemplary embodiments, payment system 2331 may be capable of receiving wireless communication signals (e.g., wireless requests for payment authorization) from POS device 2310, and particularly, while POS device 2310 is located at the remote location.

In one embodiment, system 2300 may also include one or more additional payment systems (e.g., payment system 2332) configured similar to payment system 2331. In these embodiments, the additional payment system(s) is also configured to communicate with POS device 2310 similar to payment system 2331 discussed above.

In an exemplary embodiment, and with respect to FIG. 24, POS device 2410 may be configured to communicate with payment system directory 2420 and/or payment system 2431 and/or payment system 2432 via, for example, the Internet and/or other network known in the art or described herein. System 2400 may include a POS device 2410 configured similar to POS device 2310 discussed above. Similarly, system 2400, in one exemplary embodiment, may include a payment system 2431 which may be configured similar to payment system 2331 discussed above.

In exemplary embodiments, payment system directory 2420 may be configured with a similar wireless communication protocol as POS device 2410. For example, payment system directory 2420 may be capable of receiving wireless communication signals (e.g., wireless requests to locate at least one payment system and/or wireless requests for payment authorization) from POS device 2410 while POS device 2410 is located at the remote location. In addition, payment system directory 2420 may be configured to contain information pertaining to multiple candidate payment systems (e.g., payment systems 2431 and 2432) for the transaction.

In an embodiment, POS device 2410 may comprise payment system directory 2420; e.g., POS device and payment system directory 2420 may be embodied in one physical device, embodied as software and data in the same memory element, or embodied as software and data in separate memory elements and logically or physically connected to each other. In one embodiment, payment system directory 2420 comprises a payment directory computer capable of accessing one or more payment directories. In various embodiments, payment system directory 2420 which may be geographically dispersed and may be provided by a third party. In various embodiments, transaction, request, and directory data, rules and logic may be cached, copied, stored, mirrored, synchronized or reconciled by POS device 2410 or a transaction device.

Payment system directory 2420 (and gateway 2515 as discussed below) may contain algorithms and/or rules to enable payment system directory 2420 to choose a payment system based upon payment information (e.g., transaction amount), information related to the type of transaction (e.g., individual to merchant transactions, merchant to merchant transactions, etc.), the transaction instrument issuer (e.g., American Express) and/or any other criteria (e.g., related to the consumer, merchant, issuer, acquirer, network, POS device, etc).

Payment system directory 2420 may be in communication with at least one payment system 2431. Payment system 2431 may be configured with a similar wireless communication protocol, interface, device or system as payment system directory 2420 and POS device 2410. In other words, payment system 2431 and POS device 2410, may include at least one similar wireless communication means by which to communicate with one another. Similarly, payment system 2431 and payment system directory 2420 may include at least one similar wireless communication protocol by which to communicate with one another, however, payment system 2431 and payment system directory 2420 may also include non-wireless systems and protocols by which to communicate with one another.

System 2500, in an exemplary embodiment and with respect to FIG. 25, may include a Gateway 2515 (e.g., SSL gateway) configured to communicate with payment POS device 2510 while POS device 2510 is located at the remote location. In addition, SSL Gateway 2515, in exemplary embodiments, may be configured to communicate with payment system directory 2520 and various payments systems (e.g., payment system 2531 and/or payment system 2532). System 2500 may also include a POS device 2510 configured similar to POS devices 2410 and 2310 discussed above. Likewise, system 2500 may include a payment system directory 2520 configured similar to payment system directory 2420 discussed above. Furthermore, in one embodiment, system 2500 may include one or more payment systems (e.g., payment system 2531 and/or payment system 2532), wherein each payment system may be configured similar to payment systems 2331, 2332, 2431 and/or 2432 discussed above.

SSL Gateway 2515 may be similar to SSL Gateway embodiments discussed above, and/or may be configured to receive requests to locate a payment system directory (e.g., payment system directory 2520), to locate such a payment system directory, to receive requests to locate a payment system (e.g., payment system 2531) and/or to locate such a payment system. SSL Gateway 2515 may be configured to communicate with POS device 2510, payment system directory 2520, payment system 2531, and/or payment system 2532 via, for example, the Internet and/or any other network known in the art or discussed herein. SSL Gateway 2515 may also be configured such that SSL Gateway 2515 is wirelessly compatible with POS device 2510. In other words, SSL Gateway 2515 and POS device 2510 may include at least one similar wireless communication protocol by which to communicate with one another. SSL Gateway 2515 may be configured to receive wireless communication signals (e.g., wireless requests to locate at least one payment system directory and/or wireless requests to locate at least one payment system) from POS device 2510 while POS device 2510 is located at the remote location. As used herein, similar wireless communication protocols may include similar wireless systems, methods, or interfaces, and/or conversion techniques to convert dissimilar protocols, etc. Moreover, any of the components may communicate with each other via wired or wireless systems and/or protocols.

SSL Gateway 2515 may be configured to locate and/or request payment authorization from at least one payment system (e.g., payment system 2531) and/or facilitate communication between POS device 2510 and at least one payment system (e.g., payment system 2531), which may be similar to payment system directory embodiments (e.g., payment system directories 2520 and 2420) discussed above. In these exemplary embodiments, SSL Gateway 2515 may communicate directly with one or more payment systems without utilizing a payment system directory.

Commercial transactions may be conducted at the customer's home or business such that, for example, pizza, groceries, supplies, or the like may be delivered to the customer's home or business. Likewise, yard maintenance, cleaning or like services may also be performed at the customer's home or business. Similarly, a commercial transaction may occur at a sporting event, concert, exposition or trade show. Furthermore, commercial transactions are capable of being conducted on streets located adjacent to airports, hotels, shopping centers, and the like, in the case of a shuttle, bus, train, subway, ferry, taxi or other form of transportation involving picking up and dropping off customers at remote locations. As such, commercial transactions may be conducted at any number of geographically remote locations. In some remotely conducted commercial transactions, a customer may wish to tender payment to the merchant using a transaction instrument.

Figure 26:
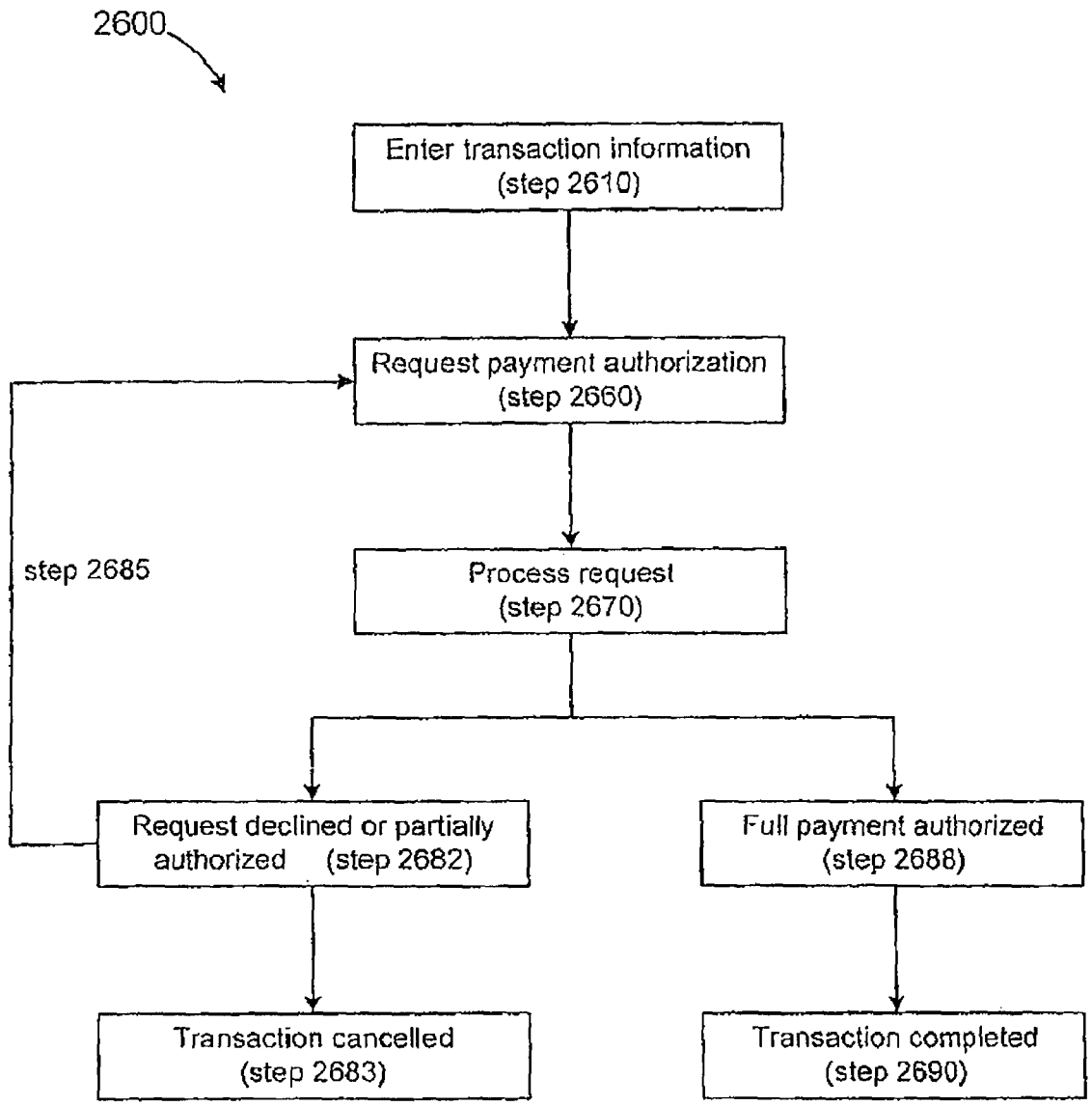
FIG. 26 is a flow chart illustrating an exemplary method to facilitate purchasing an item using the system of FIG. 23.

In an exemplary embodiment, with respect to FIG. 26, once the merchant is presented with the transaction account information, the merchant may enter the account information and transaction information (e.g., transaction amount) into a POS device while at the geographically remote location (step 2610). The account and transaction information may be entered by swiping, waving, hitting keys and/or inserting the transaction instrument into or around the POS device, and/or utilizing any other method of transferring the account information from the transaction instrument into the POS device.

Figure 27:
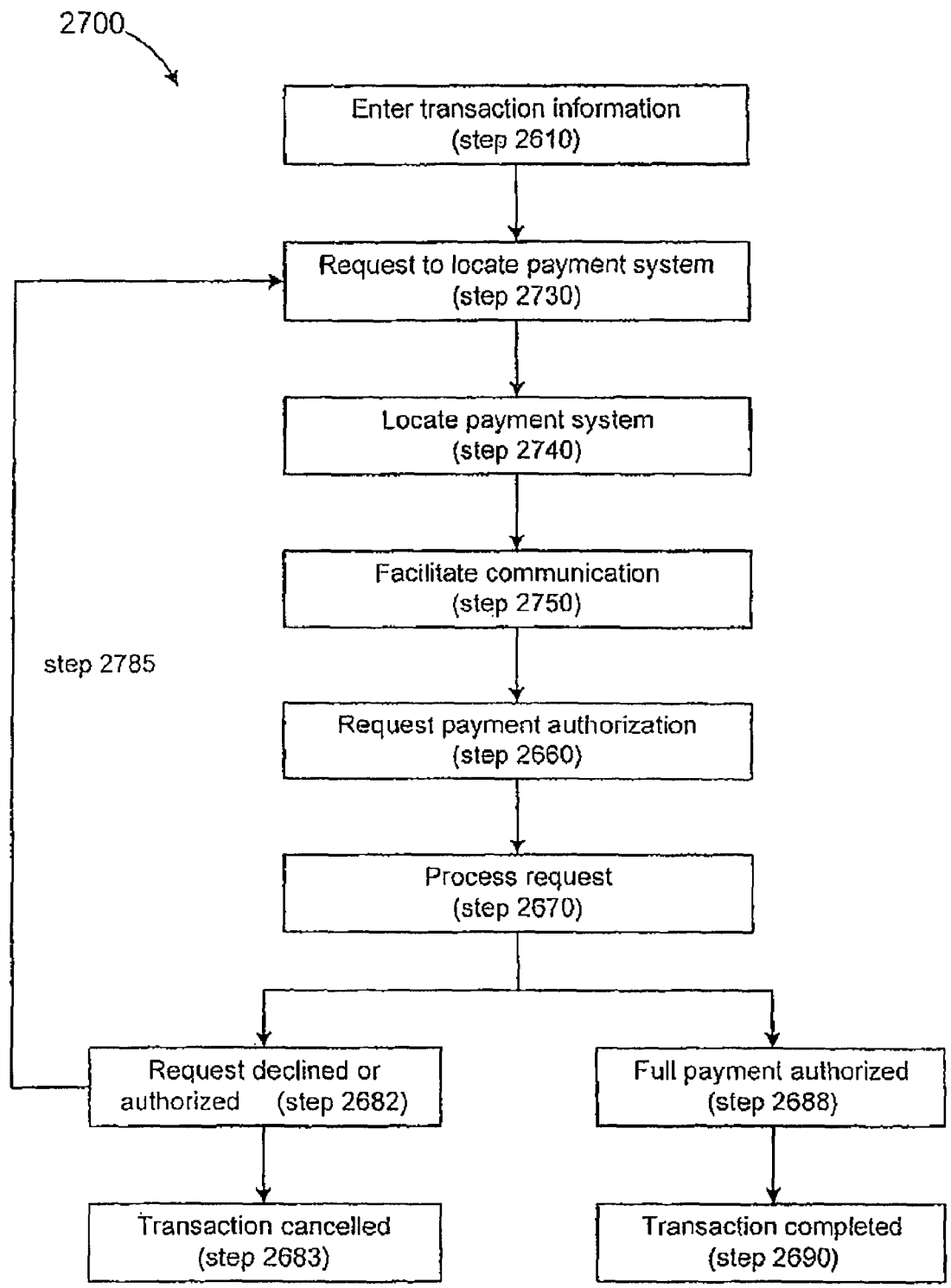
FIG. 27 is a flow chart illustrating an exemplary method to facilitate purchasing an item using the system of FIG. 24.

In response to the account and transaction information being transferred/entered into the POS device, the POS device may communicate a request for payment authorization directly to a host computer of at least one payment system while the POS device is located at the geographically remote location (step 2660). As depicted in FIGS. 24 and 27 and as described further below, in one embodiment, the POS device communicates with payment systems via a payment directory and/or an SSL gateway. The payment authorization request may be processed by one or more payment systems to determine whether the account includes sufficient funds, sufficient available credit or meets other authorization requirements (step 2670). If the account does not fully or partially meet the requirements, a "decline" message may be generated or partial payment may be authorized (step 2682). If the authorization is declined, the transaction may be cancelled (step 2683). If partial payment is authorized, the POS device may be notified (step 2685), and the POS device may request payment authorization from other payment systems until the full or a larger amount has been aggregately authorized (steps 2660, 2670, 2682 and/or 2685 being repeated, as necessary), or, after every available candidate payment system has been queried, full payment authorization is unattainable and the transaction cancelled (step 2683).

In an embodiment, the payment system and/or payment directory computer determines the requirements are met for full payment authorization (e.g., partial payment authorization aggregated to the full payment amount or acceptable partial payment), so the payment authorization may be transmitted from the payment system(s) and received by the POS device (step 2688). In an embodiment, the payment directory computer transmits a payment response based upon the POS device's payment request and based upon the first authorization response and/or the second authorization response. In various embodiments, the payment response may be transmitted to a merchant system, the POS device, a wireless transaction device, a website, an electronic commerce system, a wallet system associated with a purchaser, or a purchaser transaction device.

Payment authorization(s) may be received by the POS device before the transaction at the remote location is completed (step 2690). In such embodiments, payment authorization(s) may be received by the POS device immediately after the requests for payment authorization are transmitted and/or relatively soon after the requests for payment authorization are transmitted to the payment system(s), such that the transaction may be completed within a reasonable time and/or while the customer remains present at the remote location. The method also contemplates batch processing or other delayed processing methods.

In an embodiment, the method includes inserting third party account information into a portion (e.g., encrypted portion) of the payment request, so the payment request appears as a normal request to the issuing bank. In one embodiment, to take advantage of existing transaction message formats and, thus, minimize the need to modify existing merchant systems and or POS devices, the third party account information may be transmitted in an existing field of an industry standard financial transaction format. For example, the account number on the payment instrument may direct the authorization to the issuing bank or institution, but payment request may also include encrypted information with a different account number associated with a third party for billing the charge (e.g., Sprint phone number or Sprint account number). When the issuer receives the payment request, the issuer then sends the request to Sprint for authorization. Alternatively, the issuer may authorize the request and pay the merchants, then send the request to Sprint for customer billing purposes through its typical customer billing routine.

In one embodiment, the payment request may include a proxy account identifier. "proxy account identifier" includes any device, hardware, software, code, number, letter, symbol, digital certificate, smart chip, digital signal, analog signal, biometric and/or other identifier/indicia. The proxy account identifier also refers to any information provided to, for example, a merchant system during completion of a transaction request, which partially and/or fully masks the transaction account information. Moreover, the proxy account identifier may take the form of any conventional transaction account identifier. As such, when the merchant receives the proxy account identifier, the merchant system or RFID processes the proxy account identifier under business as usual standards. In one embodiment, payment system directory receives 2420 a proxy account identifier and accesses transaction account information for numerous transaction accounts based upon the proxy account identifier. For more information regarding proxy account identifiers (also known as, "proxy code"), please see U.S. patent application, Ser. No. 11/164,609, filed on Jul. 10, 2001 and entitled "System And Method For Securing A Recurrent Billing Transaction", which is hereby incorporated by reference in its entirety.

Method 2700, in one embodiment and with respect to FIG. 27, may initiate in a manner similar to step 2610 discussed above. In an exemplary embodiment, the POS device may initially communicate a request to a payment system directory 2420 to identify and/or locate at least one payment system to authorize at least a portion of the payment for the remote location transaction (step 2730). As discussed above, in one embodiment, in order identify one or more payment systems, a payment directory computer may construct a query based upon predetermined rules and/or algorithms and submit the query to one or more payment system directories.

In one embodiment, the process of querying, by the payment directory computer, a payment system directory includes transmitting a payment directory request to the payment system directory with one or more selection parameters, where the selection parameter is associated with a payment directory selection factor (e.g. an account owner associated with the payment request or a merchant associated with the transaction). The payment system directory parses the payment directory request, creates a query based upon the parsed payment directory request and executes the query against a payment system database. The payment system database receives the query and may access look up tables associated with the selection parameter(s) and may execute a join of multiple tables (which may reside on different logical or physical data files) based upon the selection parameter(s) to determine one or more candidate payment systems to return to the payment system computer. Furthermore, the payment system directory may update, add, or delete data in one or more payment system directories. The payment system computer receives query results that include one or more candidate payment systems. The payment system computer may apply business rules to further determine a payment system based upon on the query results or may pass the query results to a POS device that is capable of applying business rules to determine a payment system.

In one embodiment, as discussed briefly above, the POS device comprises a payment system directory, including both payment system data, functionality and logic; i.e., the payment system directory may be physically or logically indistinct from the POS device. For example, the POS device may include a cached, mirrored or off-line version of the payment system directory data ("cached" or "off-line" payment directory) and the POS device may include a logic module configured to query the cached payment system directory. The cached payment directory includes a logic module configured to query the cached payment system directory with one or more selection parameters, where the selection parameter is associated with a payment directory selection factor (e.g. an account owner associated with the payment request or a merchant associated with the transaction). The cached payment system directory receives the query and may access look up tables associated with the selection parameter(s) and may execute a join of multiple tables (which may reside on different logical or physical data files) based upon the selection parameter(s) to determine one or more candidate payment systems to return to the payment system computer. The cached payment system directory returns query results that include one or more candidate payment systems. The POS device may apply business rules to further determine a payment system based upon on the query results.

In one embodiment, a cached payment system directory may include data reflecting a previous transaction and/or a present or previous state of a payment system directory. For example, the a POS device includes a cached payment system directory. In a first transaction, the POS device accesses a payment system directory and at least a portion of the data obtained from the payment system directory is stored in the cached payment system directory. In a second transaction, the POS device accesses the cached payment system directory. In one embodiment, data on the cached payment system directory may be updated based upon the second transaction or upon other events, data or factors. The cached payment system directory and the payment system directory may synchronize data and/or perform reconciliation logic with respect to each other.

In one embodiment, payment system directory 2420 is configured to determine one or more payment systems based upon at least one of: the payment request, a merchant system, a requesting device, a merchant who submitted a payment request, a POS device attribute, a purchaser transaction device attribute, a transaction amount, an account holder, a transaction account, a transaction account issuer, an alternate account associated with a transaction account, an overdraft rule, an overdraft account, an acquiring financial institution, a point of sale device, a POS device associated with a transaction, a merchant associated with a POS device, a geographic location, a geographic location associated with a transaction, a code, a product associated with a transaction, a merchant associated with a transaction, a date a user data input, a first budget associated with a first account and with budget information, a points balance associated with a rewards account, an expiration date associated with a rewards program, a points balance associated with a second rewards program, an expiration date associated with a rewards program, a points balance associated with a rewards account or an allowance.

Referring again to FIG. 27, the payment system directory (and/or the SSL gateway) may facilitate communication of a payment authorization request from the POS device to at least one payment system (step 2750). Once the payment authorization request is received by the payment system, method 2700 may include steps 2660, 2670, 2682, 2683, 2688 and 2690 similar to embodiments discussed above with respect to method 2600. Moreover, method 2700 may include partial payment authorization being communicated to the POS device (step 2785). In these embodiments, steps 2730, 2740, 2750, 2660, 2670 2682 and 2785 may be repeated until the full amount has been aggregately authorized (step 2688) or, after every available candidate payment system has been inquired of, full payment authorization is unattainable and the transaction cancelled (step 2683).

In one embodiment, in response to a first authorization response indicating a decline or a partial authorization, payment directory computer determines a second payment system for processing at least a portion of the transaction, transmits a second authorization request to a second payment system related to at least a portion of the transaction, receives from the second payment system a second authorization response associated with the second authorization request. A second payment system may be at least partially determined based upon the partial authorization. Furthermore, in an embodiment, an amount of the second authorization request is based upon a transaction amount associated with the payment request minus an amount substantially equal to a partial payment amount associated with the partial authorization. In one embodiment, the percentage of a partial payment relative to a transaction amount associated with the payment request is calculated and if the percentage of the partial payment is less than a predetermined threshold, the amount of the second authorization request is equal to the transaction amount associated with the payment request. In response to either a decline or a partial authorization of the first authorization request, a second authorization request may be based upon a transaction amount associated with the payment request and the payment response based upon the second authorization response. In situations where partial payment authorization is required from more than one payment system, the POS device may be configured to receive the multiple partial payment authorizations in succession, as a batch total or according to any other suitable routine.

In one embodiment, a transaction is funded from more than one transaction account. Payment directory computer receives a payment request for a transaction and determines from the payment request two or more transaction accounts to fund the transaction. Payment directory computer may determine that the transaction should be split over multiple transaction accounts by, for example, a flag in the payment request, a transaction amount, a merchant, a predetermined rule, etc. Payment directory computer determines payment systems and facilitates transaction authorization requests to the payment systems for the respective accounts. Payment directory computer may communicate the transaction account and payment system information to a POS device and the POS device may send a transaction account to the payment systems.

In one embodiment, payment directory computer facilitates a purchase transaction that involves determining a payment account and/or a payment system based upon budget information. For example, payment directory computer receives a payment request for a transaction. The payment request may be received from a POS device, a merchant system and electronic commerce system either directly or via an SSL gateway. Based upon the payment request and budget information associated with the account, payment directory computer determines a first account to at least partially fund the transaction. Payment directory computer determines a payment system for processing at least a portion of the transaction and facilitates an authorization request to the payment system. In an embodiment, a similar method may be performed by a point of service device.

Similar to determining transaction accounts and payment systems to process a transaction according to budget information, in one embodiment, the payment directory computer facilitates a purchase transaction that involves determining a payment system based upon a rewards account. The payment directory computer receives a payment request for a transaction and determines that the transaction should be at least partially funded from a rewards account. Based upon the rewards account and other decision making factors or predetermined rule logic (e.g., as discussed above), the payment directory determines a payment system for processing at least a portion of the transaction. The payment directory computer transmits an authorization request to the payment system. In an embodiment, a similar method may be performed by a point of service device.

In one embodiment, the payment directory facilitates a purchase transaction that involves determining a payment account and/or a payment system based upon a rewards accumulation strategy. For instance, based upon a purchase amount, merchant, purchase date, etc., the payment system may evaluate a number of transaction account to determine a rewards account that would benefit most from processing the transaction using a transaction account associated with that awards account. The method may include: receiving, at a payment directory computer, a payment request for a transaction; determining, by the payment directory computer and based upon the payment request, that the transaction should be at least partially funded from a transaction account, wherein the transaction account is determined at least partially by a rewards program associated with the transaction account; determining, by the payment directory computer, based upon the transaction account a payment system for processing at least a portion of the transaction; and, facilitating, by the payment directory computer, an authorization request to the payment system. In an embodiment, a similar method may be performed by a point of service device.

In one embodiment, the method of using a payment directory to facilitate a purchase transaction involves determining a supplemental account for funding a transaction. For example, a primary account may be linked to a supplemental account and the supplemental account may be used to fund a transaction (or a portion thereof) when the primary account drops below a certain predetermined level, exceeds an allowance (e.g. daily transaction limit, limit on purchases for particular type of product, etc.) or when the transaction amount exceeds a certain amount. In one embodiment, a payment directory computer receives a payment request for a transaction; determines a first payment system for processing at least a portion of the transaction; transmits a first authorization request related to at least a portion of the transaction to the first payment system; receives a first authorization response associated with the first authorization request; and, in response to the first authorization response indicating at least one of a decline or a partial authorization, the payment directory computer determining a supplemental account for funding the transaction. In an embodiment, a similar method may be performed by a point of service device.

In one embodiment, the payment directory computer facilitates a purchase transaction by determining a payment system based upon a characteristic of a purchaser transaction device (e.g. a mobile device). For example, if the transaction device is a mobile device, the payment directory computer may determine a different payment system for processing the transaction than if the transaction device is a mobile device manufactured by (for example) Motorola®. In one embodiment the payment directory computer receives a payment request for a transaction; determines based upon the requesting device, a payment system for processing at least a portion of the transaction; and facilitates an authorization request to the payment system. In an embodiment, a similar method may be performed by a point of service device.

In one embodiment, a purchaser transaction device to communicates with a payment directory. For example, the purchaser transaction device sends a purchase request to a POS device. The POS device creates a transaction authorization request based upon the purchase request and sends it to the purchaser transaction device. In an embodiment, the purchaser transaction device transmits a payment authorization message based upon the transaction request to a payment directory service and/or payment service. The POS device receives a transaction approval based upon the payment authorization message and the transaction is completed based upon the transaction approval.

In an embodiment, the payment directory and/or payment directory computer may also be configured to access and/or manage limited use identifier information. "Limited use account identifier" includes individual accounts that are associated with a particular master account. In one embodiment, a plurality (or a "pool") of these limited use account numbers may be associated with a master account and the limited use account identifiers is used by the purchasing entity to purchase goods or services. In one embodiment, each of the limited use account identifiers may be a transaction account identifier. Pursuant to some embodiments, individual account identifiers may be associated with a "pre-authorization record" (or, put another way, account identifiers may be "pre-authorized"). The term "pre-authorized" or "pre-authorization record" includes data associated with an account identifier which specifies the conditions in which a transaction associated with the account will be authorized. For example, the purchase request may include information regarding a product and merchant and the payment directory computer may determine a corresponding limited use identifier and/or a pre-authorized transaction. Furthermore, the payment directory computer may manage limited use identifiers that may involve a partial shipment and/or limited use identifiers that may involve refreshing the preauthorization information. For more information regarding limited use identifiers, partial shipments, and refreshable limited use identifiers please see U.S. patent application, Ser. No. 12/355,576, filed on Jan. 16, 2009 and entitled "Authorization Refresh System and Method", which is hereby incorporated by reference in its entirety.

Figure 28:
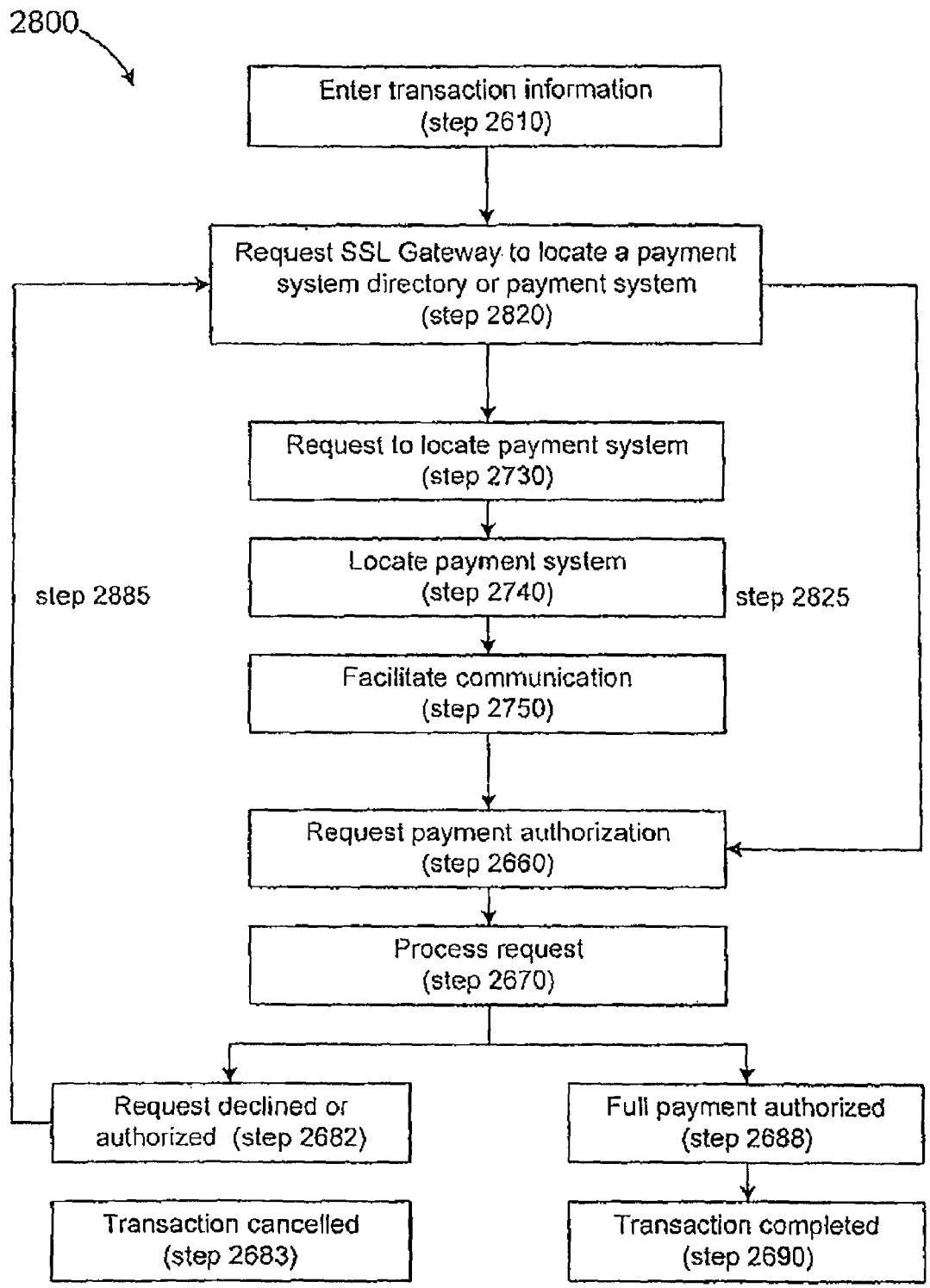
FIG. 28 is a flow chart illustrating an exemplary method to facilitate purchasing an item using the system of FIG. 25.

Method 2800, in an exemplary embodiment and with respect to FIG. 28, may initiate with step 2610 in a manner similar to embodiments discussed above. The POS device may locate and gain access to a SSL Gateway (e.g., SSL Gateway 2515). Once accessed, the POS device may communicate a request to the SSL Gateway to locate a payment system directory (e.g., payment system directory 2520), based on the criteria discussed above such that an appropriate gateway can be determined, and facilitate communication between the POS device and the payment system directory, and/or to locate at least one payment system (e.g., payment system 2531 and/or payment system 2532) and facilitate communication between the POS device and the payment system(s) while the POS device is located at the remote location (step 2820). In an exemplary embodiment, a payment system directory may be located by the SSL Gateway, and method 2800 may include steps 2730, 2740, 2750 similar to embodiments discussed above with respect to method 2700. In addition, method 2800 may include steps 2660, 2670, 2682, 2683 2688, and 2690 similar to methods 2600 and 2700 discussed above.

Method 2800 may include partial payment authorization being communicated to the POS device (step 2885). In these embodiments, steps 2820, 2730, 2740, 2750, 2660, 2670 2682 and 2885 may be repeated until the full amount has been aggregately authorized (step 2688) or, after every available candidate payment system has been inquired of, full payment authorization is unattainable and the transaction cancelled (step 2683).

In one exemplary embodiment, at least one payment system may be located by the SSL Gateway and communication facilitated between the POS device and the payment system (s) (step 2825). In these embodiments, method 2800 may include steps 2660, 2670 2682, 2683, 2885, 2688 and 2690 similar to embodiments discussed above with respect to methods 2600 and 2700. In addition, method 2800 may include partial payment authorization being communicated to the POS device (step 2885). In these embodiments, steps 2820, 2660, 2670 2682, 2683, 2885, 2688 and 2690 may be repeated until the full amount has been aggregately authorized (step 2688) or, after every available candidate payment system has been queried, full payment authorization is unattainable and the transaction cancelled (step 2683).

It should be understood, however, that the detailed description and specific examples, while indicating exemplary embodiments of the present invention, are given for purposes of illustration only and not of limitation. Many changes and modifications within the scope of the instant invention may be made without departing from the spirit thereof, and the invention includes all such modifications. The corresponding structures, materials, acts, and equivalents of all elements in the claims below are intended to include any structure, material, or acts for performing the functions in combination with other claimed elements as specifically claimed. The scope of the invention should be determined by the appended claims and their legal equivalents, rather than by the examples given above. For example, the steps recited in any method claims may be executed in any order and are not limited to the order presented in the claims. Moreover, no element is essential to the practice of the invention unless specifically described herein as "critical" or "essential".

The invention claimed is:

1. A method, comprising:
    receiving, from a requesting device and at a payment directory computer, a payment request for at least a portion of a transaction and a requesting transaction device attribute, wherein the payment request includes an authorization request;
    determining, by the payment directory computer, a payment system for processing the at least a portion of the transaction by accessing a payment directory based upon the requesting transaction device attribute received from the requesting device, wherein the payment directory computer includes a directory of payment systems; and
    transmitting, by the payment directory computer, the authorization request to the payment system.

2. The method of claim 1, wherein the determining the payment system comprises querying a payment system directory to identify one or more payment systems.

3. The method of claim 2, wherein the querying the payment system directory to identify one or more payment systems comprises transmitting a payment directory request to the payment system directory with at least one selection parameter, wherein the selection parameter is associated with the requesting device and at least one of an account owner associated with the payment request or a merchant associated with the transaction, wherein the payment system directory parses the payment directory request, creates a query based upon the parsed payment directory request and executes the query against a payment system database.

4. The method of claim 3, wherein the payment system directory transmits a plurality of candidate payment systems in response to the payment directory request and wherein the payment directory computer applies a predetermined rule to select the first payment system from the plurality of candidate payment systems.

5. The method of claim 1, wherein the determining the payment system comprises determining the payment system based upon a predetermined rule associated with the requesting transaction device attribute.

6. The method of claim 5, wherein the predetermined rule is at least partially based upon at least one of the payment request, a merchant system, the requesting device, a merchant who submitted a payment request, a purchaser transaction device attribute, a transaction amount, an account holder, a transaction account, a proxy account identifier, a transaction account issuer, an alternate account associated with a transaction account, an overdraft rule, an overdraft account, an acquiring financial institution, a point of sale device, a point of service (POS) device associated with the transaction, a POS device attribute, a merchant associated with a POS device, a geographic location, a geographic location associated with the transaction, a code, a product associated with the transaction, a merchant associated with the transaction, a date a user data input, a first budget associated with a first account and with budget information, a points balance associated with a rewards account, an expiration date associated with a rewards program, a points balance associated with a second rewards program, an expiration date associated with a rewards program, a points balance associated with a rewards account, or an allowance.

7. The method of claim 1, wherein the requesting device is at least one of a merchant system, a point of sale device, a wireless point of sale device, a transaction instrument, a wireless transaction device, a website, an electronic commerce system, an electronic wallet system associated with a purchaser, or a purchaser transaction device.

8. The method of claim 1, wherein the payment request comprises a requesting device identifier.

9. The method of claim 1, wherein at least a portion of the payment request is received from a merchant system via at least one of an Internet, a gateway, and an SSL Gateway.

10. The method of claim 1, wherein the payment directory computer is part of an SSL gateway.

11. The method of claim 1, wherein at least a portion of a payment response is transmitted to at least one of a merchant system, a point of sale device, a wireless point of sale device, a transaction instrument, a wireless transaction device, a website, an electronic commerce system, an electronic wallet system associated with a purchaser, or a purchaser transaction device.

12. The method of claim 1, further comprising:
    in response to a first authorization response to the authorization request indicating a partial authorization, determining a second payment system based upon a requesting transaction device attribute.

13. The method of claim 1, further comprising:
    in response to a first authorization response to the authorization request indicating a partial authorization, determining an amount of a second authorization request based upon a transaction amount associated with the payment request minus an amount substantially equal to a partial payment amount associated with the partial authorization.

14. The method of claim 1, further comprising:
    in response to a first authorization response to the authorization request indicating a partial authorization, determining a second authorization request based upon a transaction amount associated with the payment request; and determining the payment response based upon a second authorization response to the second authorization request.

15. A method, comprising:

receiving, at a point of service (POS) device and from a requesting transaction device, a request for a transaction;

transmitting, by the POS device and to a payment directory, a payment request for at least a portion of the transaction and a requesting transaction device attribute, wherein the payment request includes an authorization request, wherein the payment directory determines a payment system based upon the requesting transaction device attribute, for processing the at least a portion of the transaction, and wherein the payment directory computer includes a directory of payment systems; and, receiving, by the POS device, an authorization response based upon the authorization request.

16. The method of claim 15, wherein the payment system is determined based upon the payment device and at least one of the payment request, a merchant system, an identifier of a merchant who submitted a payment request, a purchaser transaction device attribute, a transaction amount, an account holder, a transaction account, a proxy account identifier, a transaction account issuer, an alternate account associated with a transaction account, an overdraft rule, an overdraft account, an acquiring financial institution, a point of sale device, the POS device, a POS device attribute, a merchant associated with the POS device, a geographic location, a geographic location associated with the transaction, a code, a product associated with the transaction, a merchant associated with the transaction, a date a user data input, a first budget associated with a first account and with budget information, a points balance associated with a rewards account, an expiration date associated with a rewards program, a points balance associated with a second rewards program, an expiration date associated with a rewards program, a points balance associated with a rewards account, or an allowance.

17. The method of claim 15, further comprising transmitting, by the POS device, an authorization request to the payment system.

18. The method of claim 17, wherein the authorization request is transmitted via an SSL gateway.

19. A tangible machine-readable medium having stored thereon computer-executable instructions that, if executed by a payment directory computer, cause the payment directory computer to perform operations comprising:

receiving, from a requesting device and at the payment directory computer, a payment request for at least a portion of a transaction and a requesting transaction device attribute, wherein the payment request includes an authorization request;

determining, by the payment directory computer, a payment system for processing the at least a portion of the transaction by accessing a payment directory based upon the requesting transaction device attribute received from the requesting device, wherein the payment directory computer includes a directory of payment systems; and transmitting by the payment directory computer, the authorization request to the payment system.

* * * * *

UNITED STATES PATENT AND TRADEMARK OFFICE
CERTIFICATE OF CORRECTION

| | | |
|---|---|---|
| PATENT NO. | : 8,195,565 B2 | Page 1 of 1 |
| APPLICATION NO. | : 12/479738 | |
| DATED | : June 5, 2012 | |
| INVENTOR(S) | : Bishop et al. | |

It is certified that error appears in the above-identified patent and that said Letters Patent is hereby corrected as shown below:

In Column 14, Line 7, delete "issuer" and insert -- issuer. --, therefor.

In Column 18, Line 30, delete "then" and insert -- than --, therefor.

In Column 34, Line 19, delete "application," and insert -- application --, therefor.

In Column 35, Line 21, delete "the a" and insert -- a --, therefor.

In Column 38, Line 35, delete "application," and insert -- application --, therefor.

Signed and Sealed this
Thirtieth Day of October, 2012

David J. Kappos
*Director of the United States Patent and Trademark Office*